United States Patent
Wagner et al.

(10) Patent No.: US 12,098,027 B2
(45) Date of Patent: *Sep. 24, 2024

(54) MAINTENANCE SYSTEMS FOR USE IN SYSTEMS AND METHODS FOR PROCESSING OBJECTS INCLUDING MOBILE MATRIX CARRIER SYSTEMS

(71) Applicant: Berkshire Grey Operating Company, Inc., Bedford, MA (US)

(72) Inventors: Thomas Wagner, Concord, MA (US); Kevin Ahearn, Nebo, NC (US); John Richard Amend, Jr., Belmont, MA (US); Benjamin Cohen, Somerville, MA (US); Michael Dawson-Haggerty, Pittsburgh, PA (US); William Hartman Fort, Stratham, NH (US); Christopher Geyer, Arlington, MA (US); Jennifer Eileen King, Oakmont, PA (US); Thomas Koletschka, Cambridge, MA (US); Michael Cap Koval, Mountain View, CA (US); Kyle Maroney, North Attleboro, MA (US); Matthew T. Mason, Pittsburgh, PA (US); William Chu-Hyon McMahan, Cambridge, MA (US); Gene Temple Price, Cambridge, MA (US); Joseph Romano, Arlington, MA (US); Daniel Smith, Canonsburg, PA (US); Siddhartha Srinivasa, Seattle, WA (US); Prasanna Velagapudi, Pittsburgh, PA (US); Thomas Allen, Reading, MA (US)

(73) Assignee: Berkshire Grey Operating Company, Inc., Bedford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/134,456

(22) Filed: Apr. 13, 2023

(65) Prior Publication Data
US 2023/0249911 A1 Aug. 10, 2023

Related U.S. Application Data

(63) Continuation of application No. 17/210,627, filed on Mar. 24, 2021, now Pat. No. 11,661,275, which is a
(Continued)

(51) Int. Cl.
*G05B 19/042* (2006.01)
*B65G 1/04* (2006.01)
(Continued)

(52) U.S. Cl.
CPC ......... *B65G 1/0471* (2013.01); *B65G 1/0492* (2013.01); *B65G 1/065* (2013.01);
(Continued)

(58) Field of Classification Search
CPC .......... G05B 19/0428; G05B 19/41815; G05B 19/41895
See application file for complete search history.

(56) References Cited

U.S. PATENT DOCUMENTS

| 1,030,320 A | 6/1912 | Morgan |
| 2,294,945 A | 9/1942 | Zink |

(Continued)

FOREIGN PATENT DOCUMENTS

| AU | 2006204622 A1 | 3/2007 |
| AU | 2015233498 A1 | 10/2016 |

(Continued)

OTHER PUBLICATIONS

Communication pursuant to Article 94(3) EPC issued by the European Patent Office in related European Patent Application No. 18716070.0 on Nov. 11, 2021, 5 pages.
(Continued)

*Primary Examiner* — Gary Collins

(74) *Attorney, Agent, or Firm* — Gesmer Updegrove LLP

(57) ABSTRACT

A maintenance system is disclosed for assisting in maintaining an automated carrier system for moving objects to be processed. The maintenance system includes a plurality of automated carriers that are adapted to move on an array of discontinuous standard track sections, each said automated carrier including a carrier body that is no larger in either a length or width direction that a standard track section, and an automated maintenance carrier that is adapted to move on the array of discontinuous track sections, said automated maintenance system including a maintenance body that is larger in at least one of a length or width direction than the standard track section.

27 Claims, 64 Drawing Sheets

Related U.S. Application Data continuation of application No. 16/172,339, filed on Oct. 26, 2018, now Pat. No. 10,988,323.

(60) Provisional application No. 62/681,409, filed on Jun. 6, 2018, provisional application No. 62/641,640, filed on Mar. 12, 2018, provisional application No. 62/578,030, filed on Oct. 27, 2017.

(51) Int. Cl.

| | |
|---|---|
| *B65G 1/06* | (2006.01) |
| *B65G 1/137* | (2006.01) |
| *B65G 67/02* | (2006.01) |
| B07C 5/36 | (2006.01) |
| B07C 5/38 | (2006.01) |
| B25J 9/10 | (2006.01) |
| B25J 9/16 | (2006.01) |
| B61B 13/00 | (2006.01) |
| B61D 3/00 | (2006.01) |
| B61D 9/00 | (2006.01) |
| B65G 1/00 | (2006.01) |
| B65G 1/02 | (2006.01) |
| B65G 1/08 | (2006.01) |
| B65G 9/00 | (2006.01) |
| B65G 37/00 | (2006.01) |
| B65G 41/02 | (2006.01) |
| B65G 47/48 | (2006.01) |
| B65G 47/90 | (2006.01) |
| B65G 47/96 | (2006.01) |
| B65G 65/00 | (2006.01) |
| B65G 65/23 | (2006.01) |
| G05B 19/418 | (2006.01) |

(52) U.S. Cl.
CPC ........... *B65G 1/1375* (2013.01); *B65G 67/02* (2013.01); *B07C 5/361* (2013.01); *B07C 5/38* (2013.01); *B07C 2301/0091* (2013.01); *B25J 9/106* (2013.01); *B25J 9/162* (2013.01); *B25J 9/1687* (2013.01); *B61B 13/00* (2013.01); *B61D 3/00* (2013.01); *B61D 9/00* (2013.01); *B65G 1/00* (2013.01); *B65G 1/026* (2013.01); *B65G 1/0478* (2013.01); *B65G 1/0485* (2013.01); *B65G 1/08* (2013.01); *B65G 1/1371* (2013.01); *B65G 1/1373* (2013.01); *B65G 1/1378* (2013.01); *B65G 9/002* (2013.01); *B65G 9/008* (2013.01); *B65G 37/00* (2013.01); *B65G 41/02* (2013.01); *B65G 47/48* (2013.01); *B65G 47/902* (2013.01); *B65G 47/904* (2013.01); *B65G 47/96* (2013.01); *B65G 65/005* (2013.01); *B65G 65/23* (2013.01); *B65G 2201/0258* (2013.01); *B65G 2203/0216* (2013.01); *B65G 2203/044* (2013.01); *B65G 2811/0678* (2013.01); *B65G 2814/0346* (2013.01); *G05B 19/0428* (2013.01); *G05B 19/41815* (2013.01); *G05B 19/41895* (2013.01); *G05B 2219/24001* (2013.01); *G05B 2219/40078* (2013.01); *G05B 2219/40252* (2013.01)

(56) References Cited

U.S. PATENT DOCUMENTS

| | | |
|---|---|---|
| 3,223,259 A | 12/1965 | Nicholson |
| 4,114,762 A | 9/1978 | Beal et al. |
| 4,508,484 A | 4/1985 | Heiz |
| 4,678,390 A | 7/1987 | Bonneton et al. |
| 4,722,653 A | 2/1988 | Williams et al. |
| 4,759,439 A | 7/1988 | Hartlepp |
| 4,846,335 A | 7/1989 | Hartlepp |
| 4,846,619 A | 7/1989 | Crabtree et al. |
| 4,895,242 A | 1/1990 | Michel |
| 5,190,162 A | 3/1993 | Hartlepp |
| 5,393,074 A | 2/1995 | Bear et al. |
| 5,525,884 A | 6/1996 | Siugiura et al. |
| 5,595,263 A | 1/1997 | Pignataro |
| 5,839,566 A | 11/1998 | Bonnet |
| 6,011,998 A | 1/2000 | Lichti et al. |
| 6,036,812 A | 3/2000 | Williams et al. |
| 6,059,092 A | 5/2000 | Jerue et al. |
| 6,079,570 A | 6/2000 | Oppliger et al. |
| 6,208,908 B1 | 3/2001 | Boyd et al. |
| 6,246,023 B1 | 6/2001 | Kugle |
| 6,323,452 B1 | 11/2001 | Bonnet |
| 6,377,867 B1 | 4/2002 | Bradley et al. |
| 6,390,756 B1 | 5/2002 | Isaacs et al. |
| 6,505,093 B1 | 1/2003 | Thatcher et al. |
| 6,543,983 B1 | 4/2003 | Felder et al. |
| 6,579,053 B1 | 6/2003 | Grams et al. |
| 6,685,031 B2 | 2/2004 | Takizawa |
| 6,688,459 B1 | 2/2004 | Bonham et al. |
| 6,762,382 B1 | 7/2004 | Danelski |
| 6,897,395 B2 | 5/2005 | Shibashi et al. |
| 6,946,612 B2 | 9/2005 | Morikawa |
| 6,997,666 B1 | 2/2006 | Rodgers et al. |
| 7,728,244 B2 | 6/2010 | De Leo et al. |
| 7,861,844 B2 | 1/2011 | Hayduchok et al. |
| 8,718,814 B1 | 5/2014 | Clark et al. |
| 8,776,694 B2 | 7/2014 | Rosenwinkel et al. |
| 8,798,784 B1 | 8/2014 | Clark et al. |
| 8,831,984 B2 | 9/2014 | Hoffman et al. |
| 8,911,199 B2 | 12/2014 | Hermann et al. |
| 8,952,284 B1 | 2/2015 | Wong et al. |
| 8,972,045 B1 | 3/2015 | Mountz et al. |
| 8,989,918 B2 | 3/2015 | Sturm |
| 8,997,438 B1 | 4/2015 | Fallas |
| 9,020,632 B2 | 4/2015 | Naylor |
| 9,102,336 B2 | 8/2015 | Rosenwinkel |
| 9,111,251 B1 | 8/2015 | Brazeau et al. |
| 9,120,622 B1 | 9/2015 | Elazary et al. |
| 9,216,857 B1 | 12/2015 | Kalyan et al. |
| 9,227,323 B1 | 1/2016 | Konolige et al. |
| 9,346,083 B2 | 5/2016 | Stone |
| 9,364,865 B2 | 6/2016 | Ki |
| 9,481,518 B2 | 11/2016 | Neiser |
| 9,492,923 B2 | 11/2016 | Wellman et al. |
| 9,517,899 B2 | 12/2016 | Watt et al. |
| 9,688,471 B2 | 6/2017 | Hellenbrand |
| 9,694,977 B2 | 7/2017 | Aprea et al. |
| 9,751,693 B1 | 9/2017 | Battles et al. |
| 9,821,464 B2 | 11/2017 | Stiernagle et al. |
| 9,878,349 B2 | 1/2018 | Crest et al. |

(56) References Cited

U.S. PATENT DOCUMENTS

| | | |
|---|---|---|
| 9,926,138 B1 | 3/2018 | Brazeau et al. |
| 9,975,148 B2 | 5/2018 | Zhu et al. |
| 10,029,865 B1 | 7/2018 | McCalib, Jr. et al. |
| 10,576,621 B2 | 3/2020 | Wagner et al. |
| 10,611,021 B2 | 4/2020 | Wagner et al. |
| 10,625,934 B2 | 4/2020 | Mallady |
| 10,857,925 B1 | 12/2020 | Sahota |
| 10,913,612 B2 | 2/2021 | Wagner et al. |
| 10,988,323 B2 | 4/2021 | Wagner et al. |
| 11,084,660 B2 | 8/2021 | Wagner et al. |
| 11,117,760 B2 | 9/2021 | Wagner et al. |
| 11,377,309 B2 | 7/2022 | Ingram-Tedd et al. |
| 11,390,459 B2 | 7/2022 | Wagner et al. |
| 11,402,831 B2 | 8/2022 | Wagner et al. |
| 11,661,275 B2 * | 5/2023 | Wagner ............... B65G 1/0492 700/108 |
| 11,814,245 B2 | 11/2023 | Wagner et al. |
| 2002/0056297 A1 | 5/2002 | Sadler |
| 2002/0092801 A1 | 7/2002 | Dominguez |
| 2002/0157919 A1 | 10/2002 | Sherwin |
| 2003/0123970 A1 | 7/2003 | Grams et al. |
| 2004/0193554 A1 | 9/2004 | Hillerich, Jr. et al. |
| 2005/0002772 A1 | 1/2005 | Stone |
| 2005/0137933 A1 | 6/2005 | Holsen et al. |
| 2005/0220600 A1 | 10/2005 | Baker et al. |
| 2006/0045672 A1 | 3/2006 | Maynard et al. |
| 2006/0096131 A1 * | 5/2006 | Hall ............... E02F 3/08 37/104 |
| 2007/0065258 A1 | 3/2007 | Benedict et al. |
| 2007/0209976 A1 | 9/2007 | Worth et al. |
| 2008/0040945 A1 * | 2/2008 | Buckner ............... E02F 3/8891 34/406 |
| 2008/0181753 A1 | 7/2008 | Bastian et al. |
| 2008/0269960 A1 | 10/2008 | Kostmann |
| 2009/0026017 A1 | 1/2009 | Freudelsperger |
| 2009/0074545 A1 | 3/2009 | Lert, Jr. et al. |
| 2010/0122942 A1 | 5/2010 | Harres et al. |
| 2010/0247275 A1 | 9/2010 | Karlen et al. |
| 2010/0316469 A1 | 12/2010 | Lert et al. |
| 2011/0014021 A1 | 1/2011 | Reid et al. |
| 2011/0144798 A1 | 6/2011 | Freudelsperger |
| 2011/0238207 A1 | 9/2011 | Bastian, II et al. |
| 2011/0243707 A1 | 10/2011 | Dumas et al. |
| 2012/0128454 A1 | 5/2012 | Hayduchok et al. |
| 2012/0185082 A1 | 7/2012 | Toebes et al. |
| 2012/0185122 A1 | 7/2012 | Sullivan et al. |
| 2012/0189410 A1 | 7/2012 | Toebes et al. |
| 2012/0189416 A1 | 7/2012 | Toebes et al. |
| 2012/0195724 A1 | 8/2012 | Toebes et al. |
| 2012/0259482 A1 | 10/2012 | Jeschke |
| 2013/0110280 A1 | 5/2013 | Folk |
| 2013/0334158 A1 | 12/2013 | Koch |
| 2014/0058556 A1 | 2/2014 | Kawano |
| 2014/0086709 A1 | 3/2014 | Kasai |
| 2014/0086714 A1 | 3/2014 | Malik |
| 2014/0100999 A1 | 4/2014 | Mountz et al. |
| 2014/0244026 A1 | 8/2014 | Neiser |
| 2014/0277693 A1 | 9/2014 | Naylor |
| 2014/0308098 A1 | 10/2014 | Lert et al. |
| 2015/0032252 A1 | 1/2015 | Galluzzo et al. |
| 2015/0073589 A1 | 3/2015 | Khodl et al. |
| 2015/0081090 A1 | 3/2015 | Dong |
| 2015/0098775 A1 | 4/2015 | Razumov |
| 2015/0114799 A1 | 4/2015 | Hansl et al. |
| 2015/0259077 A1 | 9/2015 | Wiskus |
| 2015/0375398 A1 | 12/2015 | Penn et al. |
| 2015/0375938 A9 | 12/2015 | Lert et al. |
| 2016/0075521 A1 | 3/2016 | Puchwein et al. |
| 2016/0129592 A1 | 5/2016 | Saboo et al. |
| 2016/0167227 A1 | 6/2016 | Wellman et al. |
| 2016/0176638 A1 | 6/2016 | Toebes |
| 2016/0221187 A1 | 8/2016 | Bradski et al. |
| 2016/0236867 A1 | 8/2016 | Brazeau et al. |
| 2016/0244262 A1 | 8/2016 | O'Brien et al. |
| 2016/0274586 A1 | 9/2016 | Stubbs et al. |
| 2016/0304278 A1 | 10/2016 | Hognaland |
| 2016/0325934 A1 | 11/2016 | Stiernagle et al. |
| 2016/0332554 A1 | 11/2016 | Ambrosio et al. |
| 2016/0347545 A1 | 12/2016 | Lindbo et al. |
| 2016/0355337 A1 | 12/2016 | Lert et al. |
| 2017/0021499 A1 | 1/2017 | Wellman et al. |
| 2017/0043953 A1 | 2/2017 | Battles et al. |
| 2017/0080566 A1 | 3/2017 | Stubbs et al. |
| 2017/0106532 A1 | 4/2017 | Wellman et al. |
| 2017/0107055 A1 | 4/2017 | Magens et al. |
| 2017/0121114 A1 | 5/2017 | Einav et al. |
| 2017/0157648 A1 | 6/2017 | Wagner et al. |
| 2017/0166400 A1 | 6/2017 | Hofmann |
| 2017/0225330 A1 | 8/2017 | Wagner et al. |
| 2017/0305668 A1 | 10/2017 | Bestic et al. |
| 2017/0305694 A1 | 10/2017 | McMurrough et al. |
| 2017/0322561 A1 | 11/2017 | Stiernagle |
| 2017/0349385 A1 | 12/2017 | Moroni et al. |
| 2018/0085788 A1 | 3/2018 | Engel et al. |
| 2018/0137454 A1 | 5/2018 | Kulkarni et al. |
| 2018/0186572 A1 | 7/2018 | Issing |
| 2018/0194571 A1 | 7/2018 | Fryer et al. |
| 2018/0244473 A1 | 8/2018 | Mathi et al. |
| 2018/0265298 A1 | 9/2018 | Wagner et al. |
| 2018/0273297 A1 | 9/2018 | Wagner et al. |
| 2018/0282066 A1 | 10/2018 | Wagner et al. |
| 2018/0305122 A1 | 10/2018 | Moulin et al. |
| 2018/0319594 A1 | 11/2018 | Blevins et al. |
| 2018/0330325 A1 | 11/2018 | Sibley |
| 2018/0346022 A1 | 12/2018 | Payeur |
| 2018/0354717 A1 | 12/2018 | Lindbo et al. |
| 2019/0047786 A1 | 2/2019 | Suzuki |
| 2019/0185267 A1 | 6/2019 | Mattern et al. |
| 2020/0122924 A1 | 4/2020 | Otto et al. |
| 2020/0143127 A1 | 5/2020 | Wagner et al. |
| 2020/0223633 A1 | 7/2020 | Stadie et al. |

FOREIGN PATENT DOCUMENTS

| | | |
|---|---|---|
| CA | 2795022 A1 | 10/2011 |
| CA | 2985166 A1 | 12/2016 |
| CN | 1033604 A | 7/1989 |
| CN | 1927673 A | 3/2007 |
| CN | 101553416 A | 10/2009 |
| CN | 102356367 A | 2/2012 |
| CN | 102390701 A | 3/2012 |
| CN | 102673964 A | 9/2012 |
| CN | 103381713 A | 11/2013 |
| CN | 103998358 A | 8/2014 |
| CN | 104105641 A | 10/2014 |
| CN | 104504358 A | 4/2015 |
| CN | 204250465 U | 4/2015 |
| CN | 104724430 A | 6/2015 |
| CN | 105059811 A | 11/2015 |
| CN | 105263832 A | 1/2016 |
| CN | 105270800 A | 1/2016 |
| CN | 105383906 A | 3/2016 |
| CN | 105417043 A | 3/2016 |
| CN | 105593143 A | 5/2016 |
| CN | 105593842 A | 5/2016 |
| CN | 105668255 A | 6/2016 |
| CN | 105730311 A | 7/2016 |
| CN | 105899398 A | 8/2016 |
| CN | 106232503 A | 12/2016 |
| CN | 205771308 U | 12/2016 |
| CN | 106276105 A | 1/2017 |
| CN | 106395225 A | 2/2017 |
| CN | 106575391 A | 4/2017 |
| CN | 106662874 A | 5/2017 |
| CN | 206186873 U | 5/2017 |
| CN | 206358714 U | 7/2017 |
| CN | 107054960 A | 8/2017 |
| CN | 107108122 A | 8/2017 |
| CN | 107161215 A | 9/2017 |
| CN | 107250004 A | 10/2017 |
| DE | 957200 C | 1/1957 |
| DE | 3124537 C1 | 2/1983 |
| DE | 19510392 A1 | 9/1996 |
| DE | 19633238 A1 | 2/1998 |

(56) References Cited

FOREIGN PATENT DOCUMENTS

| | | | |
|---|---|---|---|
| DE | 102008039764 A1 | 5/2010 |
| DE | 102010002317 A1 | 8/2011 |
| DE | 10009087 A1 | 9/2013 |
| DE | 102012102333 A1 | 9/2013 |
| DE | 102013100048 A1 | 5/2014 |
| DE | 102014111396 A1 | 2/2016 |
| EP | 0235488 A1 | 9/1987 |
| EP | 1695927 A2 | 8/2006 |
| EP | 2062837 A1 | 5/2009 |
| EP | 2308777 A1 | 4/2011 |
| EP | 2477914 B1 | 4/2013 |
| EP | 2607292 A1 | 6/2013 |
| EP | 2650237 A1 | 10/2013 |
| EP | 2745982 A2 | 6/2014 |
| EP | 2937299 A1 | 10/2015 |
| EP | 3112295 A1 | 1/2017 |
| FR | 2036682 A1 | 12/1970 |
| FR | 2174163 A1 | 10/1973 |
| FR | 2832654 A1 | 5/2003 |
| GB | 2085389 A | 4/1982 |
| GB | 2525309 A | 10/2015 |
| GB | 2539562 A | 12/2016 |
| GB | 2546583 A | 7/2017 |
| JP | S54131278 A | 10/1979 |
| JP | S63310406 A | 12/1988 |
| JP | H0395001 A | 4/1991 |
| JP | H08157016 A | 6/1996 |
| JP | 2003067053 A | 3/2003 |
| JP | 2007182286 A | 7/2007 |
| JP | 2008037567 A | 2/2008 |
| JP | 2010202291 A | 9/2010 |
| JP | 2016047744 A | 4/2016 |
| NO | 20150758 A1 | 12/2016 |
| WO | 03095339 A1 | 11/2003 |
| WO | 2005118436 A1 | 12/2005 |
| WO | 2007007354 A1 | 1/2007 |
| WO | 2007009136 A1 | 1/2007 |
| WO | 2008091733 A1 | 7/2008 |
| WO | 2009143335 A2 | 11/2009 |
| WO | 2010017872 A1 | 2/2010 |
| WO | 2011038442 A2 | 4/2011 |
| WO | 2011128384 A1 | 10/2011 |
| WO | 2012024714 A2 | 1/2012 |
| WO | 2012127102 A1 | 9/2012 |
| WO | 2014130937 A1 | 8/2014 |
| WO | 2014141313 A | 8/2014 |
| WO | 2014166650 A1 | 10/2014 |
| WO | 2015035300 A1 | 3/2015 |
| WO | 2015118171 A1 | 8/2015 |
| WO | 2015140216 A1 | 9/2015 |
| WO | 2016172253 A1 | 10/2016 |
| WO | 20160136795 A | 11/2016 |
| WO | 2016198565 A1 | 12/2016 |
| WO | 2017036780 A1 | 3/2017 |
| WO | 2017064401 A1 | 4/2017 |
| WO | 2017081281 A1 | 5/2017 |
| WO | 2017148939 A1 | 9/2017 |
| WO | 2017148963 A1 | 9/2017 |
| WO | 2017150006 A1 | 9/2017 |

OTHER PUBLICATIONS

Communication pursuant to Article 94(3) EPC issued by the European Patent Office in related European Patent Application No. 18717184.8 on Nov. 11, 2021, 4 pages.
Communication pursuant to Article 94(3) EPC issued by the European Patent Office in related European Patent Application No. 18718031.0 on Nov. 11, 2021, 4 pages.
Communication pursuant to Article 94(3) EPC issued by the European Patent Office in related European Patent Application No. 18807152.6 on Aug. 24, 2022, 4 pages.
Communication pursuant to Article 94(3) EPC issued by the European Patent Office in related European Patent Application No. 18716070.0 on Sep. 2, 2022, 4 pages.
Communication pursuant to Article 94(3) EPC issued by the European Patent Office in related European Patent Application No. 18807761.4 on Aug. 25, 2022, 6 pages.
Communication pursuant to Article 94(3) EPC issued by the European Patent Office in related European Patent Application No. 18807476.9 on Aug. 24, 2022, 4 pages.
Communication pursuant to Article 94(3) EPC issued by the European Patent Office in related European Patent Application No. 18807477.7 on Aug. 24, 2022, 4 pages.
Communication pursuant to Article 94(3) EPC issued by the European Patent Office in related European Patent Application No. 18717184.8 on Nov. 18, 2022, 3 pages.
Communication pursuant to Article 94(3) EPC issued in related European Patent Application No. 18804772.4 by the European Patent Office on Jul. 26, 2022, 5 pages.
Communication pursuant to Article 94(3) EPC issued in related European Patent Application No. 18804759.1 by the European Patent Office on Jul. 26, 2022, 5 pages.
Communication pursuant to Rules 161(1) and 162 EPC issued by the European Patent Office on Oct. 29, 2019 in related European Patent Application No. 18716070.0, 3 pages.
Communication pursuant to Rules 161(1) and 162 EPC issued by the European Patent Office in related European Patent Application No. 18807152.6 on Jun. 4, 2020, 3 pages.
Communication pursuant to Rules 161(1) and 162 EPC issued by the European Patent Office in related European Patent Application No. 18804759.1 on Jun. 4, 2020, 3 pages.
Communication pursuant to Rules 161(1) and 162 EPC issued by the European Patent Office in related European Patent Application No. 18807476.9 on Jun. 4, 2020, 3 pages.
Communication pursuant to Rules 161(1) and 162 EPC issued by the European Patent Office in related European Patent Application No. 18807477.7 on Jun. 4, 2020, 3 pages.
Communication pursuant to Rules 161(1) and 162 EPC issued by the European Patent Office in related European Patent Application No. 18807761.4 on Jun. 5, 2020, 3 pages.
Communication pursuant to Rules 161(1) and 162 EPC issued by the European Patent Office in related European Patent Application No. 18804772.4 on Jun. 4, 2020, 3 pages.
Communication pursuant to Rules 161(1) and 162EPC issued by the European Patent Office on Oct. 30, 2019 in related European Patent Application No. 18717184.8, 3 pages.
Communication pursuant to Rules 161(1) and 162EPC issued by the European Patent Office on Oct. 30, 2019 in related European Patent Application No. 18718031.0, 3 pages.
Examiner's Report issued by the Canadian Intellectual Property Office in related Canadian Patent Application No. 3,080,514 on Oct. 27, 2022, 4 pages.
Examiner's Report issued by the Canadian Intellectual Property Office in related Canadian Patent Application No. 3,080,616 on Nov. 1, 2022, 5 pages.
Examiner's Report issued by the Innovation, Science and Economic Development Canada in related Canadian Patent Application No. 3,057,313 on Nov. 30, 2020, 3 pages.
Examiner's Report issued by the Innovation, Science and Economic Development Canada in related Canadian Patent Application No. 3,057,367 on Dec. 1, 2020, 3 pages.
Examiner's Report issued by the Innovation, Science and Economic Development Canada in related Canadian Patent Application No. 3,056,892 on Dec. 14, 2020, 3 pages.
Examiner's Report issued by the Innovation, Science and Economic Development Canada (Canadian Intellectual Property Office) in related Canadian Patent Application No. 3,076,511 on May 5, 2021, 4 pages.
Examiner's Report issued by the Innovation, Science and Economic Development Canada (Canadian Intellectual Property Office) in related Canadian Patent Application No. 3,076,514 on May 28, 2021, 7 pages.
Examiner's Report issued by the Innovation, Science and Economic Development Canada (Canadian Intellectual Property Office) in related Canadian Patent Application No. 3,080,514 on Jun. 2, 2021, 4 pages.

(56) References Cited

OTHER PUBLICATIONS

Examiner's Report issued by the Innovation, Science and Economic Development Canada (Canadian Intellectual Property Office) in related Canadian Patent Application No. 3,080,616 on Jun. 28, 2021, 5 pages.
Examiner's Report issued by the Innovation, Science and Economic Development Canada (Canadian Intellectual Property Office) in related Canadian Patent Application No. 3,080,615 on Jun. 21, 2021, 4 pages.
Examiner's Report issued by the Innovation, Science and Economic Development Canada (Canadian Intellectual Property Office) in related Canadian Patent Application No. 3,056,892 on Oct. 1, 2021, 4 pages.
Examiner's Report issued by the Innovation, Science and Economic Development Canada (Canadian Intellectual Property Office) in related Canadian Patent Application No. 3,076,511 on Jan. 4, 2022, 4 pages.
Examiner's Report issued by the Innovation, Science and Economic Development Canada (Canadian Intellectual Property Office) in related Canadian Patent Application No. 3,078,778 on Jan. 26, 2022, 4 pages.
Examiner's Report issued by the Innovation, Science and Economic Development Canada (Canadian Intellectual Property Office) in related Canadian Patent Application No. 3,080,615 on May 27, 2022, 3 pages.
Final Office Action issued by the United States Patent and Trademark Office in related U.S. Appl. No. 16/171,310 on Sep. 30, 2020, 8 pages.
Final Office Action issued by the United States Patent and Trademark Office in related U.S. Appl. No. 16/171,303 on Feb. 11, 2021, 14 pages.
Final Office Action issued by the United States Patent and Trademark Office in related U.S. Appl. No. 16/172,231 on Jul. 29, 2021, 15 pages.
First Office Action, and its English translation, issued by the China National Intellectual Property Administration issued in related Chinese Patent Application No. 201880019478.5 on Aug. 25, 2020, 18 pages.
Form PTO-892, Notices of References Cited, issued by the United States Patent and Trademark Office in related U.S. Appl. No. 16/952,428 on Oct. 20, 2022, 1 page.
International Preliminary Report on Patentability issued by the International Bureau of WIPO in related International Application No. PCT/US2018/023339 on Sep. 24, 2019, 7 pages.
International Preliminary Report on Patentability issued by the International Bureau of WIPO in related International Application No. PCT/US2018/057600 on Apr. 28, 2020, 7 pages.
International Preliminary Report on Patentability issued by the International Bureau of WIPO in related International Application No. PCT/US2018/057770 on Apr. 28, 2020, 8 pages.
International Preliminary Report on Patentability issued by the International Bureau of WIPO in related International Application No. PCT/US2018/057607 on Apr. 28, 2020, 11 pages.
International Preliminary Report on Patentability issued by the International Bureau of WIPO in related International Application No. PCT/US2018/057795 on Apr. 28, 2020, 11 pages.
International Preliminary Report on Patentability issued by the International Bureau of WIPO in related International Application No. PCT/US2018/057807 on Apr. 28, 2020, 11 pages.
International Preliminary Report on Patentability issued by the International Bureau of WIPO in related International Application No. PCT/US2018/057788 on Apr. 28, 2020, 6 pages.
International Preliminary Report on Patentability issued by the International Bureau of WIPO on Sep. 24, 2019 in related international application No. PCT/US2018/023836, 7 pages.
International Preliminary Report on Patentability issued by the International Bureau of WIPO on Sep. 24, 2019 in related international application No. PCT/US2018/024065, 8 pages.

International Search Report and Written Opinion issued by the International Searching Authority, the European Patent Office, in related International Patent Application PCT/US2018/023836 mailed Jun. 27, 2018, 12 pages.
International Search Report and Written Opinion issued by the International Searching Authority, the European Patent Office, on Jun. 29, 2018 in related international application No. PCT/US2018/024065, 11 pages.
International Search Report and Written Opinion of the International Search Authority, the European Patent Office, in related International Application No. PCT/US2018/023339 issued on Jun. 18, 2018, 10 pages.
International Search Report and Written Opinion of the International Search Authority, the European Patent Office, in related International Application No. PCT/US2018/057600 issued on Feb. 18, 2019, 10 pages.
International Search Report and Written Opinion of the International Search Authority, the European Patent Office, in related International Application No. PCT/US2018/057788 issued on Feb. 18, 2018, 12 pages.
International Search Report and Written Opinion of the International Search Authority, the European Patent Office, in related International Application No. PCT/US2018/057607 issued on Apr. 5, 2019, 16 pages.
International Search Report and Written Opinion of the International Search Authority, the European Patent Office, in related International Application No. PCT/US2018/057770 issued on Feb. 18, 2019, 13 pages.
International Search Report and Written Opinion of the International Search Authority, the European Patent Office, in related International Application No. PCT/US2018/057807 issued on Apr. 25, 2019, 16 pages.
International Search Report and Written Opinion of the International Search Authority, the European Patent Office, in related International Application No. PCT/US2018/057795 issued on Apr. 12, 2019, 17 pages.
Non-Final Office Action issued by the U.S. Patent and Trademark Office in related U.S. Appl. No. 15/926,497 on Jun. 10, 2019, 8 pages.
Non-Final Office Action issued by the U.S. Patent and Trademark Office in related U.S. Appl. No. 15/926,497 on Dec. 11, 2019, 8 pages.
Non-Final Office Action issued by the U.S. Patent and Trademark Office in related U.S. Appl. No. 16/172,255 on Apr. 1, 2020, 6 pages.
Non-Final Office Action issued by the U.S. Patent and Trademark Office in related U.S. Appl. No. 16/171,310 on Jan. 9, 2020, 8 pages.
Non-Final Office Action issued by the U.S. Patent and Trademark Office in related U.S. Appl. No. 16/172,339 on Mar. 30, 2020, 16 pages.
Non-Final Office Action issued by the United States Patent and Trademark Office in related U.S. Appl. No. 16/172,353 on Jan. 4, 2021, 12 pages.
Non-Final Office Action issued by the United States Patent and Trademark Office in related U.S. Appl. No. 16/172,231 on Apr. 22, 2021, 11 pages.
Non-Final Office Action issued by the United States Patent and Trademark Office in related U.S. Appl. No. 16/739,670 on Oct. 28, 2021, 28 pages.
Non-Final Office Action issued by the United States Patent and Trademark Office in related U.S. Appl. No. 16/789,917 on Jan. 11, 2022, 34 pages.
Non-Final Office Action issued by the United States Patent and Trademark Office in related U.S. Appl. No. 17/210,627 on Sep. 14, 2022, 11 pages.
Non-Final Office Action issued by the United States Patent and Trademark Office in related U.S. Appl. No. 17/387,764 on Sep. 26, 2022, 6 pages.
Non-Final Office Action issued by the United States Patent and Trademark Office in related U.S. Appl. No. 17/313,549 on Mar. 1, 2023, 7 pages.

(56) References Cited

OTHER PUBLICATIONS

Non-Final Office Action issued by the United States Patent and Trademark Office in related U.S. Appl. No. 17/832,484 on Mar. 7, 2023, 7 pages.
Notice on the First Office Action and First Office Action, along with its English translation, issued by the China National Intellectual Property Administration issued in related Chinese Patent Application No. 201880032530.0 on Sep. 29, 2020, 23 pages.
Notice on the First Office Action and First Office Action, along with its English translation, issued by the China National Intellectual Property Administration issued in related Chinese Patent Application No. 201880032609.3 on Nov. 20, 2020, 20 pages.
Notice on the First Office Action and First Office Action, along with its English translation, issued by the China National Intellectual Property Administration issued in related Chinese Patent Application No. 201880069642.3 on Mar. 3, 2021, 19 pages.
Notice on the First Office Action and First Office Action, along with its English translation, issued by the China National Intellectual Property Administration issued in related Chinese Patent Application No. 201880069627.9 on Jan. 19, 2021, 12 pages.
Notice on the First Office Action and First Office Action, along with its English translation, issued by the China National Intellectual Property Administration issued in related Chinese Patent Application No. 201880069729.0 on Mar. 3, 2021, 16 pages.
Notice on the First Office Action and First Office Action, along with its English translation, issued by the China National Intellectual Property Administration issued in related Chinese Patent Application No. 201880069684.7 on Mar. 3, 2021, 14 pages.
Notice on the First Office Action and First Office Action, along with its English translation, issued by the China National Intellectual Property Administration issued in related Chinese Patent Application No. 201880069649.5 on Mar. 23, 2021, 23 pages.
Notice on the First Office Action and the First Office Action, along with its English translation, issued by the China National Intellectual Property Administration in related Chinese Patent Application No. 202210531402.9 on Mar. 30, 2023, 39 pages.
Notice on the First Office Action and the First Office Action, along with its English translation, issued by the China National Intellectual Property Administration in related Chinese Patent Application No. 202210440495.4 on Mar. 30, 2023, 29 pages.
Notice on the First Office Action issued by the China National Intellecutal Property Administration in related Chinese Patent Application No. 201880069726.7 on Feb. 26, 2023, 26 pages.
Notice on the First Office Action issued by the China National Intellecutal Property Administration in related Chinese Patent Application No. 202111514667.X on Mar. 30, 2023, 35 pages.
Notice on the First Office Action, along with its English translation, issued by the China National Intellectual Property Administration in related Chinese Patent Application No. 202210324018.1 on Mar. 30, 2023, 18 pages.
Notice on the First Office Action, and its English translation, issued by the China National Intellectual Property Administration in related Chinese Patent Application No. 202110762442.X on Jul. 4, 2022, 27 pages.
Notice on the Second Office Action and Second Office Action, along with its English translation, issued by the China National Intellectual Property Administration issued in related Chinese Patent Application No. 201880019478.5 on Apr. 20, 2021, 9 pages.
Notice on the Second Office Action and Second Office Action, along with its English translation, issued by the China National Intellectual Property Administration issued in related Chinese Patent Application No. 201880069627.9 on Aug. 18, 2021, 16 pages.
Notice on the Second Office Action and Second Office Action, along with its English translation, issued by the China National Intellectual Property Administration in related Chinese Patent Application No. 201880069642.3 on Oct. 20, 2021, 13 pages.
Notice on the Second Office Action and Second Office Action, along with its English translation, issued by the China National Intellectual Property Administration issued in related Chinese Patent Application No. 201880069649.5 on Nov. 18, 2021, 7 pages.
Notice on the Second Office Action and the Second Office Action, along with its English translation, issued by the China National Intellectual Property Administration in related Chinese Patent Application No. 201880032609.3 on Jun. 25, 2021, 7 pages.
Notice on the Third Office Action and Third Office Action, along with its English translation, issued by the China National Intellectual Property Administration issued in related Chinese Patent Application No. 201880019478.5 on Sep. 7, 2021, 10 pages.
Partial International Search Report and Written Opinion of the International Search Authority, the European Patent Office, in related International Application No. PCT/US2018/057607 issued on Feb. 11, 2018, 12 pages.
Partial International Search Report and Written Opinion of the International Search Authority, the European Patent Office, in related International Application No. PCT/US2018/057807 issued on Feb. 18, 2019, 13 pages.
Partial International Search Report and Written Opinion of the International Search Authority, the European Patent Office, in related International Application No. PCT/US2018/057795 issued on Feb. 18, 2019, 14 pages.
U.S. Non-Final Office Action issued by the U.S. Patent and Trademark Office on May 21, 2019 in related U.S. Appl. No. 15/934,462, 26 pages.
U.S. Non-Final Office Action issued by the U.S. Patent and Trademark Office on Jul. 27, 2020 in related U.S. Appl. No. 16/171,303, 13 pages.
U.S. Non-Final Office Action issued in related U.S. Appl. No. 15/928,977 mailed Apr. 23, 2019, 20 pages.
Non-Final Office Action issued by the United States Patent and Trademark Office in related U.S. Appl. No. 18/099,573 on May 30, 2023, 8 pages.
First Office Action, and its English translation, issued by the China National Intellectual Property Administration issued in related Chinese Patent Application No. 202210535569.2 on Mar. 27, 2023, 31 pages.
Communication pursuant to Article 94(3) EPC issued by the European Patent Office in related European Patent Application No. 18804759.1 on Jan. 12, 2024, 4 pages.
Communication pursuant to Article 94(3) EPC issued by the European Patent Office in related European Patent Application No. 18716070.0 on Jan. 12, 2024, 3 pages.
Communication pursuant to Article 94(3) EPC issued by the European Patent Office in related European Patent Application No. 18807152.6 on Jan. 12, 2024, 5 pages.
Communication pursuant to Article 94(3) EPC issued by the European Patent Office in related European Patent Application No. 18807761.4 on Jan. 12, 2024, 6 pages.
Communication pursuant to Article 94(3) EPC issued by the European Patent Office in related European Patent Application No. 18807476.9 on Jan. 12, 2024, 4 pages.
Communication pursuant to Article 94(3) EPC issued by the European Patent Office in related European Patent Application No. 18807477.7 on Jan. 12, 2024, 8 pages.
Communication pursuant to Article 94(3) EPC issued by the European Patent Office in related European Patent Application No. 18804772.4 on Jan. 12, 2024, 4 pages.
Non-Final Office Action issued by the United States Patent and Trademark Office in related U.S. Appl. No. 17/840,123 on Nov. 14, 2023, 14 pages.
Non-Final Office Action issued by the United States Patent and Trademark Office in related U.S. Appl. No. 17/478,402 on Jan. 30, 2024, 13 pages.
Notice on Grant of Patent Right for Invention, along with its English translation, issued by the China National Intellectual Property Administration in related Chinese Patent Application bno. 202111514667.X on Oct. 16, 2023, 8 pages.
Notice on the Second Office Action issued by the China National Intellectual Property Administration in related Chinese Patent Application No. 202210535569.2 on Dec. 11, 2023, 8 pages.
Notice on the Second Office Action, along with its English translation, issued by the China National Intellectual Property Administration in related Chinese Patent Application No. 202210440495.4 on Sep. 21, 2023, 10 pages.

(56) References Cited

OTHER PUBLICATIONS

Notice on the Second Office Action, along with its English translation, issued by the China National Intellectual Property Administration in related Chinese Patent Application No. 201880069726.7 on Oct. 21, 2023, 20 pages.

Notice on the Second Office Action, along with its English translation, issued by the China National Intellectual Property Administration in related Chinese Patent Application No. 202210531402.9 on Oct. 25, 2023, 40 pages.

Non-Final Office Action issued by the United States Patent and Trademark Office in related U.S. Appl. No. 18/368,585 on Apr. 5, 2024, 10 pages.

Non-Final Office Action issued by the United States Patent and Trademark Office in related U.S. Appl. No. 17/478,405 on May 7, 2024, 9 pages.

\* cited by examiner

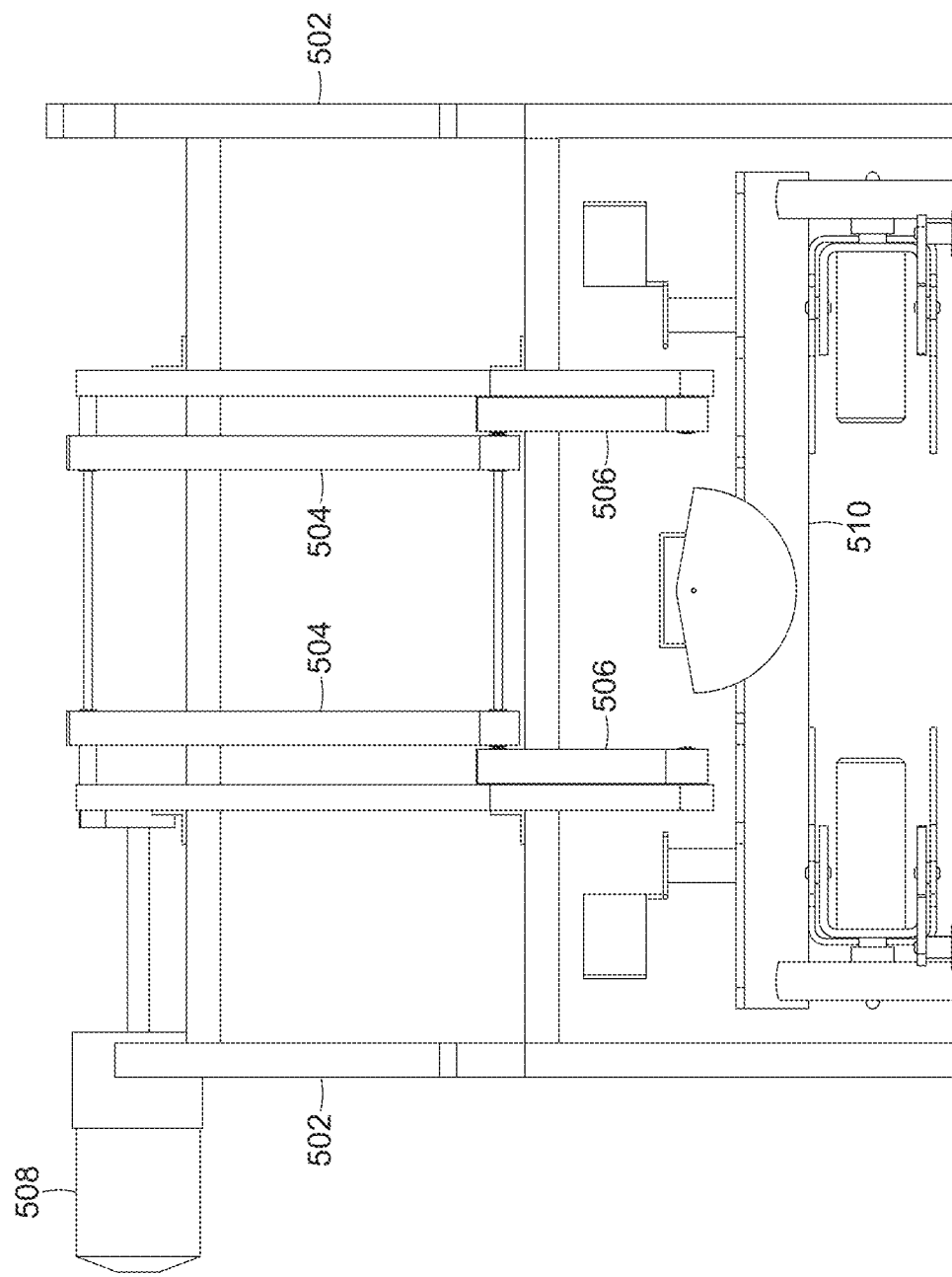

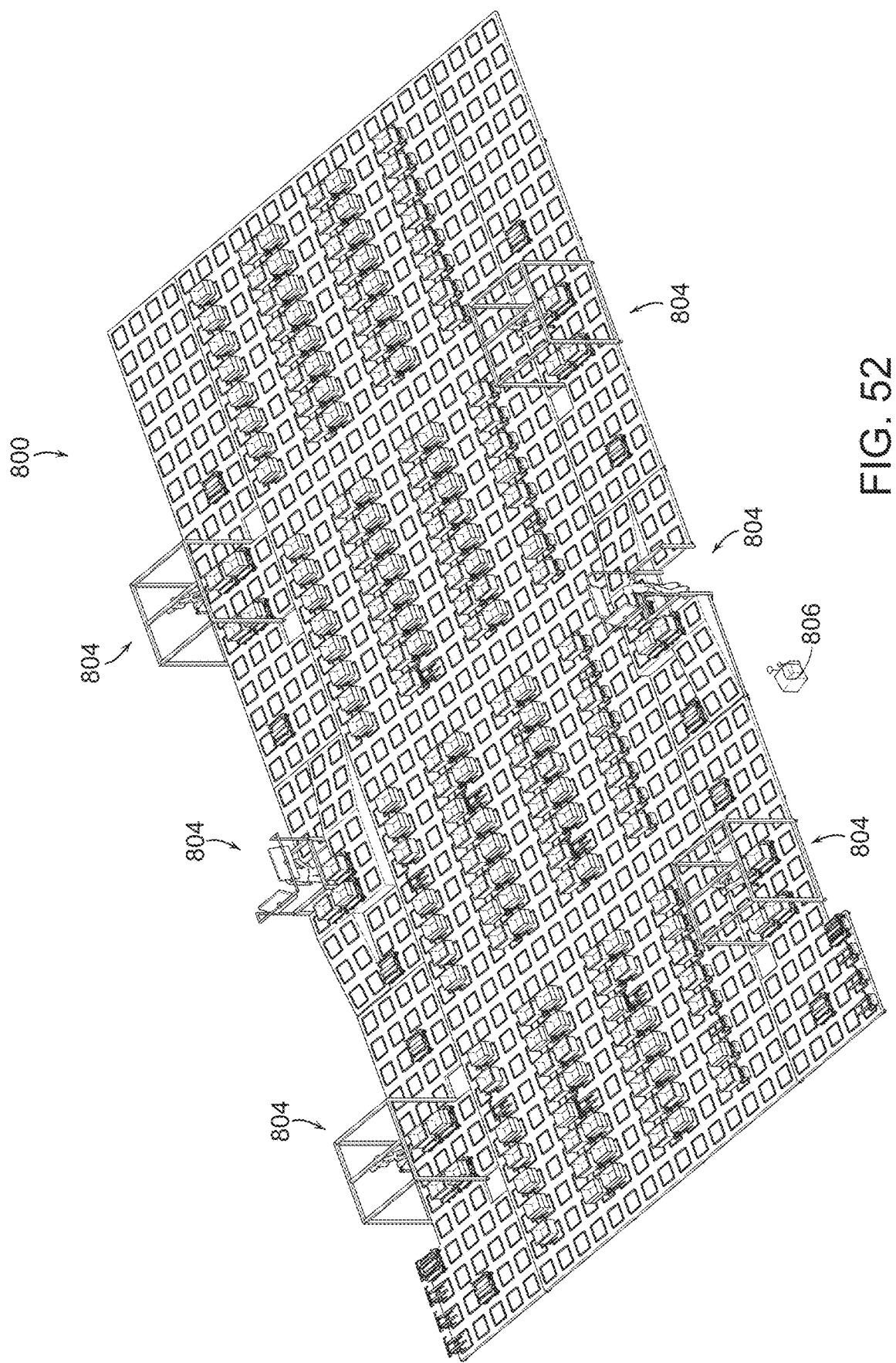

MAINTENANCE SYSTEMS FOR USE IN SYSTEMS AND METHODS FOR PROCESSING OBJECTS INCLUDING MOBILE MATRIX CARRIER SYSTEMS

PRIORITY

The present application is a continuation of U.S. patent application Ser. No. 17/210,627, filed Mar. 24, 2021, now U.S. Pat. No. 11,661,275, issued May 30, 2023, which is a continuation of U.S. patent application Ser. No. 16/172,339, filed Oct. 26, 2018, now U.S. Pat. No. 10,988,323, issued Apr. 27, 2021, which claims priority to each of U.S. Provisional Patent Application Ser. No. 62/578,030, filed Oct. 27, 2017, U.S. Provisional Patent Application Ser. No. 62/641,640, filed Mar. 12, 2018, and U.S. Provisional Patent Application Ser. No. 62/681,409 filed Jun. 6, 2018, the disclosures of all of which are hereby incorporated by reference in their entireties.

BACKGROUND

The invention generally relates to object processing systems, and relates in particular to robotic and other object processing systems for, e.g., sorting objects, for storing and retrieving objects, and for redistributing objects for a variety of purposes where the systems are intended to be used in dynamic environments requiring the systems to accommodate the processing of a variety of objects.

Current distribution center processing systems, for example, generally assume an inflexible sequence of operations whereby a disorganized stream of input objects is first singulated into a single stream of isolated objects presented one at a time to a scanner that identifies the object. An induction element (e.g., a conveyor, a tilt tray, or manually movable bins) transport the objects to the desired destination or further processing station, which may be a bin, a chute, a bag or a conveyor, etc.

In certain sortation systems for example, human workers or automated systems typically retrieve parcels in an arrival order, and sort each parcel or object into a collection bin based on a set of given heuristics. For instance, all objects of like type might go to a collection bin, or all objects in a single customer order, or all objects destined for the same shipping destination, etc. The human workers or automated systems might be required to receive objects and to move each to their assigned collection bin. If the number of different types of input (received) objects is large, a large number of collection bins is required.

Such a system has inherent inefficiencies as well as inflexibilities since the desired goal is to match incoming objects to assigned collection bins. Such systems may require a large number of collection bins (and therefore a large amount of physical space, large capital costs, and large operating costs) in part, because sorting all objects to all destinations at once is not clearly straightforward or efficient.

In particular, when automating sortation of objects, there are a few main things to consider: 1) the overall system throughput (parcels sorted per hour), 2) the number of diverts (i.e., number of discrete locations to which an object can be routed), 3) the total area of sortation system (square feet), and 4) the annual costs to run the system (man-hours, electrical costs, cost of disposable components).

Current state-of-the-art sortation systems rely on human labor to some extent. Most solutions rely on a worker that is performing sortation, by scanning an object from an induction area (chute, table, etc.) and placing the object in a staging location, conveyor, or collection bin. When a bin is full or the controlling software system decides that it needs to be emptied, another worker empties the bin into a bag, box, or other container, and sends that container on to the next processing step. Such a system has limits on throughput (i.e., how fast can human workers sort to or empty bins in this fashion) and on number of diverts (i.e., for a given bin size, only so many bins may be arranged to be within efficient reach of human workers).

Other partially automated sortation systems involve the use of recirculating conveyors and tilt trays, where the tilt trays receive objects by human sortation, and each tilt tray moves past a scanner. Each object is then scanned and moved to a pre-defined location assigned to the object. The tray then tilts to drop the object into the location. Further partially automated systems, such as the bomb-bay style recirculating conveyor, involve having doors that open on the bottom of each tray at the time that the tray is positioned over a predefined chute, and the object is then dropped from the tray into the chute. Again, the objects are scanned while in the tray, which assumes that any identifying code is visible to the scanner.

Such partially automated systems are lacking in key areas. As noted, these conveyors have discrete trays that can be loaded with an object; they then pass through scan tunnels that scan the object and associate it with the tray in which it is riding. When the tray passes the correct bin, a trigger mechanism causes the tray to dump the object into the bin. A drawback with such systems however, is that every divert requires an actuator, which increases the mechanical complexity and the cost per divert can be very high.

An alternative is to use human labor to increase the number of diverts, or collection bins, available in the system. This decreases system installation costs, but increases the operating costs. Multiple cells may then work in parallel, effectively multiplying throughput linearly while keeping the number of expensive automated diverts at a minimum. Such diverts do not identify a bin and cannot divert it to a particular spot, but rather they work with beam breaks or other sensors to seek to ensure that indiscriminate bunches of objects get appropriately diverted. The lower cost of such diverts coupled with the low number of diverts keep the overall system divert cost low.

Unfortunately, these systems do not address the limitations to total number of system bins. The system is simply diverting an equal share of the total objects to each parallel manual cell. Thus each parallel sortation cell must have all the same collection bins designations; otherwise an object might be delivered to a cell that does not have a bin to which that object is mapped.

Automated storage and retrieval systems (AS/RS), for example, generally include computer controlled systems for automatically storing (placing) and retrieving items from defined storage locations. Traditional AS/RS typically employ totes (or bins), which are the smallest unit of load for the system. In these systems, the totes are brought to people who pick individual items out of the totes. When a person has picked the required number of items out of the tote, the tote is then re-inducted back into the AS/RS.

In these systems, the totes are brought to a person, and the person may either remove an item from the tote or add an item to the tote. The tote is then returned to the storage location. Such systems, for example, may be used in libraries and warehouse storage facilities. The AS/RS involves no processing of the items in the tote, as a person processes the objects when the tote is brought to the person. This separation of jobs allows any automated transport system to do what it is good at—moving totes—and the person to do what the person is better at—picking items out of cluttered totes. It also means the person may stand in one place while the transport system brings the person totes, which increases the rate at which the person can pick goods.

There are limits however, on such conventional systems in terms of the time and resources required to move totes toward and then away from each person, as well as how quickly a person can process totes in this fashion in applications where each person may be required to process a large number of totes. There remains a need for a more efficient and more cost effective object sortation system that sorts objects of a variety of sizes and weights into appropriate collection bins or trays of fixed sizes, yet is efficient in handling objects of such varying sizes and weights.

SUMMARY

In accordance with an embodiment, the invention provides a maintenance system for assisting in maintaining an automated carrier system for moving objects to be processed. The maintenance system includes a plurality of automated carriers that are adapted to move on an array of discontinuous standard track sections, each said automated carrier including a carrier body that is no larger in either a length or width direction than a standard track section, and an automated maintenance carrier that is adapted to move on the array of discontinuous track sections, said automated maintenance system including a maintenance body that is larger in at least one of a length or width direction than the standard track section.

In accordance with another embodiment, the invention provides a maintenance system for assisting in maintaining an automated carrier system for moving objects to be processed. The maintenance system includes an automated maintenance carrier that is adapted to move on an array of discontinuous track sections, said automated maintenance carrier including a maintenance body that is larger in at least one of a length or width direction than the standard track section, and includes maintenance hardware specially adapted to provide maintenance to the array of discontinuous track sections.

In accordance with a further embodiment, the invention provides a method of providing maintenance of an automated carrier system for moving objects to be processed. The method includes the steps of providing a plurality of automated carriers that are adapted to move on an array of discontinuous standard track sections, each said automated carrier including a carrier body that is no larger in either a length or width direction than a standard track section and providing an automated maintenance carrier that is adapted to move on the array of discontinuous track sections, said automated maintenance carrier including a maintenance body that is larger in at least one of a length or width direction than the standard track section.

BRIEF DESCRIPTION OF THE DRAWINGS

The following description may be further understood with reference to the accompanying drawings in which:

FIG. 40 shows an illustrative diagrammatic end view of the bin infeed/outfeed system of FIG. 39;

FIG. 52 shows an illustrative diagrammatic view of a multi-processing stage system in accordance with a further embodiment of the present invention that demonstrates the scalable nature of the system.

The drawings are shown for illustrative purposes only.

DETAILED DESCRIPTION

The invention generally relates in certain embodiments to object processing systems in which objects are carried in initial bins (or totes) in a preprocessed state and are carried in processed bins (or boxes) in a post-processed state by a variety of carriers that are able to move about a common track system. In certain embodiments, the track system includes discontinuous tiles, and the carriers include two sets of wheels that are able to pivot (together with each wheel's motor) about 90 degrees to provide movement in two orthogonal directions and without rotating the carrier. As herein used, the term bin includes initial bins (including pre-processed objects), processed bins (including post-processed objects), empty bins, boxes, totes and/or even objects themselves that are large enough to be carried by one or more carriers.

Figure 1:
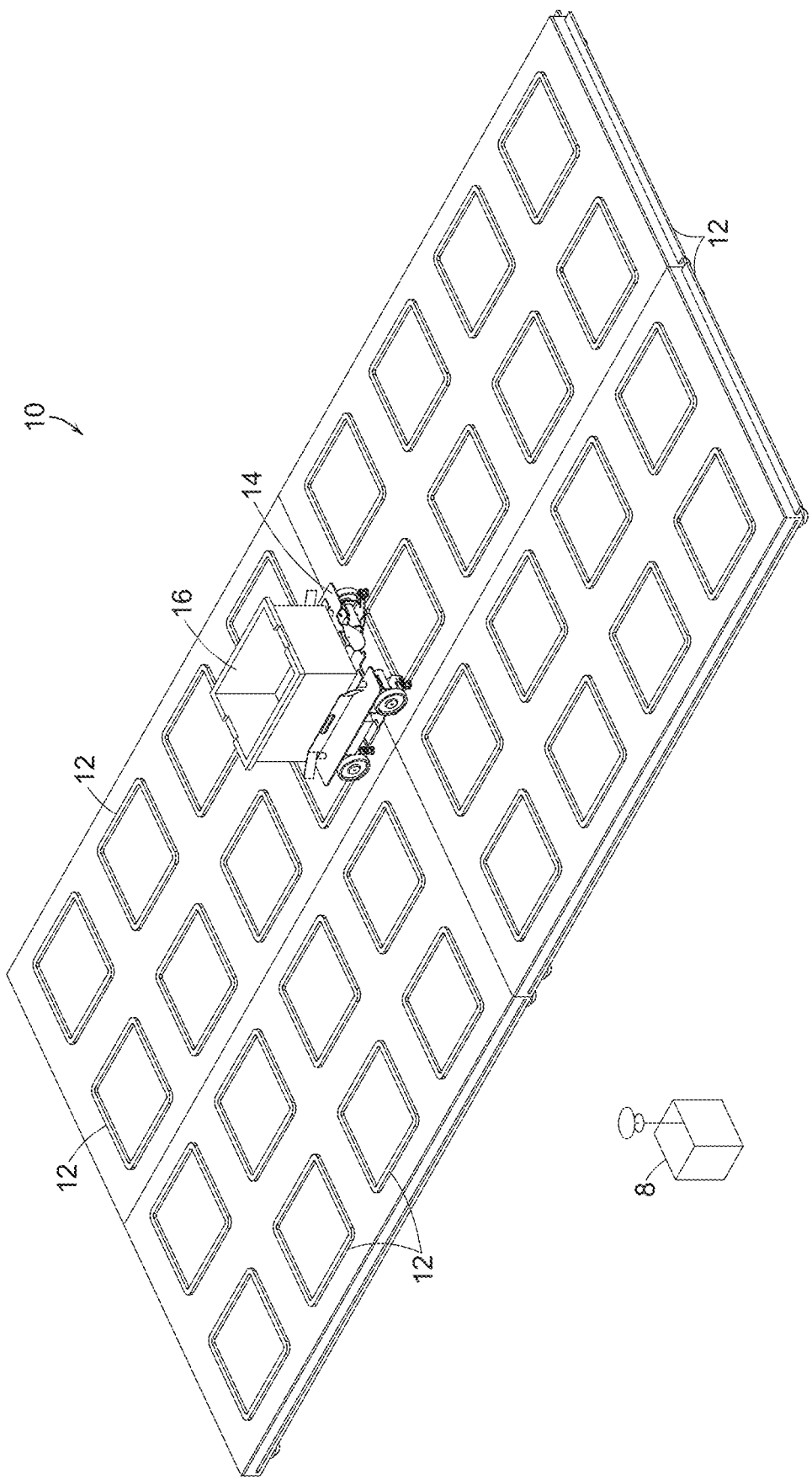
FIG. 1 shows an illustrative diagrammatic view of a system in accordance with an embodiment of the present invention.
Figure 2:
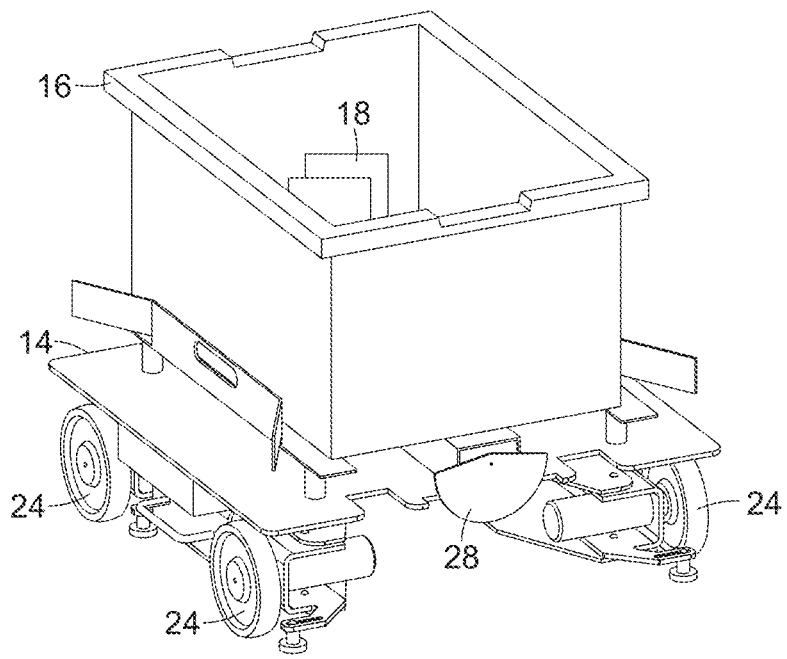
FIG. 2 shows an illustrative diagrammatic view of the bin on the carrier in the system of FIG. 1.
Figure 3:
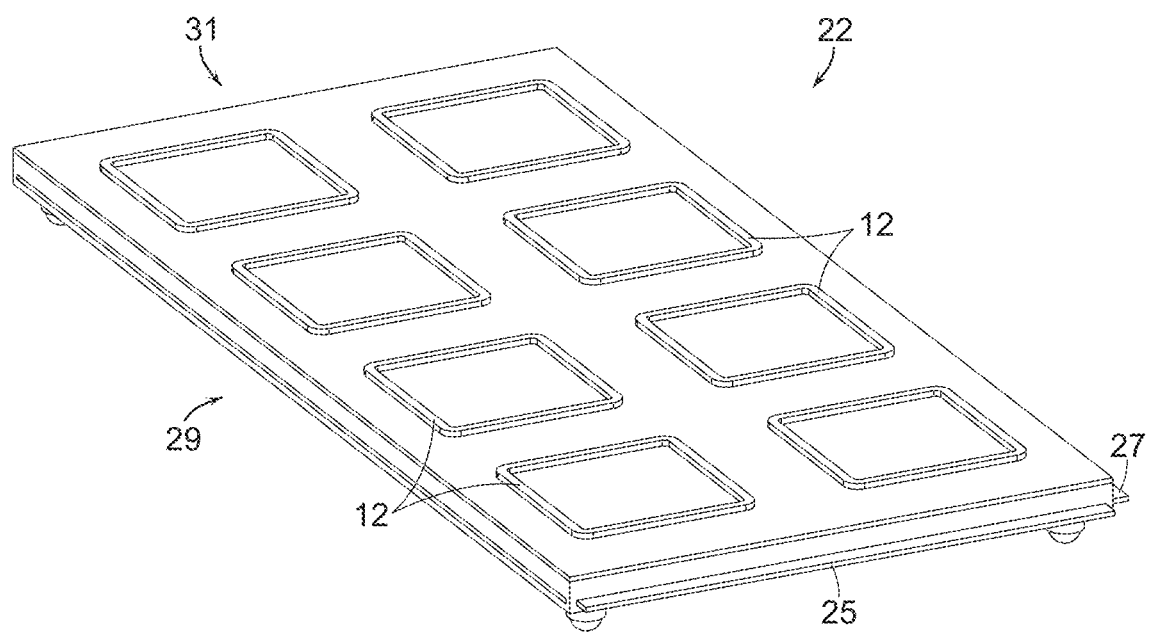
FIG. 3 shows an illustrative diagrammatic view of a track unit in the system of FIG. 1.

FIG. 1 shows a system 10 that is formed of multiple track modules (one track module is shown in FIG. 3), and each track module includes a plurality of track sections 12. The system also includes one or more mobile carrier units 14 that carry a bin 16 as shown in FIGS. 1 and 2, where the carrier unit 14 rides on the track sections 12. Each track section 12 is generally in the form of a raised square with rounded edges, and the track segments 12 are generally closely spaced from each other (e.g., within a length or width of a mobile carrier unit 14). With reference to FIG. 2, each mobile carrier unit 14 may include support features for supporting a bin 16 that may contain objects 18 to be processed or that have been processed. A computer processor 8 may control the movement of each carrier unit 14 by wireless communication, as well as all system operations as discussed further below. The track sections 12 may also include sensors (as discussed further below) for detecting when each carrier unit 14 is positioned about each individual track section 12.

FIG. 3 shows a track module 22 that includes multiple track sections 12 on a frame 23 such that when multiple frames are joined together, the spacing of the adjacent track sections 12 is consistent throughout the larger array. Each module 22 includes two sides with protruding connection edges 25, 27, and two sides with (only one is shown) connection recesses 29 for receiving the connection edges of adjacent modules. One or the other to the protruding edges 25, 27 and the recesses 29, 31 may be magnetic to secure the connection between adjacent modules.

Figure 4:
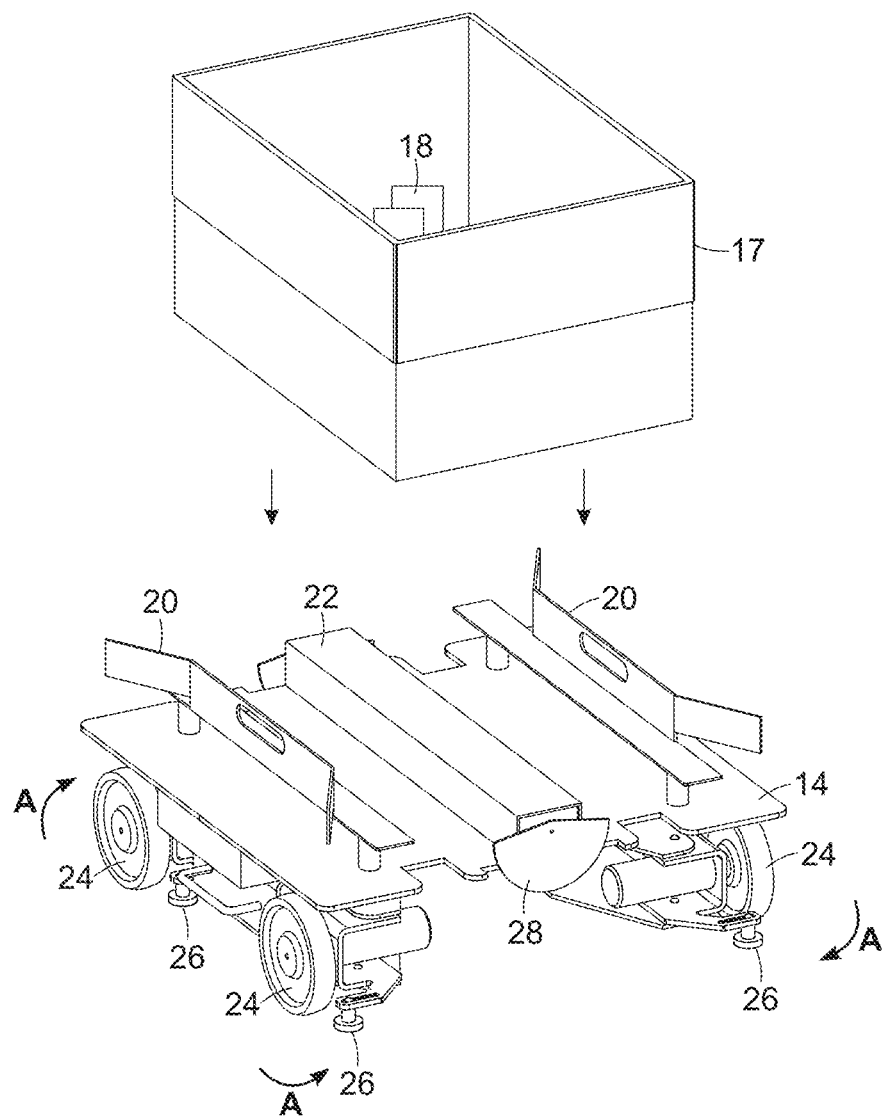
FIG. 4 shows an illustrative diagrammatic view of the bin and carrier of FIG. 2.

With reference to FIG. 4, each mobile carrier unit 14 includes a pair of guide rails 20 that contain the bin 16, as well as a raised region 22 that raises the bin sufficient for there to be room on either side of the raised region for shelf forks to engage the bin as will be further discussed below. Each carrier unit 14 also includes four wheel assemblies 24 that each include guides 26 for following the track sections. Each of the wheel assemblies is pivotally mounted such that each wheel assembly may pivot 90 degrees as generally shown at A in FIG. 4 and is further discussed below. Each carrier unit 14 also includes a pair of paddles 28 on either end of the unit 14. Each paddle may be turned either upward to contain a bin on the unit 14, or turned downward to permit a bin to be loaded onto or removed from the unit 14 as will also be discussed in more detail below.

Figure 5A:
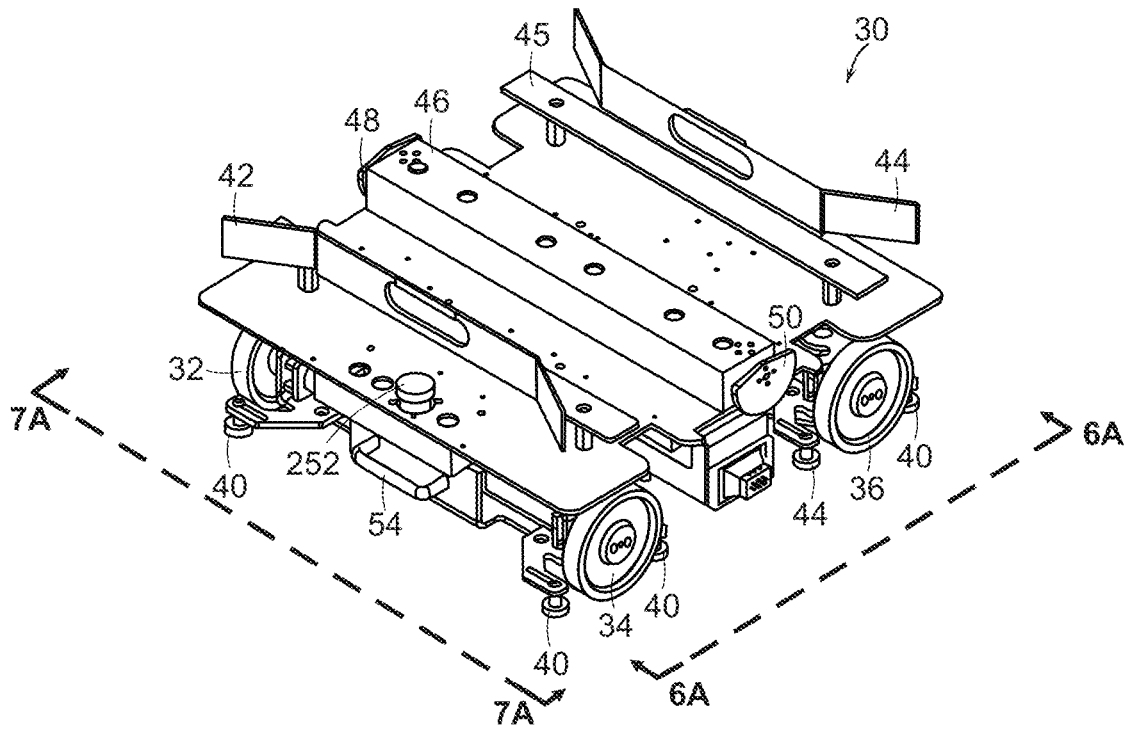
FIGS. 5A and 5B show illustrative diagrammatic views of the carrier of FIG. 1 with wheel units rotated in each of two different directions.
Figure 5B:
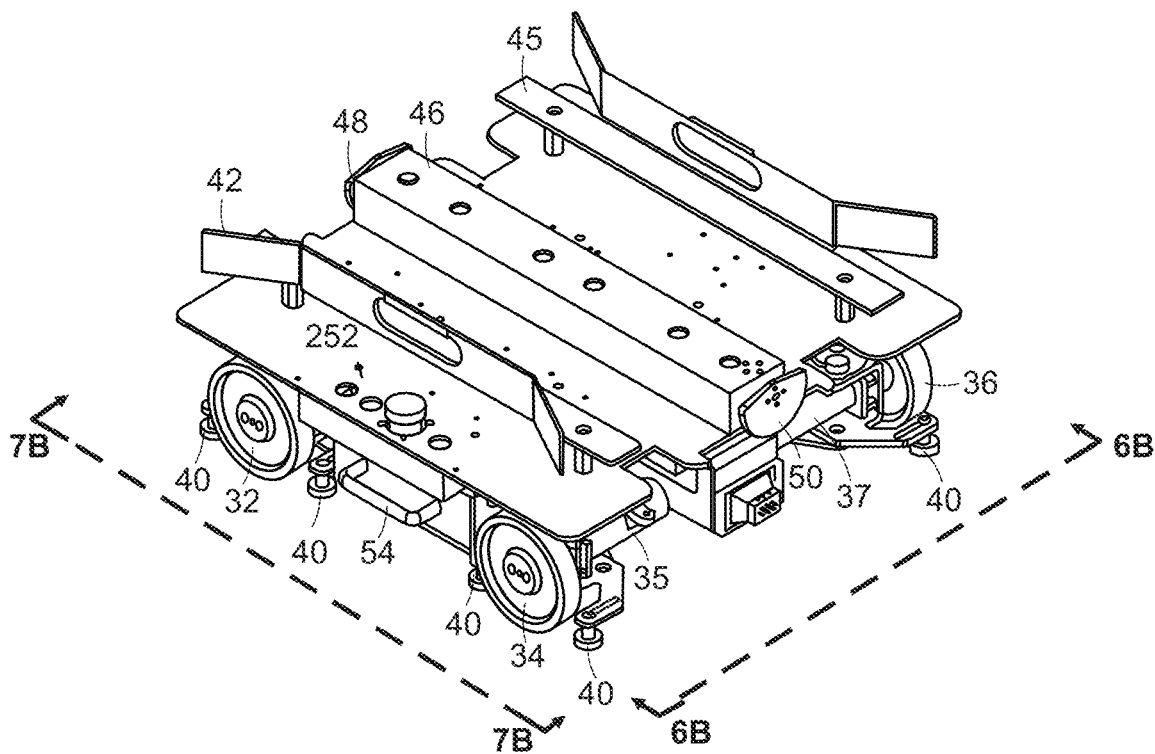
Figure 6A:
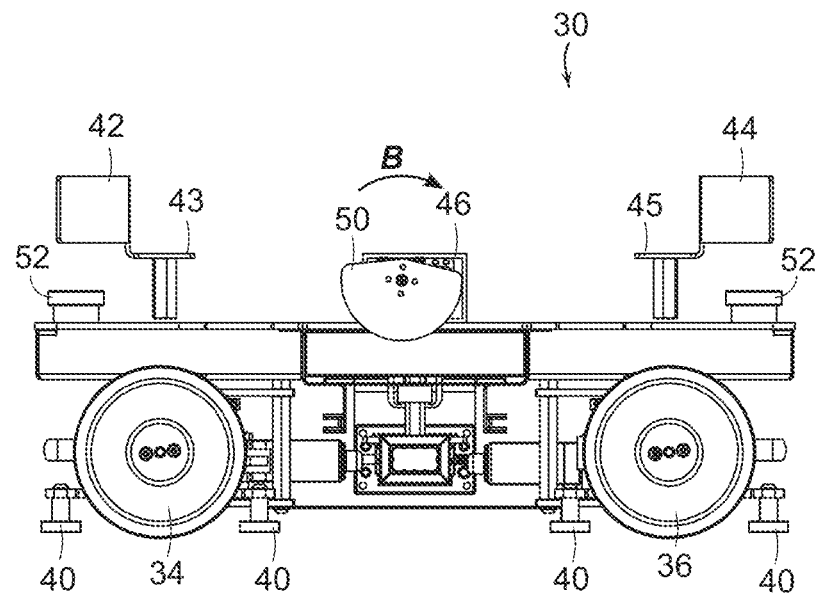
FIGS. 6A and 6B show illustrative diagrammatic views of the carrier of FIGS. 5A and 5B, taken along lines 6A-6A and 6B-6B thereof respectively.
Figure 6B:
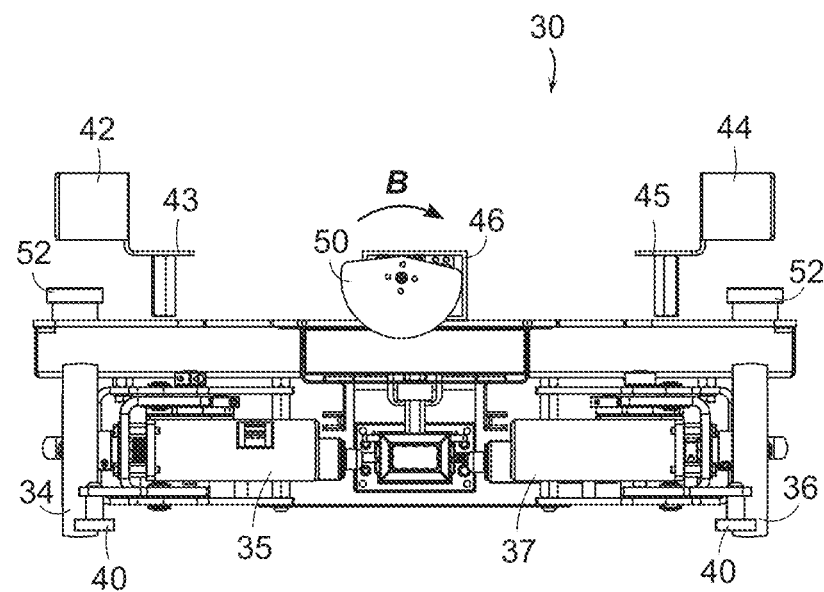
Figure 7A:
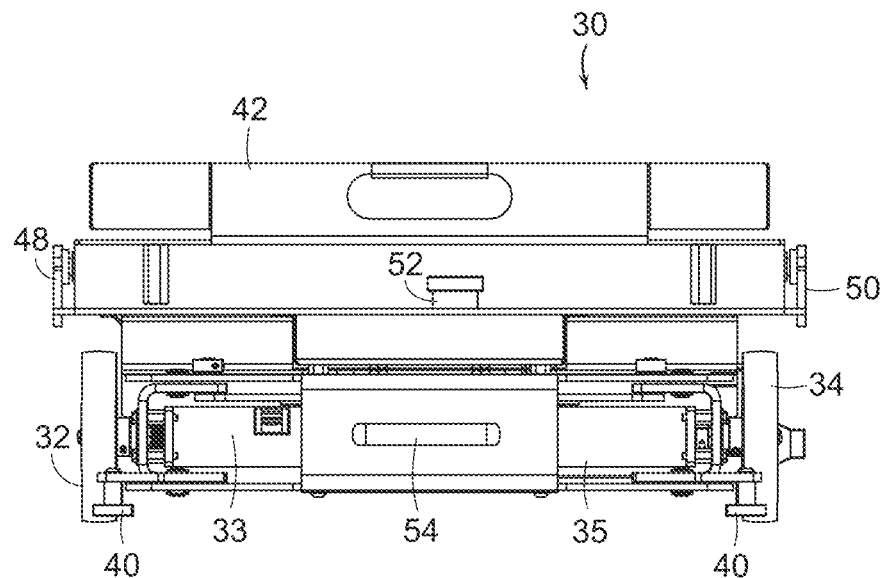
FIGS. 7A and 7B show illustrative diagrammatic side views of the carrier of FIG. 1 with the wheel units rotated in each of two different directions.
Figure 7B:
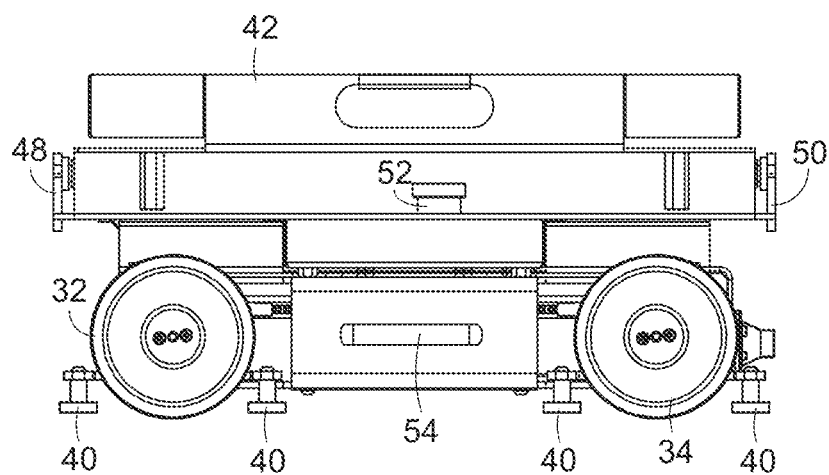
Figure 9B:
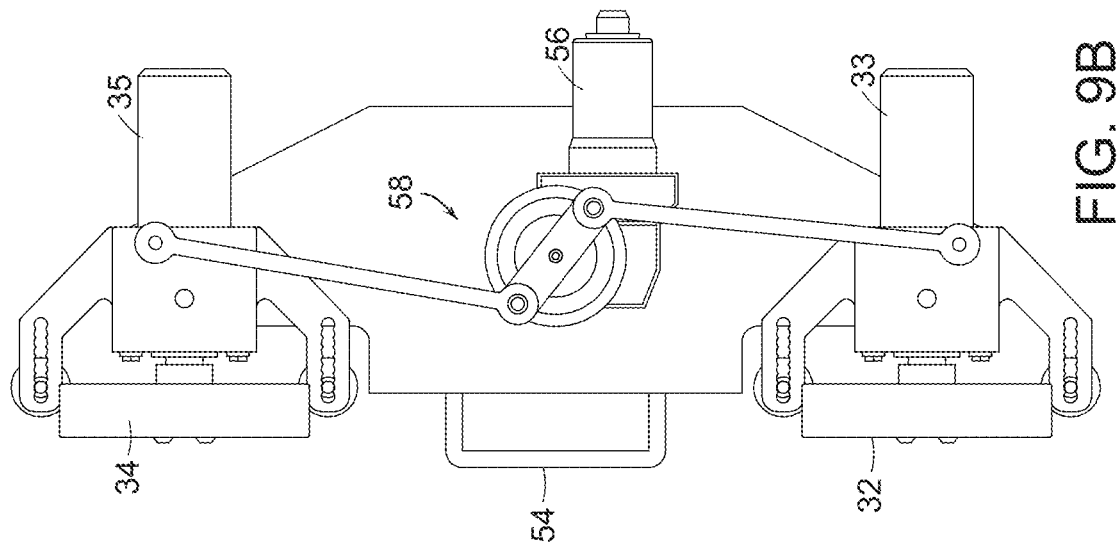
FIGS. 9A and 9B show illustrative diagrammatic views of a pair of wheel units of the carrier of FIG. 1 with the wheel units in the pair rotated in each of two different directions.

In accordance with certain embodiments therefore, the invention provides a plurality of mobile carriers that may include swivel mounted wheels that rotate ninety degrees to cause each mobile carrier to move forward and backward, or to move side to side. When placed on a grid, such mobile carriers may be actuated to move to all points on the grid. FIGS. 5A and 5B, for example, show a mobile carrier 30 that includes wheels 32, 34, 36 and 38 (shown in FIGS. 9A and 9B). Each of the wheels is mounted on a motor 33, 35, 37, 39 (as best shown in FIG. 9B), and the wheel and motor units are pivotally mounted to the carrier 30 as discussed in more detail below. The wheel assemblies (each including a wheel, its motor and guide rollers 40) are shown in one position in FIG. 5A, and are shown in a second pivoted position in FIG. 5B. FIG. 6A shows an end view of the carrier 30 taken along lines 6A-6A of FIG. 5A, and FIG. 6B shows an end view of the carrier 30 taken along lines 6B-6B of FIG. 5B. Similarly, FIG. 7A shows a side view of the carrier 30 taken along lines 7A-7A of FIG. 5A, and FIG. 7B shows a side view of the carrier 30 taken along lines 7B-7B of FIG. 5B.

Each carrier 30 also includes a pair of opposing rails 42, 44 for retaining a bin, as well as a raised center portion 46 and stands 43, 45 on which a bin may rest. A pair of independently actuated paddles 48, 50 are also provided. Each paddle 48, 50 may be rotated upward (as shown at B in FIG. 6A) to retain a bin on the carrier, or may be rotated downward to permit a bin to be moved onto or off of a carrier. The paddles 48, 50 are shown rotated downward in FIGS. 5A-7B.

Figure 13:
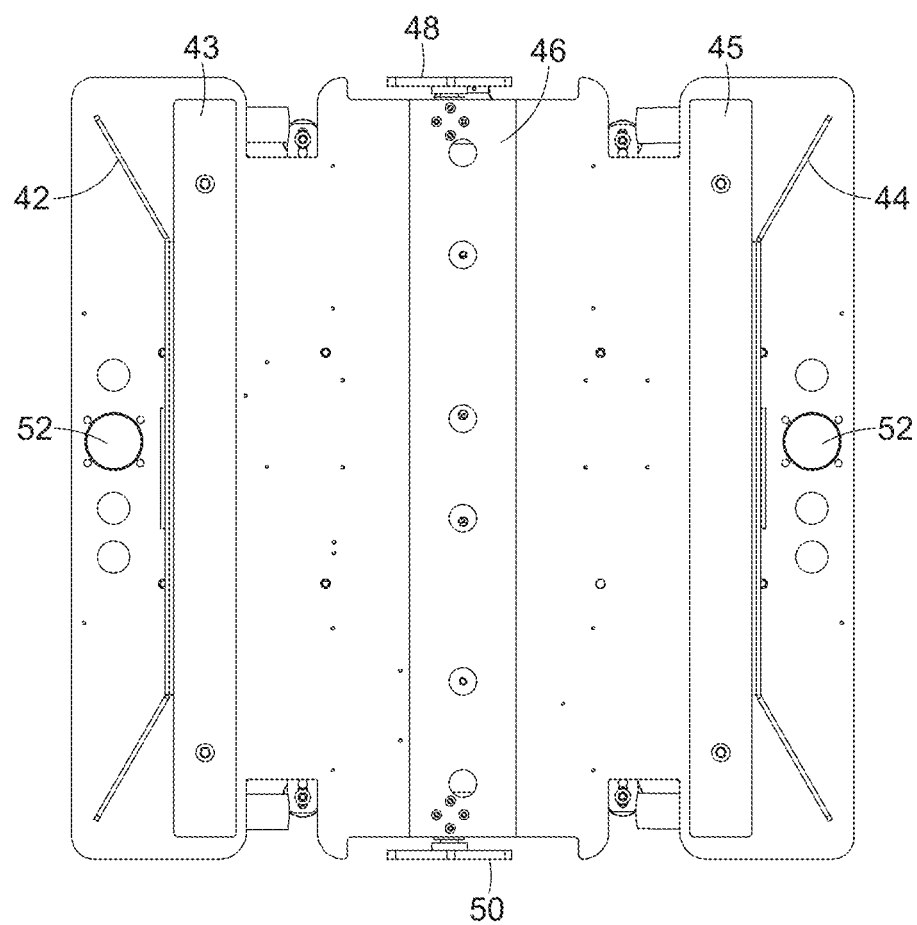
FIG. 13 shows an illustrative diagrammatic top view of the carrier of FIG. 1.

Note that the orientation of the carrier 30 (also a bin on the carrier) does not change when the carrier changes direction. Again, a bin may be provided on the top side of the carrier, and may be contained by bin rails 42, 44 on the sides, as well as actuable paddles 48, 50. As will be discussed in further detail below, each paddle 48, 50 may be rotated 180 degrees to either urge a bin onto or off of a shelf, or (if both are actuated) to retain a bin on the carrier during transport. Each paddle may therefore be used in concert with movement of the carrier to control movement of the bin with respect to the carrier 30. For example, when a paddle is flipped into an upward position, it may be used to urge the bin onto a shelf or rack while the carrier is moving toward the shelf or rack. Each carrier may also include one or more emergency stop switches 52 for a person to use to stop the movement of a carrier in an emergency, as well as handles 54 to enable a person to lift the carrier if needed. FIG. 13 shows a top view of the carrier 30.

Figure 8A:
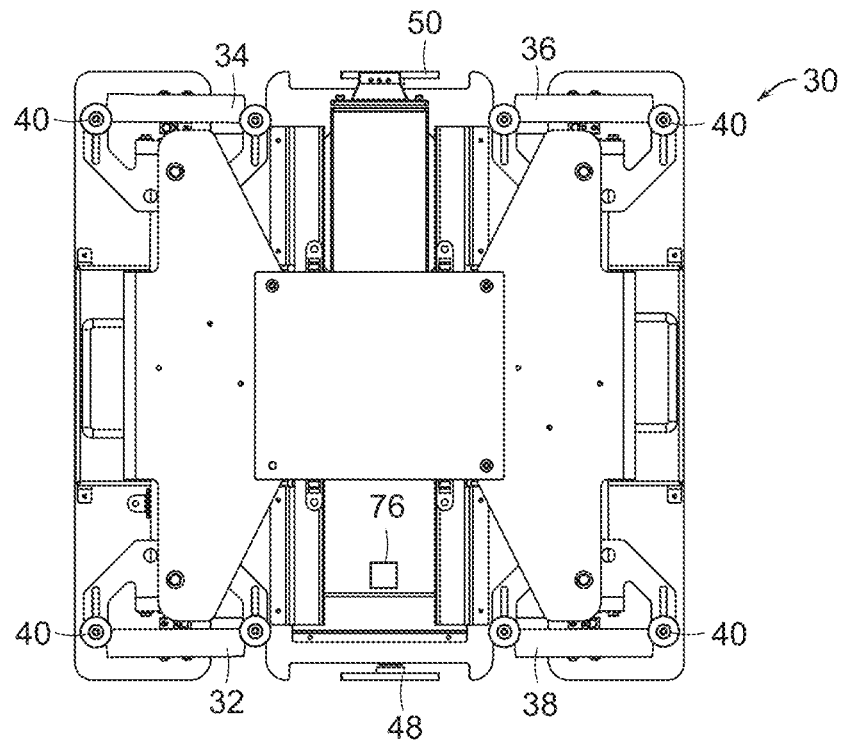
FIGS. 8A and 8B show illustrative diagrammatic bottom views of the carrier of FIG. 1 with the wheel units rotated in each of two different directions.
Figure 8B:
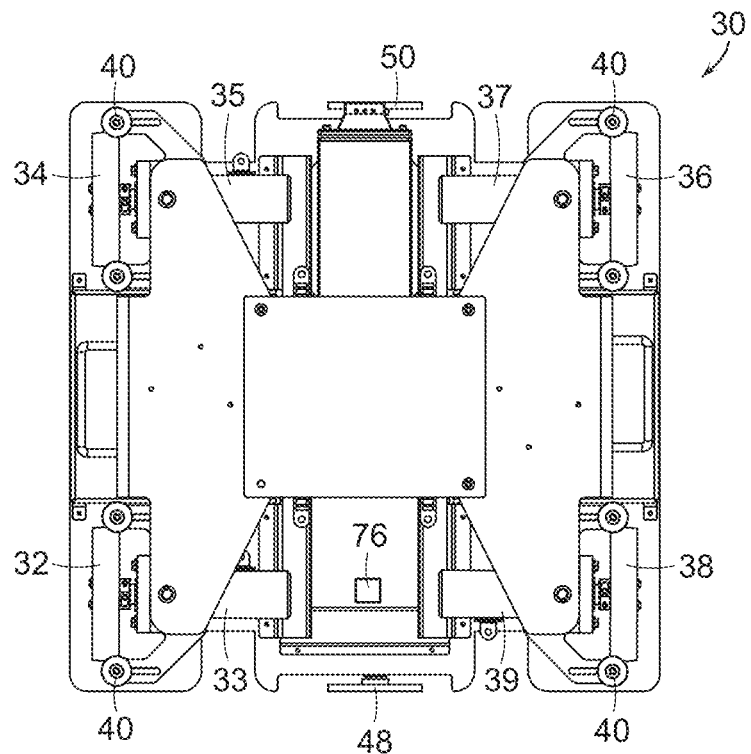
Figure 9A:
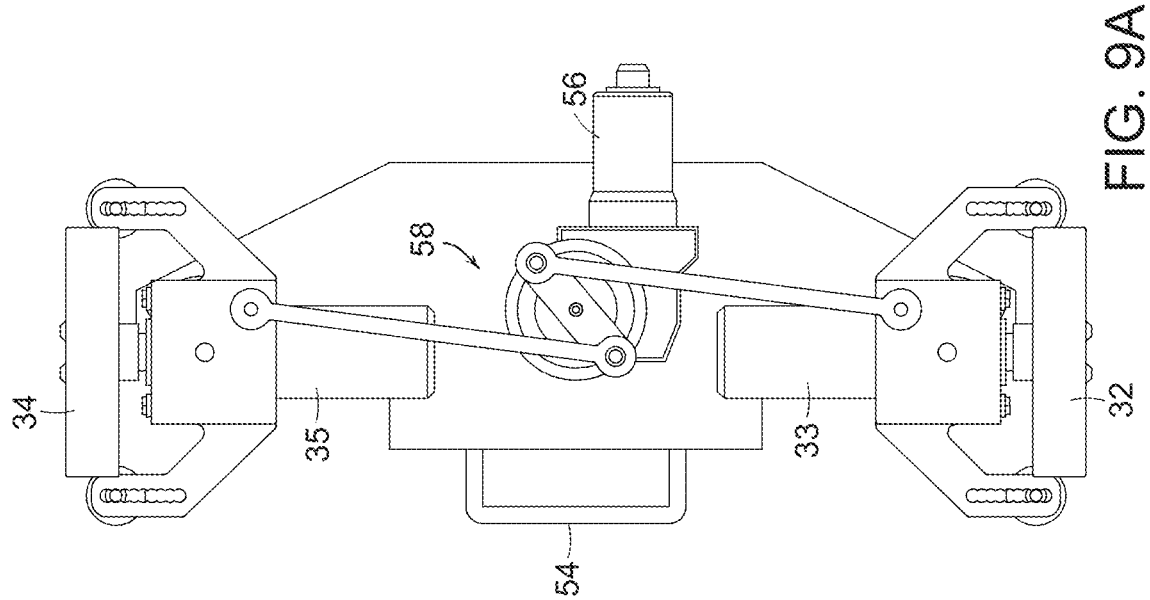
Figure 10A:
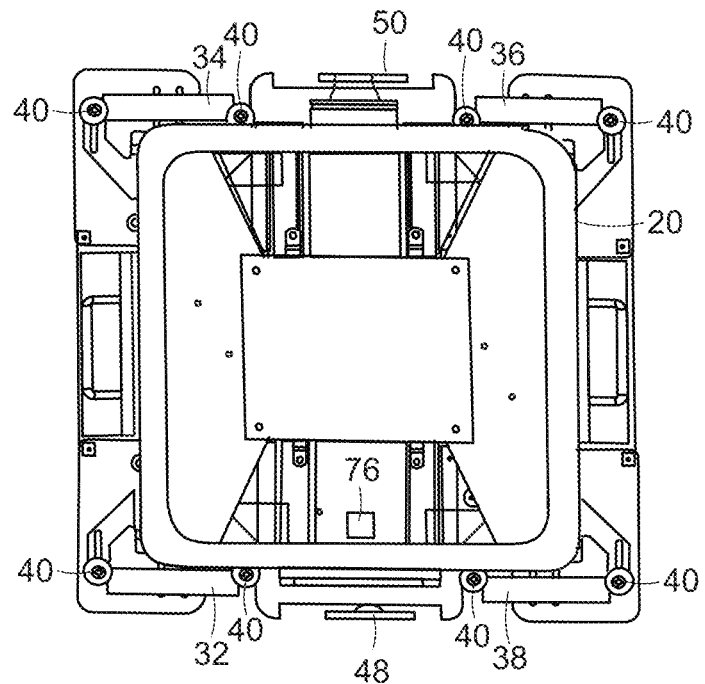
FIGS. 10A and 10B show illustrative diagrammatic bottom views of the carrier of FIGS. 8A and 8B together with a track section.
Figure 10B:
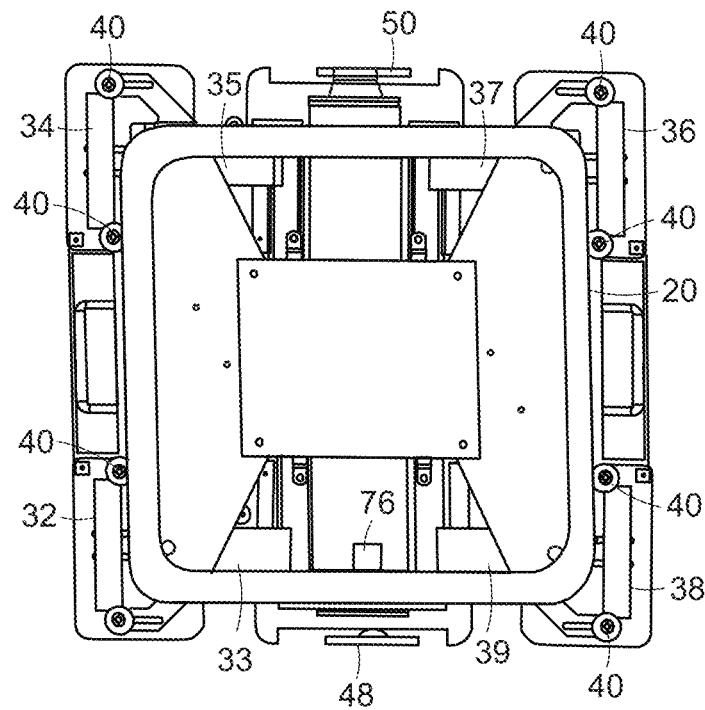

FIG. 8A shows a bottom view of the carrier 30 with the wheels in the position as shown in FIG. 5A, and FIG. 8B shows a bottom view of the carrier 30 with the wheels in the position as shown in FIG. 5B. FIGS. 8A and 8B show all of the wheels 32, 34, 36 and 38, and each of the motors 33, 35, 37 and 39 is also shown in FIG. 8B. As may be seen in FIGS. 8A and 8B, the entire wheel assemblies including the wheel, guide rollers and the wheel motor, each pivot as a unit. With reference to FIGS. 9A and 9B, each pair of wheel assemblies may, in an embodiment, be pivoted by a common pivot motor 56 that is coupled to the wheel assemblies via linkages 58. In further embodiments, each wheel assembly may be pivoted by individual motors, or the pivoting wheel may be provided in a passive joint and pivoted by the driving actions of the individual wheel motors. FIG. 9A shows a pair of wheel assemblies in a position as shown in FIG. 5A, and FIG. 9B shows the pair of wheel assemblies in a position as shown in FIG. 5B. The wheel assemblies are designed to be able to pivot the wheels around corners of a track section when the carrier is directly above a track section. FIGS. 10A and 10B show views similar to the underside views of FIGS. 8A and 8B but with a track section 12 superimposed on the Figures to show the relation of the wheel positions to the track section. Note that the wheels pivot around each of the corners of the track section. When the carrier is centered over the track section, therefore, the wheels may be pivoted such that the carrier may move in a direction that is orthogonal to a prior direction without requiring that the carrier itself be turned. The orientation of the carrier is therefore maintained constant while the carrier is moved about an array of tracks sections.

Figure 11A:
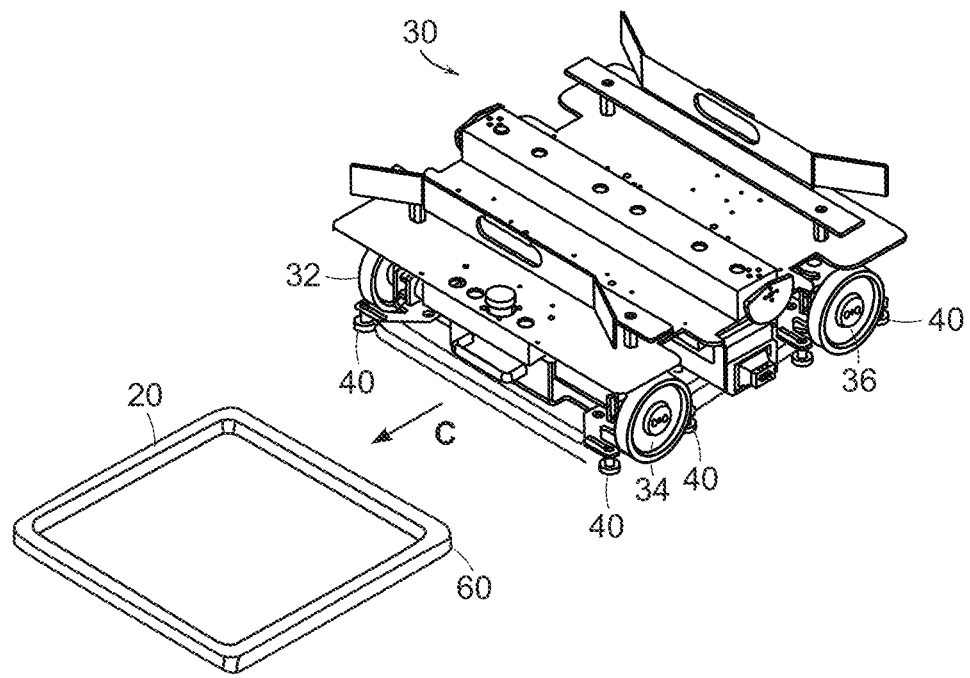
FIGS. 11A-11C show illustrative diagrammatic views of a carrier approaching, contacting and engaging a track section in accordance with an embodiment of the present invention.
Figure 11B:
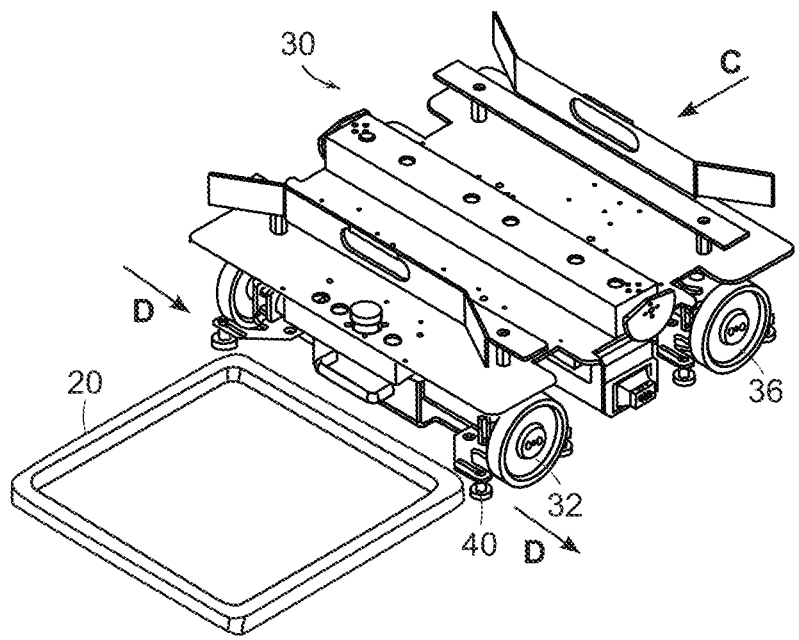

The movement of the carrier 30 about an array of track sections is further discussed below with regard to FIGS. 11A-11C. In short as a carrier leaves one track section, it travels toward an adjacent track section, and if at all misaligned, will realign itself. The realignment of the guide rollers and the tracks may function as follows. While the two sets of wheels (32, 34 and 36, 38) may be designed to move the carrier 30 in a linear direction only, some variations may occur. The tracks 12 are positioned, though intermittently, close enough to each other than when a carrier leaves one track and moves toward another 12 (as shown at C), its potential variation off course will be small enough that the rounded corners of the next adjacent track will urge the carrier back on course. Each track section may be rectangular in shape (e.g., may be square). For example, FIG. 11A shows a carrier 30 leaving a track and beginning to approach a next track 12 as the carrier moves in a direction as indicated at C. As shown in FIG. 11B, if the alignment of the carrier 30 is off (possibly from variations in the wheels or the mounting of the wheels, the placement of the track sections or any other variable), one of the rounded corners 60 of next adjacent track 12 will become engaged by an on-coming guide roller 40, and the rounded corner 60 will cause the carrier 30 to move slightly in a direction (as shown at D) perpendicular to the direction C to correct the direction of movement of the carrier 30. If the misalignment is too far off, the carrier may reverse direction and try to become again aligned, or may stop moving and be rescued as discussed below in connection with FIG. 30. If a carrier does stop moving, the directions of movement of the other carriers are programmed to avoid the area of the stopped carrier until it is removed. If an area results in a number of stopped carriers over time, the alignment of the track(s) in the area may be examined and/or replaced.

Figure 11C:
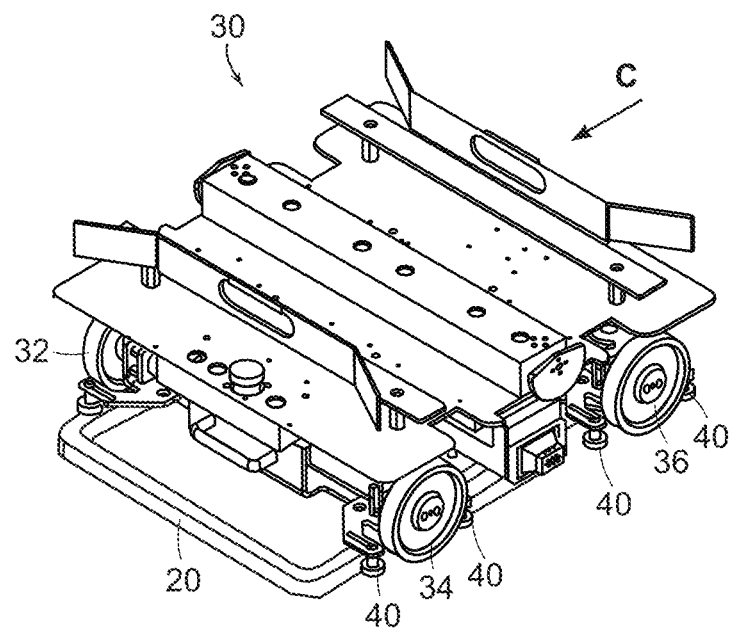
Figure 12:
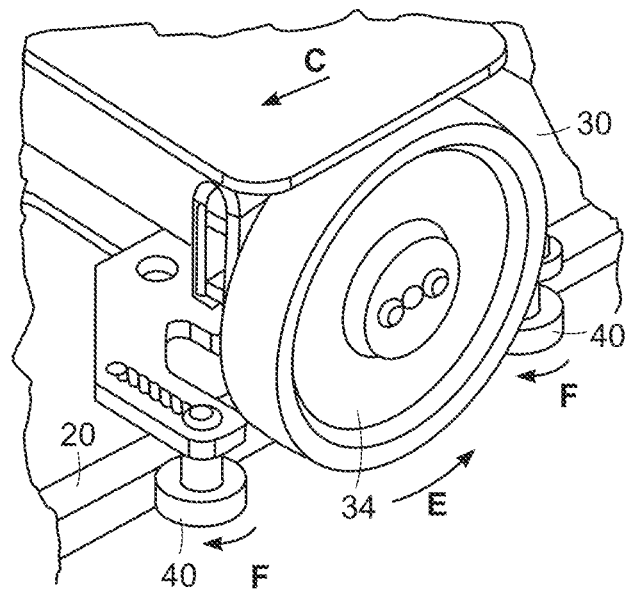
FIG. 12 shows an illustrative diagrammatic enlarged view of a wheel in the carrier of FIG. 11C.

FIG. 11C shows the carrier 30 moving in a direction C as properly realigned by the track 12. FIG. 12 shows a close up view of the wheel 34 moving in a direction as shown at E to cause the carrier to move in the direction C, and further shows that the guide rollers 40 roll against the track 12 in directions as shown at F. The guide rollers 40 do not touch the ground (as does the wheel 34), but simply guide the direction of the carrier 30 by being urged against the track 12. In further embodiments, biasing means such as springs, elastics or pneumatics may be used to urge the guide rollers against the track, and in further embodiments, the tracks may be more triangular shaped at the edges to further facilitate reception of the carriers. If too much correction is required, however, the system may be operating inefficiently.

Systems of the invention therefore provide for traversing the automated carrier in any one of four directions aligned with the track grid, allowing bidirectional column and row travel on the grid. One pivot motor may be used for each pair of wheels, with a linkage to pivot the wheel modules. In other embodiments, one pivot motor and linkage could be used for all four wheels, or each wheel may have an independent pivot actuator. The system allows the wheels to follow rectangular (e.g., square) track sections by pivoting around rounded corners of the track sections. The system does not require differential drive line/trajectory following, and keeps the orientation of the carrier fixed throughout all operations.

Figure 14:
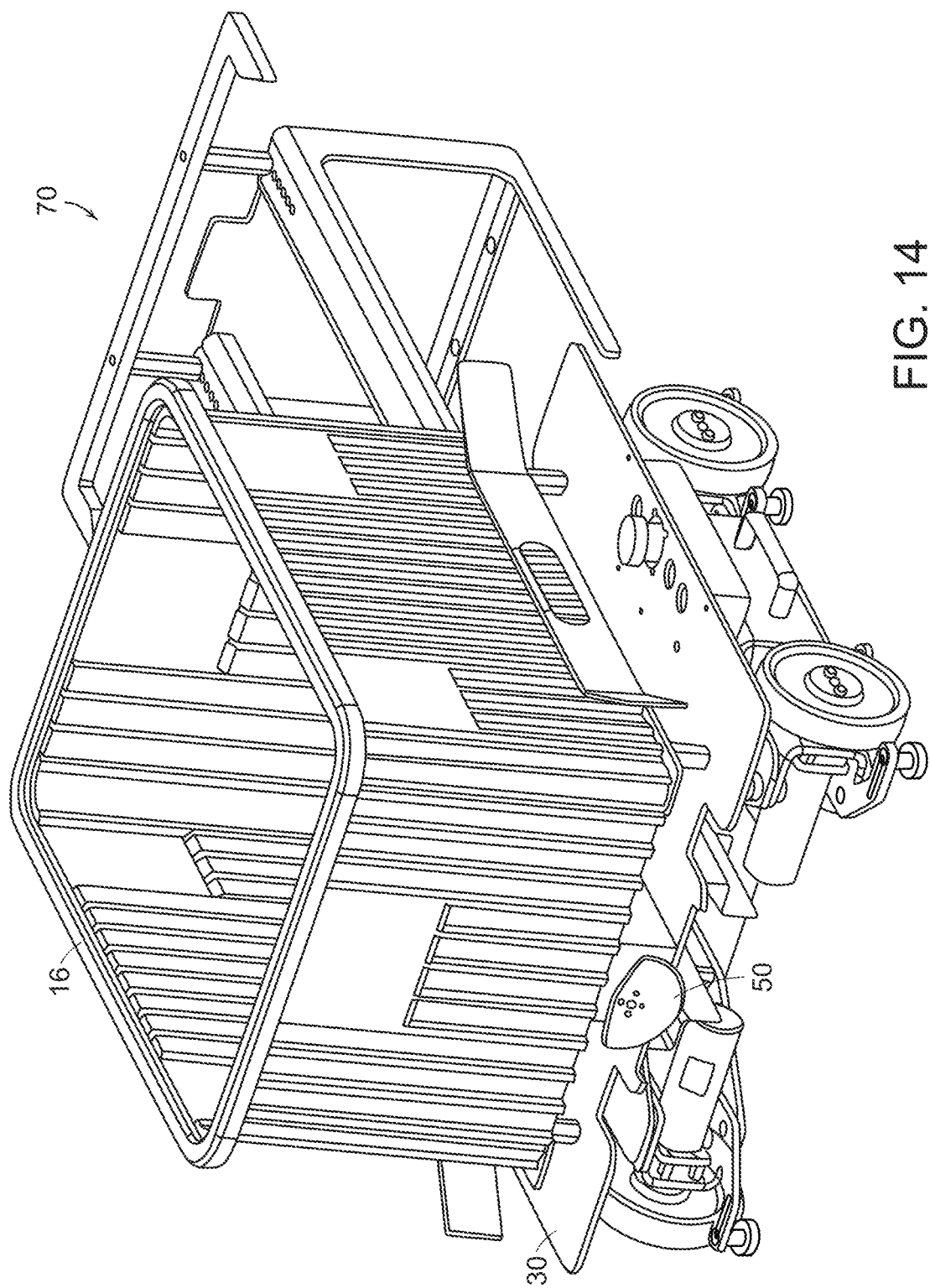
FIG. 14 shows an illustrative diagrammatic view of the carrier of FIG. 1 together with a rack on which a bin may be held.

FIG. 13 shows a top view of the carrier 30, wherein each of the support surfaces 43, 45, 46 is shown, and FIG. 14 shows the carrier 30 with a bin 16 on the carrier 30 with one paddle 48 (shown in FIG. 17B) rotated upward to retain the bin 16 on the carrier 30 as the bin is removed from a shelf.

The tote shelf and retrieval mechanism provides that totes or boxes are carried by a carrier, which has a tote storage area which consists of a center rail, two side rails, and a motorized paddle on the front and back of the tote. Totes or boxes are carried by a robot, which has a tote storage area that consists of a center rail, two side rails, and a motorized paddle on the front and back of the tote. In accordance with further embodiments, other guide and retention mechanisms may be employed that accommodate variable sized totes or bins. When the tote is being driven around, both paddles are up and the tote is fully contained. To store a tote, the robot drives into a tote rack, which consists of two fork tine with an incline on the front, and the incline urges the tote above the rail height on the robot. The paddles are put down, and the robot can drive away with the tote left behind on the rack. To retrieve a tote, the robot drives under the shelf, puts its paddles up, and drives away.

Figure 15:
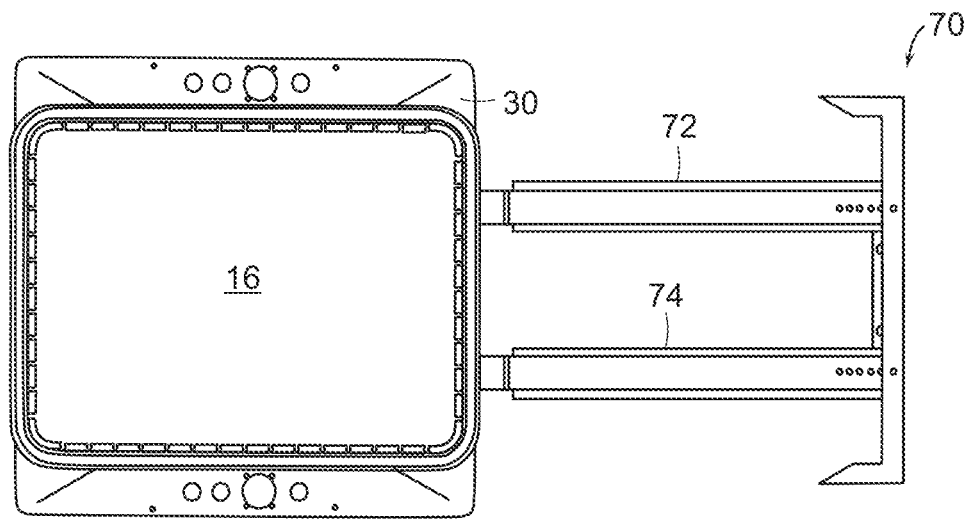
FIG. 15 shows an illustrative diagrammatic tip view of the carrier and rack of FIG. 14.
Figure 16:
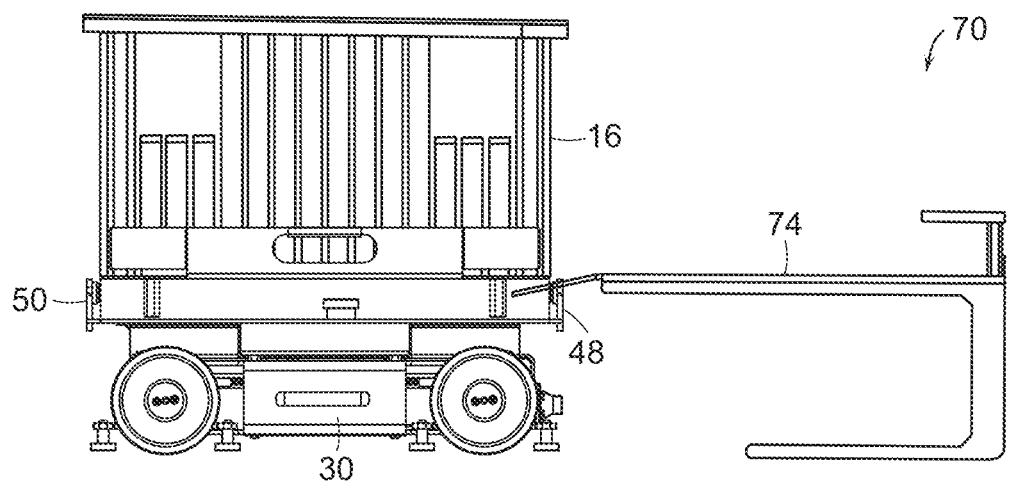
FIG. 16 shows an illustrative diagrammatic side view of the carrier and rack of FIG. 14.
Figure 17A:
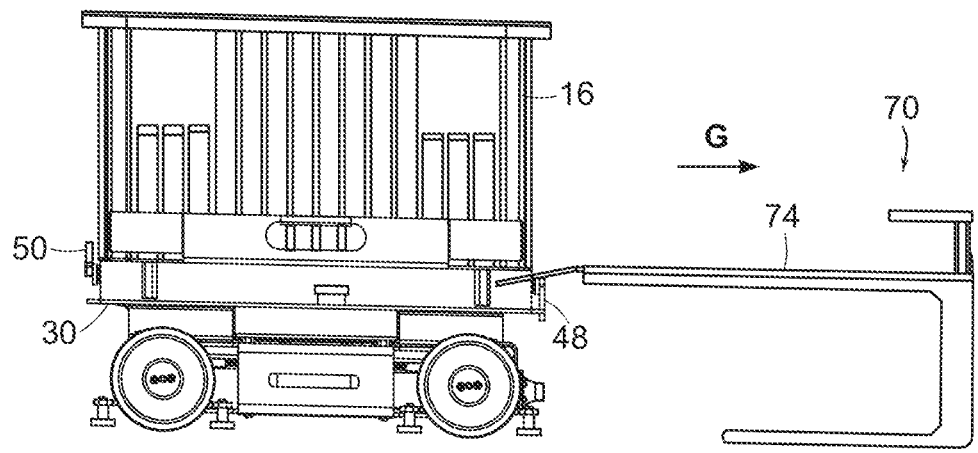
FIGS. 17A and 17B show illustrative diagrammatic side views of the carrier and rack of FIG. 14 with the bin being placed onto the rack (FIG. 17A) and being removed from the rack (FIG. 17B)
Figure 17B:
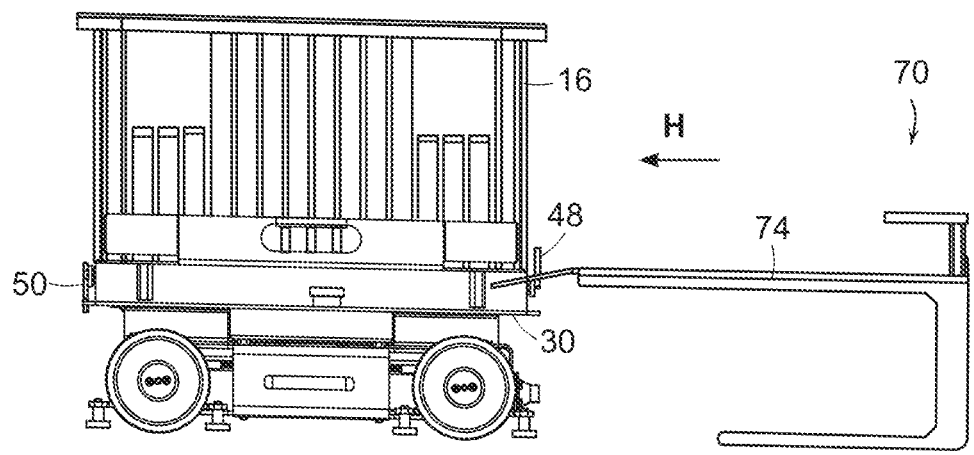

FIG. 17A shows the carrier 30 with the paddle 50 up such that the bin 16 on the carrier 30 may be moved (as shown at G) onto a fixed rack 70 that includes two forks 72, 74. In particular, the forks 72, 74 have ramped ends that engage the carrier 30 between the underside of the bin 16 and on either side of the raised center portion 46 as shown in FIGS. 15 and 16. To remove the bin 16 from the rack 70, the carrier 30 is driven under the rack, and the opposite paddle 48 is actuated as shown in FIG. 17B. When the carrier is moved away from the rack (as shown at H), the paddle 48 urges the bin 16 onto the carrier 30 as the carrier is driven away from the rack.

FIG. 17B, for example, shows the carrier 30 with the paddle 48 activated such that as the carrier 30 is moved away from the rack 70 (as shown at H), the paddle 48 urges the bin 16 onto the carrier 30. Again, FIG. 17A shows a side view of the carrier 30 with the paddle 50 engaged to urge the bin 16 onto the rack 70, and FIG. 17B shows a side view of the carrier 30 with the paddle 48 engaged to urge the bin 16 off of the rack 70.

Figure 18:
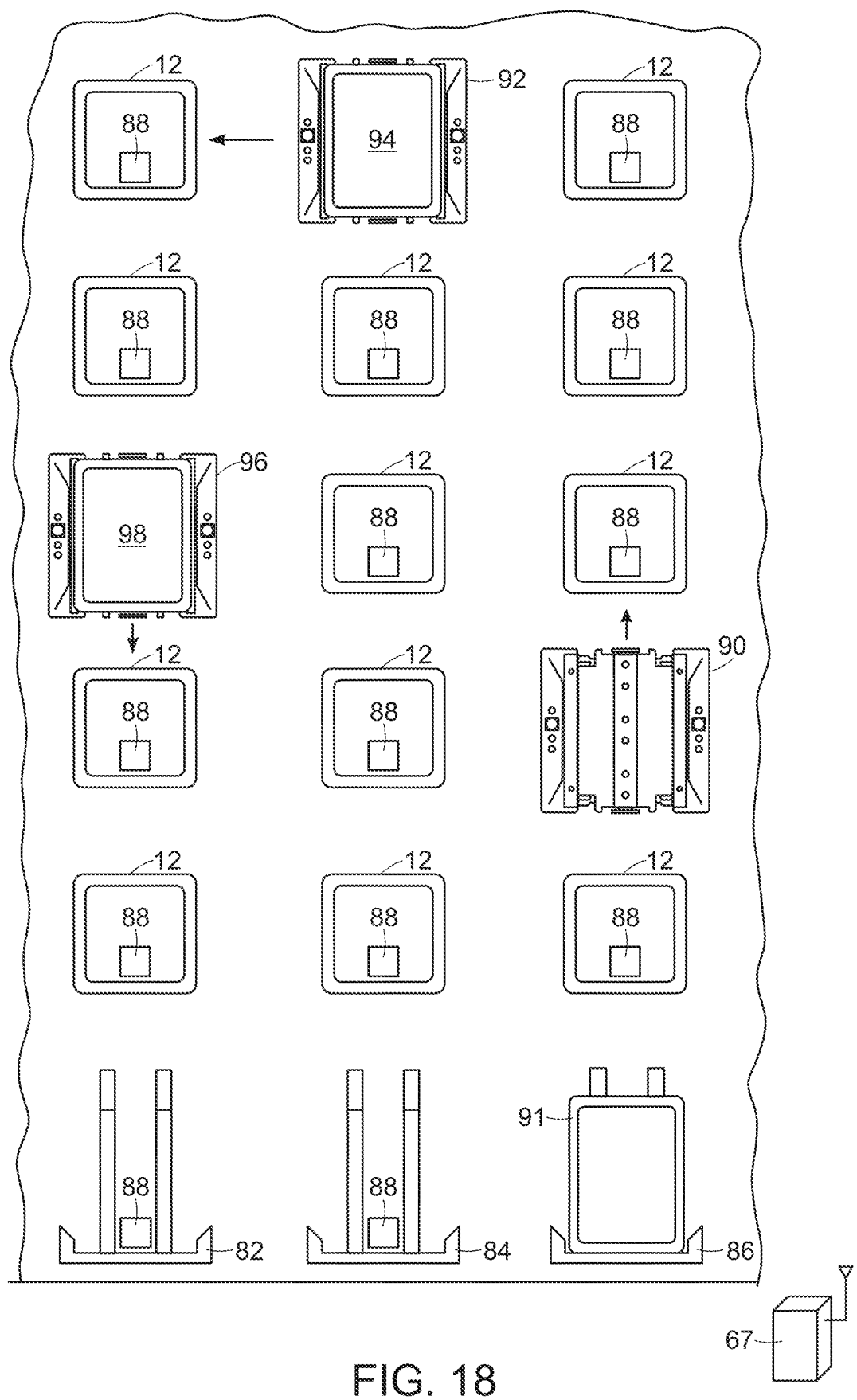
FIG. 18 shows an illustrative diagrammatic top view of a system in accordance with a further embodiment of the present invention that includes racks.

As mentioned above, the track system may be formed of disconnected track sections 12. In particular, FIG. 18 shows a portion of a track system 80 that includes a plurality of track sections 12, as well as racks 82, 84, 86. The guide rollers discussed above are positioned to roll against the outside of the tracks 12, and since the carriers generally travel in straight lines (either forward—backward or side—to side), the guide rollers are designed to engage the intermittent tracks and realign themselves due to each track having slightly rounded corners. Each intermittent track also includes a location code 88 (e.g., a QR code) that permits the carrier to register its location with the central controller 8. The carrier may include a detector 76 (such as a camera or a scanner) on the underside thereof as shown in FIGS. 8A and 8B that reads or detects each location code 88. Again, the orientation of each carrier does not change.

In the system 80 of FIG. 18, numerous intermittent tracks 12 are shown, together with carriers 90, 92, 94. In particular, carrier has left a bin 91 on rack 86 and has been given an instruction to move one track section to the North, carrier 92 carrying bin 94 has been given an instruction to move one track section to the West, and carrier 96 carrying bin 98 has been given an instruction to move one track section to the South. The system 80 moves each of the carriers in the tracks to avoid each other and to provide desired bins at appropriate shelves or racks. As noted, each carrier is provided an instruction to move only one or two track sections at a time. The system 80 is in constant communication with all of the carriers. In certain embodiments, the system provides a wireless heartbeat chain that provides a bidirectional heartbeat between mobile carriers and fixed computing infrastructure. If a heartbeat isn't received by a mobile carrier, it triggers an emergency stop, and if a heartbeat isn't received by the processing system 67, it triggers an appropriate response.

Figure 19:
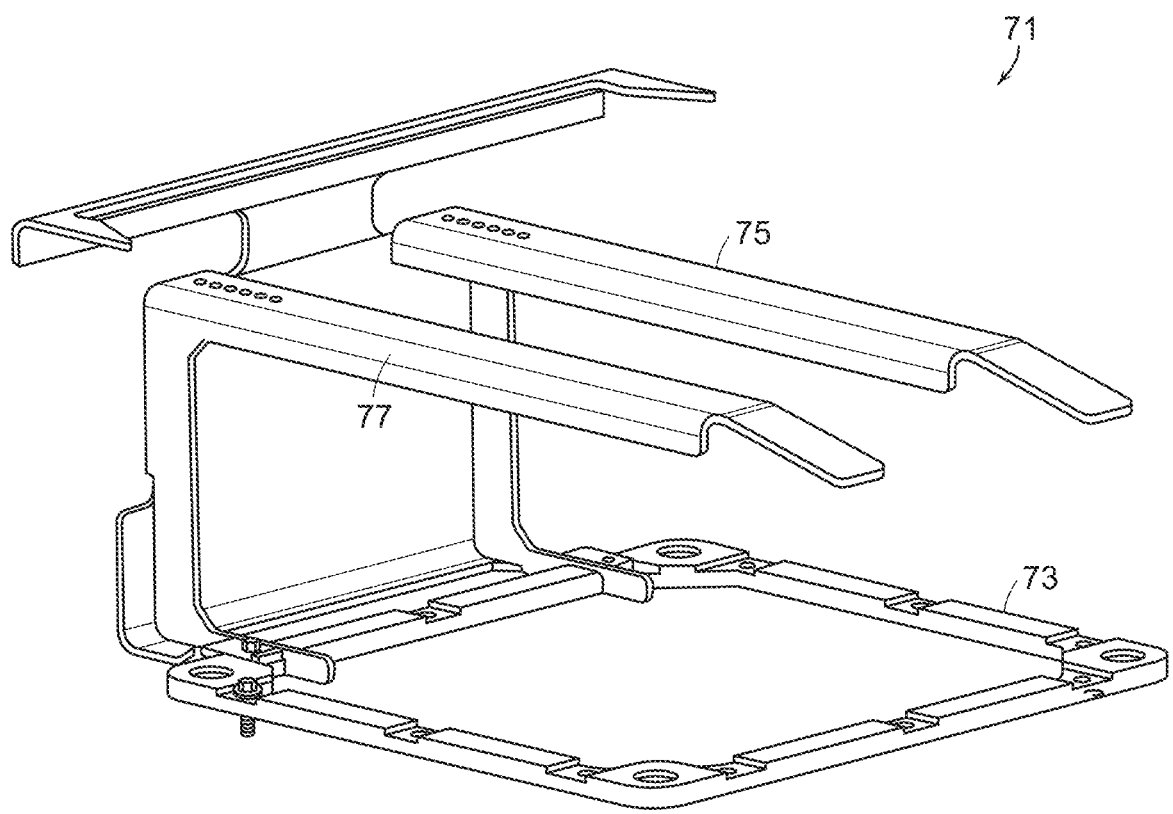
FIG. 19 shows an illustrative diagrammatic view of a rack for use in accordance with a further embodiment of the present invention.
Figure 20:
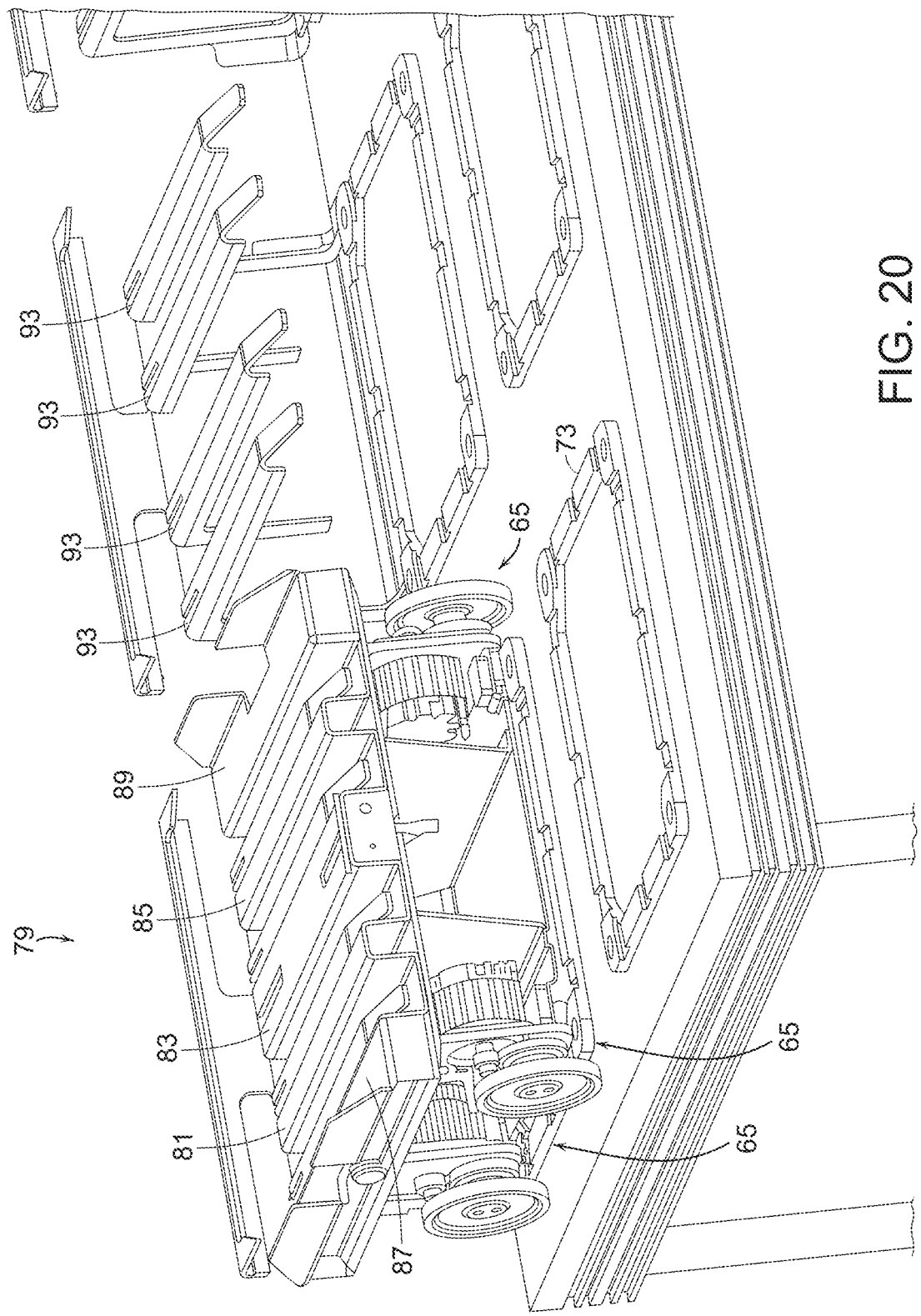
FIG. 20 shows an illustrative diagrammatic view of another carrier that includes independent wheel units in accordance with another embodiment of the present invention.
Figure 21:
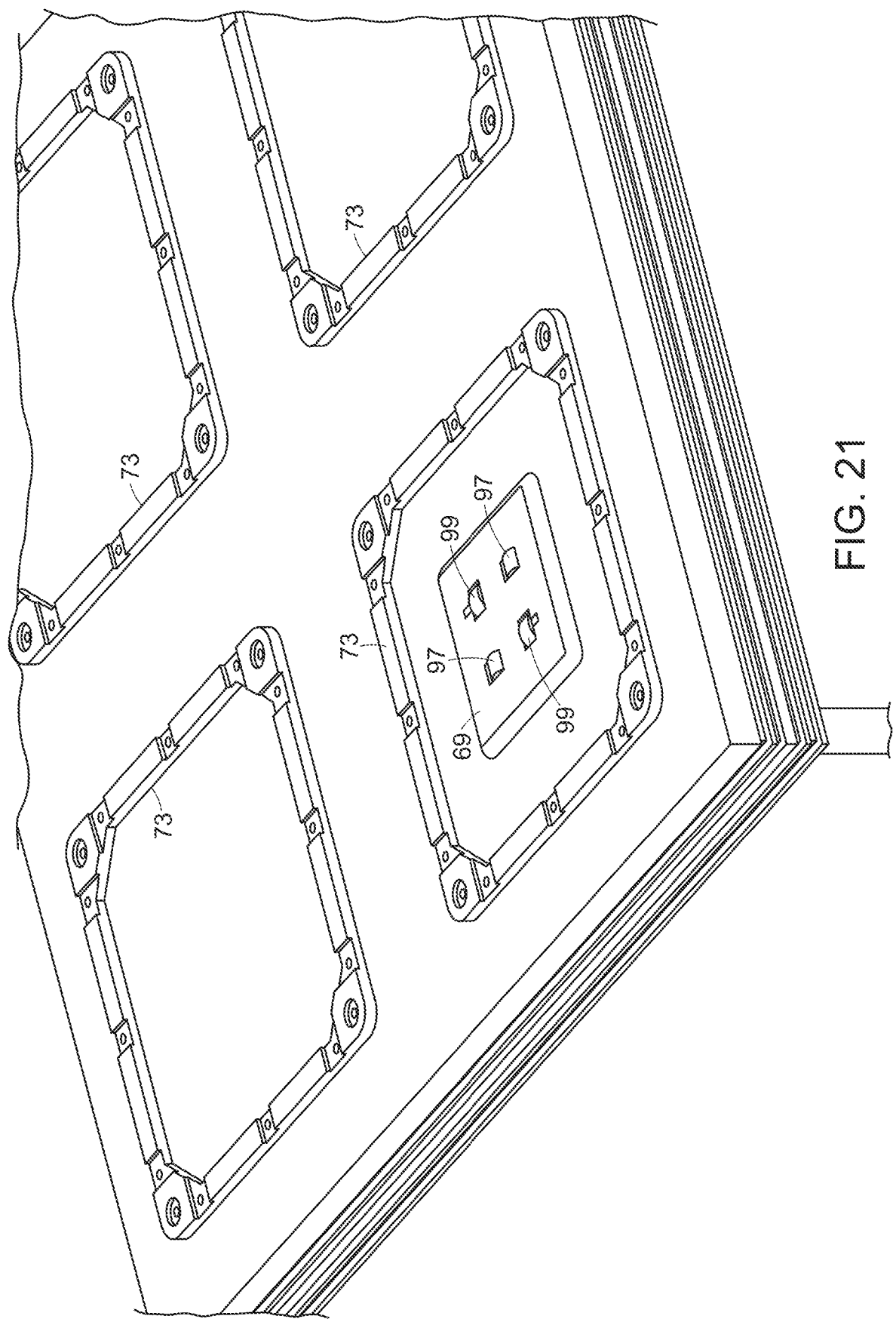
FIG. 21 shows an illustrative diagrammatic view of a track system that includes sensors in accordance with a further embodiment of the present invention.

FIG. 19 shows a further embodiment of a rack unit 71 that includes a track section 73 as its base. The rack unit 71 also includes a pair of forks 75, 77 for engaging and retaining bins. FIG. 20 shows a further embodiment 79 of a rack unit that includes four forks 93 that engage a different carrier 95 that includes three raised sections 81, 83, 85 in addition to the rail support surfaces 87, 89. Each of the wheel assemblies 65 may also be independently pivotable (not using pivot linkages) although the wheel assemblies are pivoted at effectively the same time (prior to movement) as discussed above. With reference to FIG. 21, one or more of the track sections 73 may include a charging base 69, having, for example, contact positive 97 and negative 99 charge plates that may mate with charging hardware on the underside of a carrier.

Figure 22:
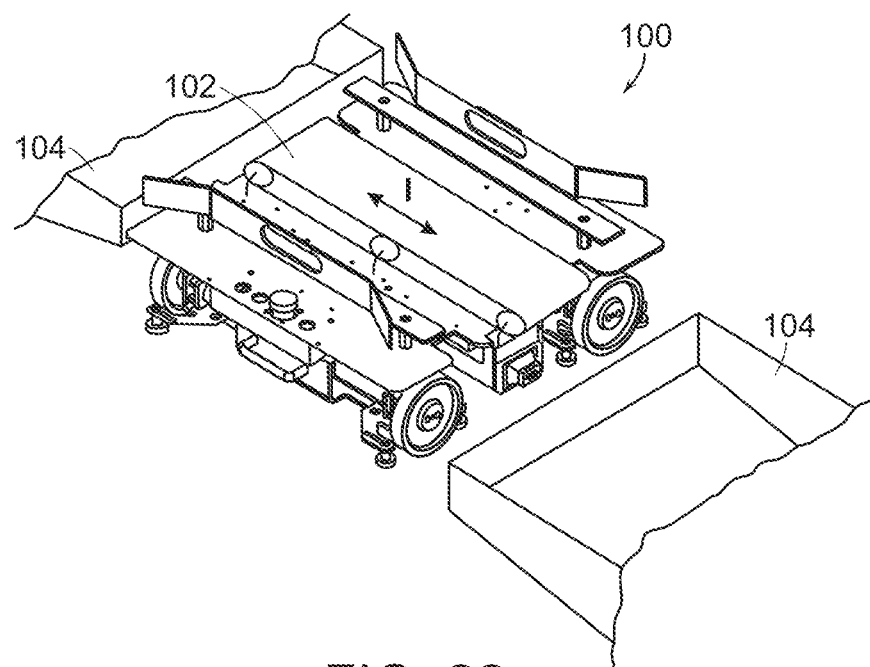
FIG. 22 shows an illustrative diagrammatic view of a carrier in accordance with a further embodiment of the preset invention that provides dual side later discharge off of the carrier.

FIGS. 22-32 show further embodiments of invention that are based on the above carriers and are provided for movement about a track system as discussed above. For example, FIG. 22 shows a carrier 100 in accordance with another embodiment of the present invention that includes swivel mounted wheel assemblies and is operable on a track system as discussed above, but also includes a conveyor 102 that is mounted on the carrier 100, and is actuatable to move a bin or box on the carrier in either of opposing directions as indicated at I. When the carrier 100 is moved to be positioned adjacent a diverting device (such as a diverting chute or conveyor as shown at 104), the carrier may actuate the conveyor 102 to move the bin onto the diverting conveyor 104. The diverting conveyor 104 may for example, but not limiting, be a belt conveyor, a roller conveyor, a chain conveyor, a chute, another bin or a hopper. In certain embodiments, the load on the carrier 102 may be a bin that contains objects, or may be objects themselves.

Figure 23:
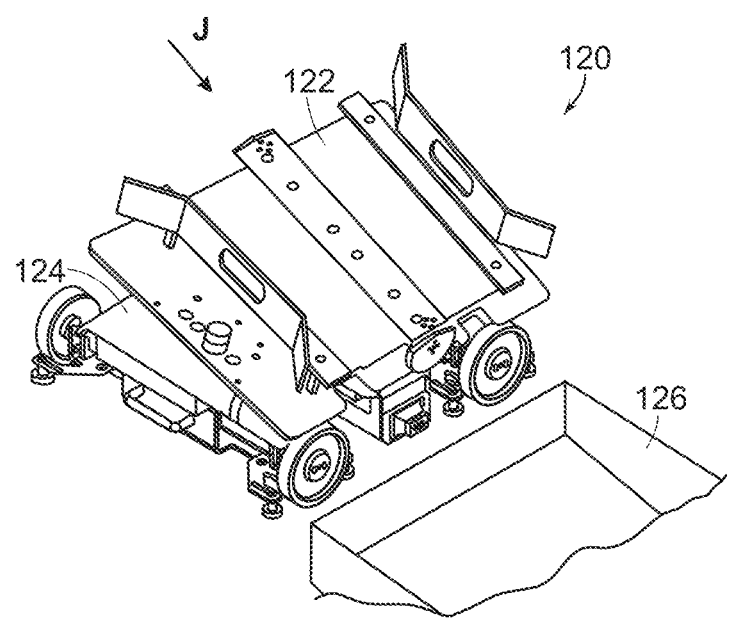
FIG. 23 shows an illustrative diagrammatic view of a carrier in accordance with a further embodiment of the preset invention that provides single side later discharge off of the carrier.

FIG. 23 shows a carrier 120 in accordance with further embodiments of the present invention that includes swivel mounted wheel assemblies that run along track sections as discussed above, but also includes a tilt tray 122 that is mounted on the carrier base 124, and is actuatable to move a bin in a direction as indicated at J. Similarly, when the carrier 120 is moved to be positioned adjacent a diverting device (such as a diverting conveyor as shown at 126), the carrier may actuate the tilt tray 122 to move the bin onto the diverting conveyor 126. The diverting conveyor 126 may for example, but not limiting, be a belt conveyor, a roller conveyor, a chain conveyor, a chute, another bin or a hopper. In certain embodiments, the load on the carrier 120 may be a bin that contains objects, or may be objects themselves.

Figure 24A:
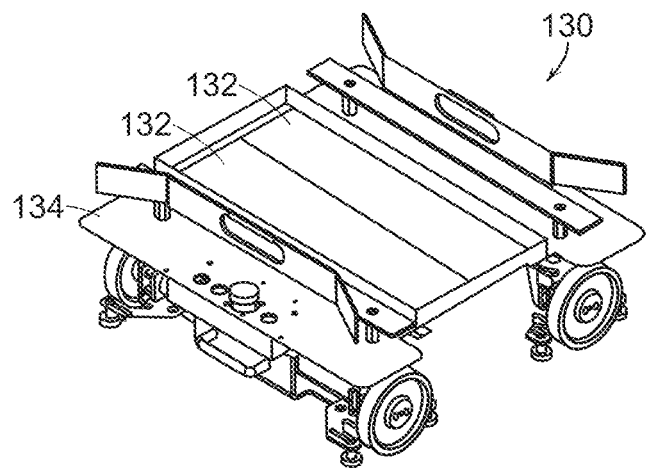
FIGS. 24A and 24B show illustrative diagrammatic views of a carrier in accordance with a further embodiment of the present invention that includes a central drop mechanism.
Figure 24B:
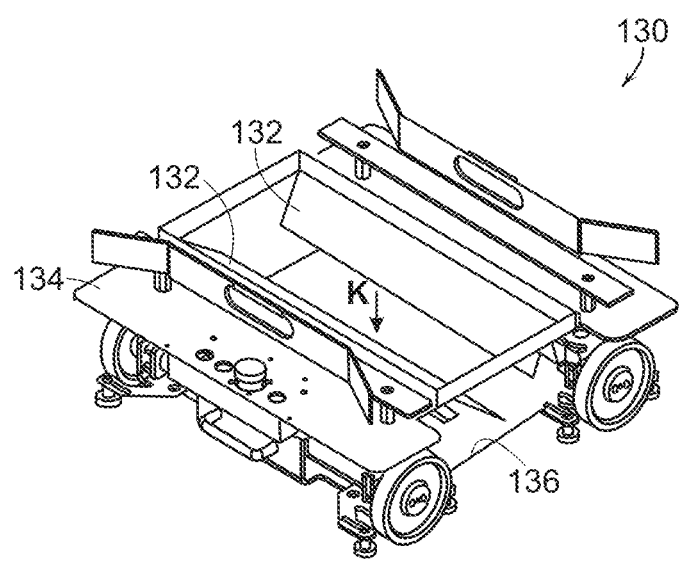

FIGS. 24A and 24B show a carrier 130 in accordance with further embodiments of the present invention that includes swivel mounted wheel assemblies that run along track sections as discussed above, and also includes a bomb bay drop mechanism 132 that is part of the carrier base 134, and is actuatable to drop an object in a direction as indicated at K into a diverting device. When the carrier 130 is moved therefore, to be positioned over a diverting device 136, again, such as a chute, bin, hopper, or conveyor (e.g., belt, roller chain, etc.), the carrier may actuate the drop mechanism 132 to drop the object into the diverting device 136.

Figure 25:
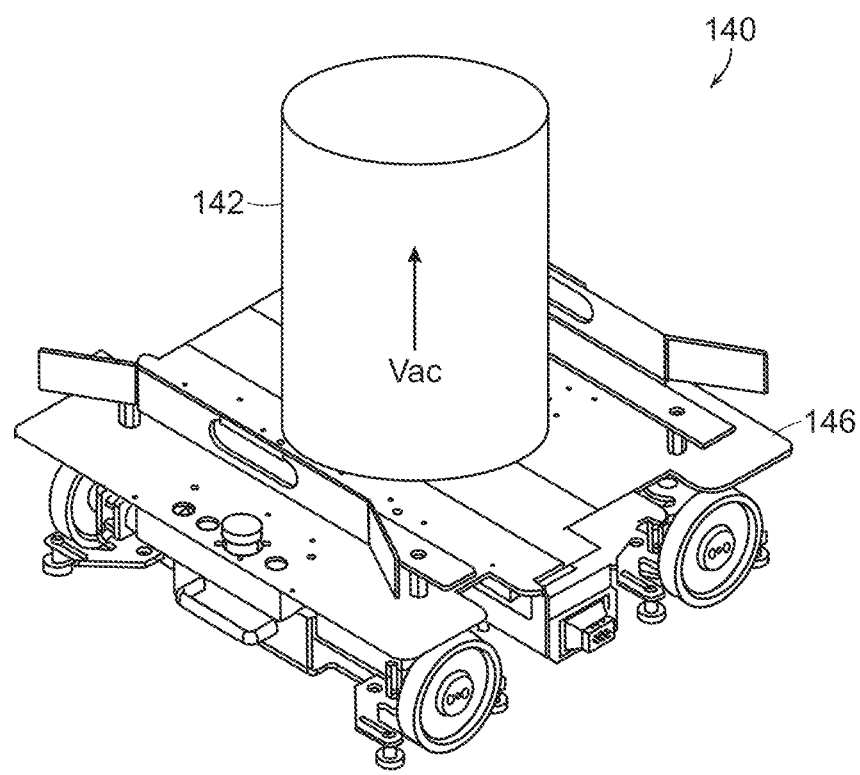
FIG. 25 shows an illustrative diagrammatic view of a carrier in accordance with a further embodiment of the invention that provides vacuum of a track section.
Figure 26:
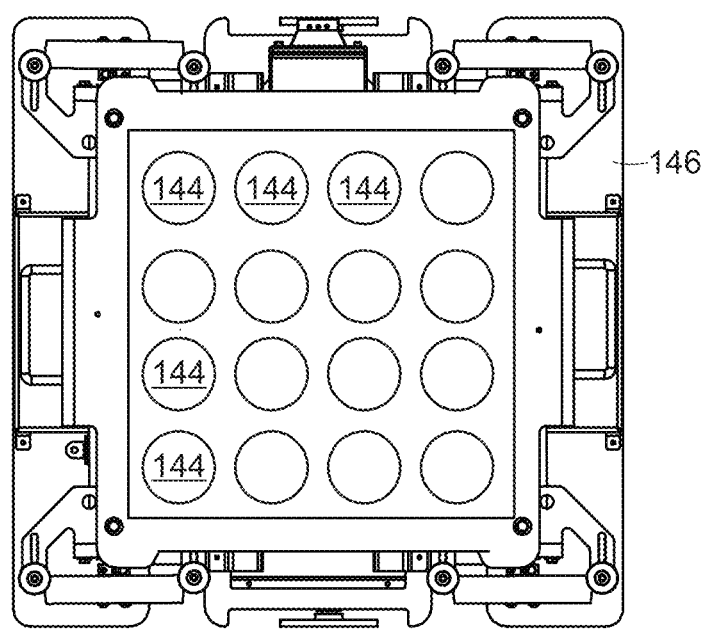
FIG. 26 shows an illustrative diagrammatic bottom view of the carrier of FIG. 25.

During use, debris (e.g., dust, particles from paper or cardboard or plastic packages) may fall onto the base floor on which the tracks (or tracks sections) 12 are laid. In accordance with a further embodiment, the system provides a vacuum carrier 140 that includes the swivel mounted wheel assemblies that run along track sections as discussed above, and also includes a vacuum assembly 142 as shown in FIG. 25. The vacuum assembly is mounted on the carrier chassis, and is coupled to a grid of vacuum openings 144 on the underside 146 of the carrier 140 as shown in FIG. 26. At appropriate times, such as at the end of processing session (e.g., at night), the vacuum carrier 410 may be engaged to run through the entire grid of tracks while vacuuming to collect any debris.

Figure 27A:
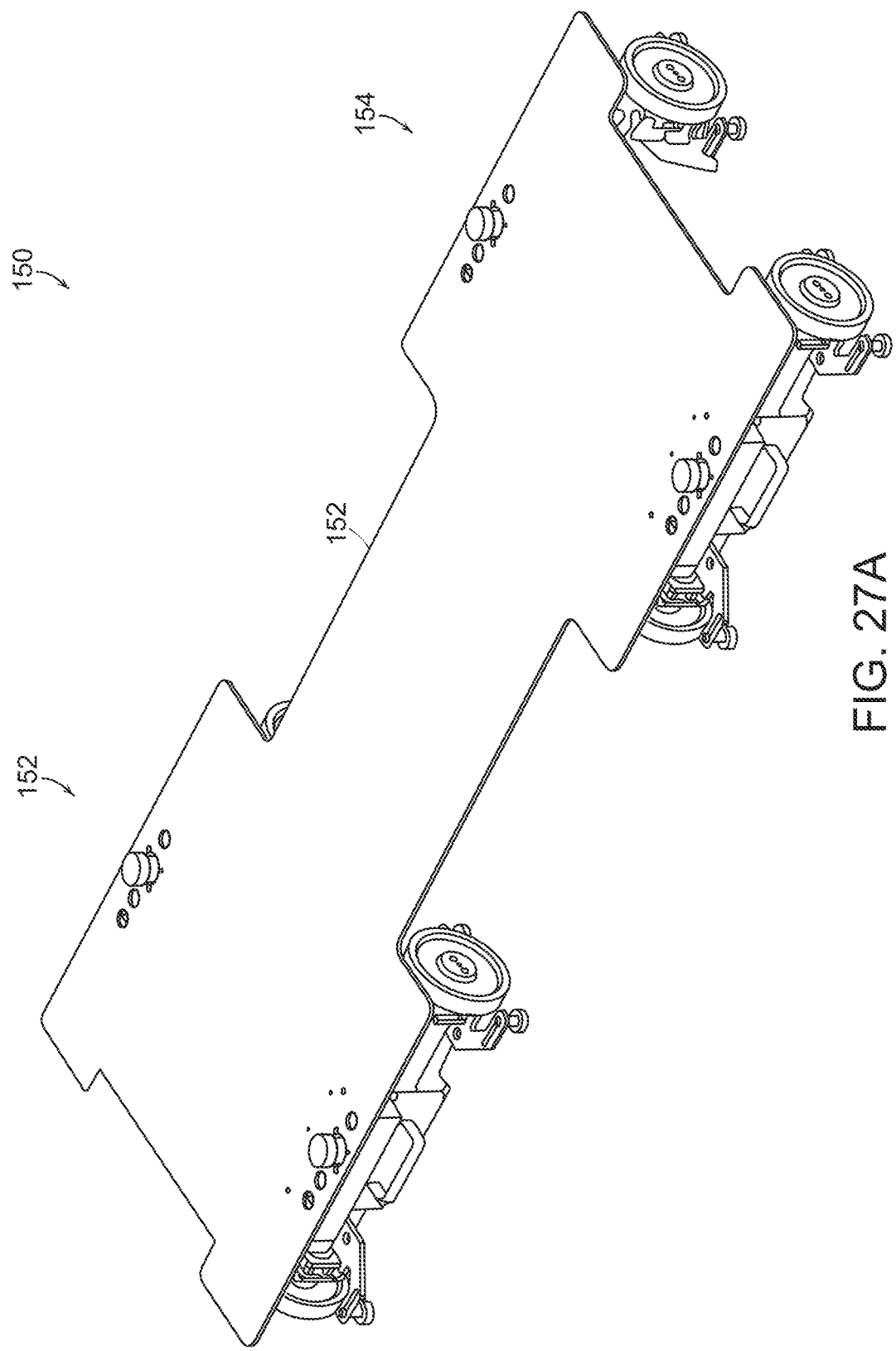
FIGS. 27A and 27B show illustrative diagrammatic views of a double carrier in accordance with another embodiment of the present invention with the wheels in a first position (FIG. 27A) and a second position (FIG. 27B)
Figure 27B:
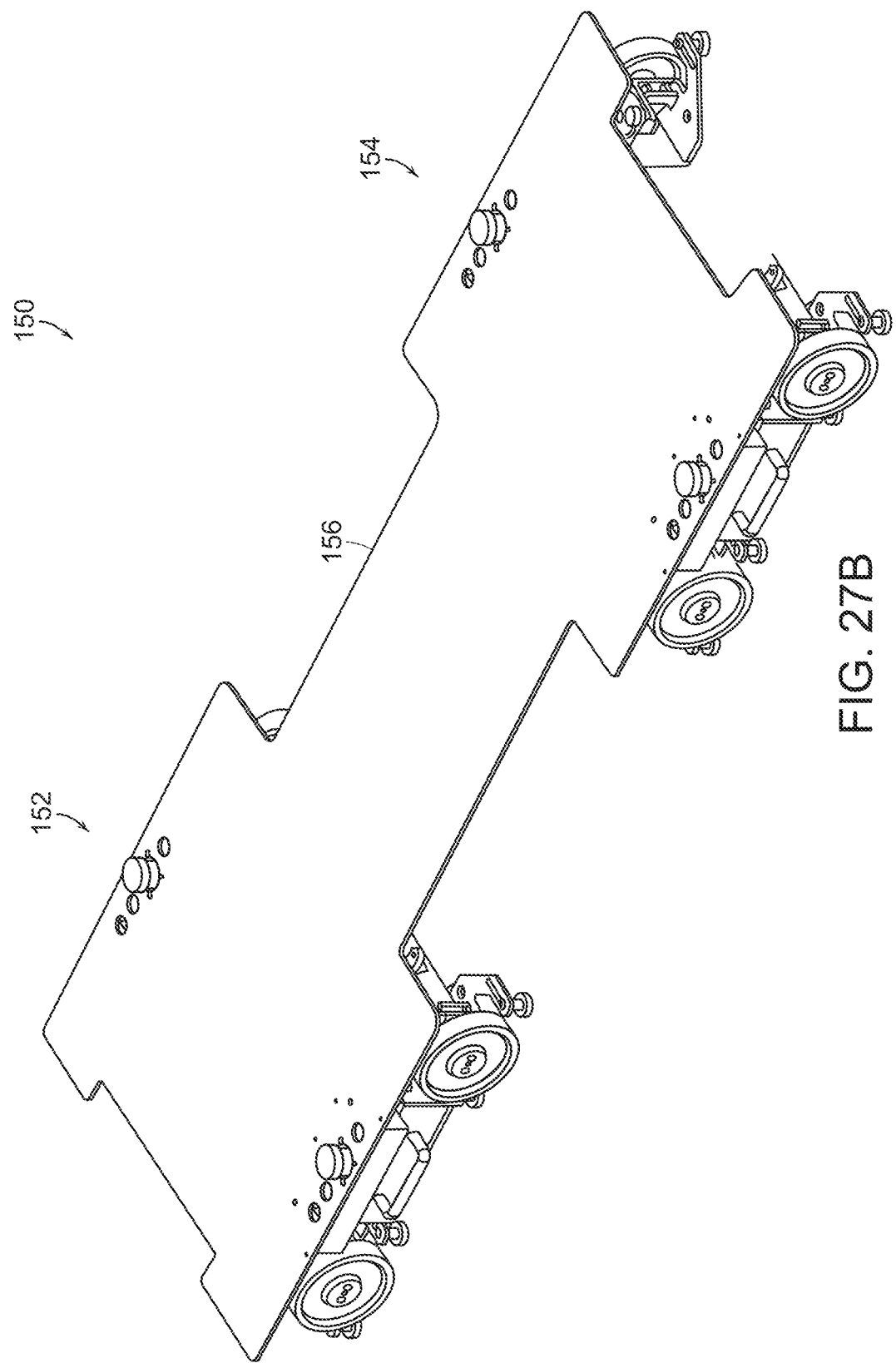

Since the space between each of the tracks 382 is consistent (e.g., consistent in an X direction and consistent in a Y direction), the carrier may be formed not only as a single track section carrier, but may span multiple track sections. For example, the double carrier 150 shown in FIGS. 27A and 27B includes two carrier bases 152, 154, each of which includes a set of four wheels that may be swiveled and run along track sections as described above. The distance between the carrier bases 152, 154 is fixed as a bridge section 156 of the double carrier maintains a fixed distance between the carrier bases, and the size of the bridge is designed to match the spacing distance between track sections. With further reference to FIG. 27B, when all of the wheels of the carrier 150 are pivoted together, the double carrier may be permitted to be moved along the track in both X or Y dimensions.

Figure 28:
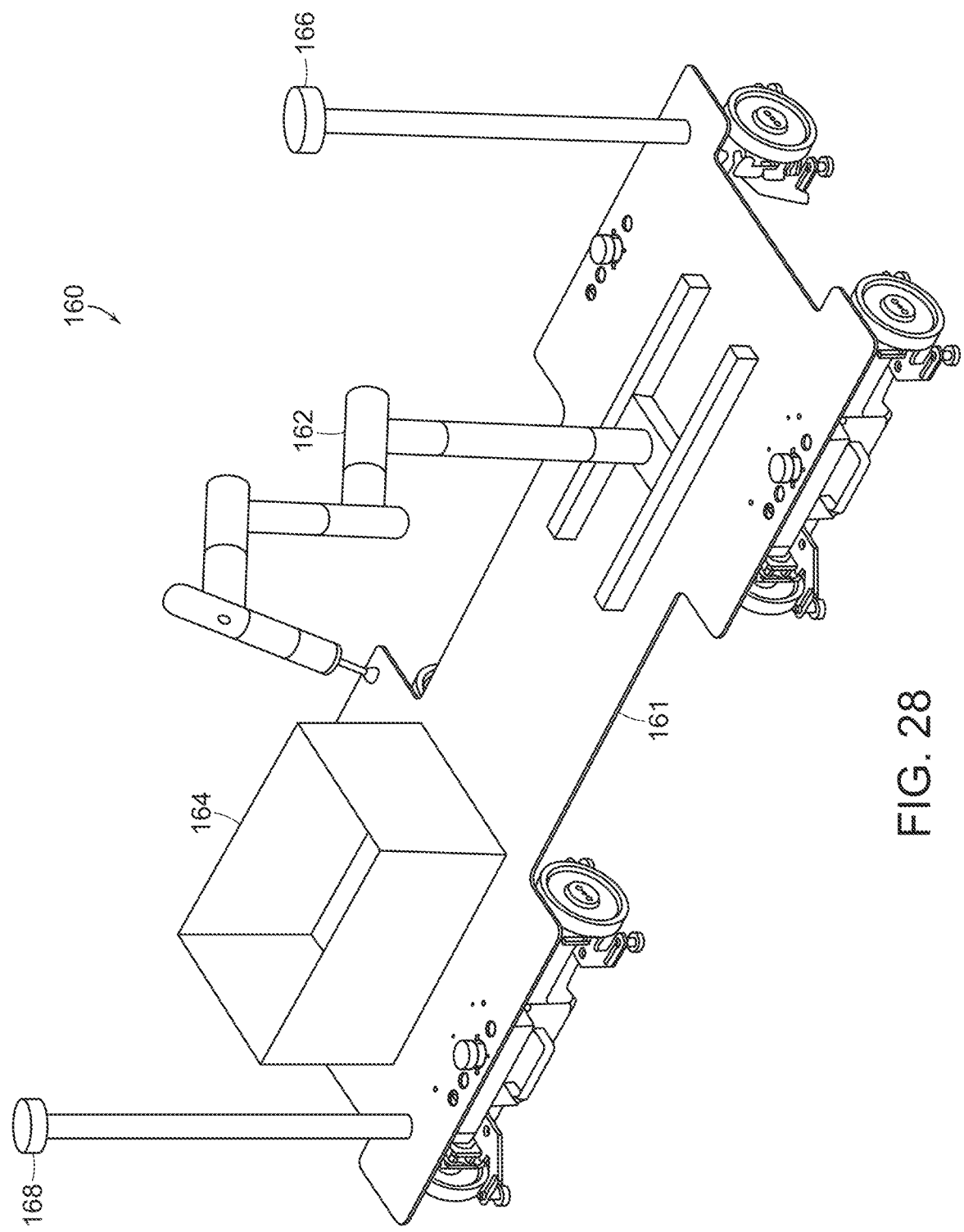
FIG. 28 shows an illustrative diagrammatic view of the double carrier of FIGS. 27A and 27B that includes an object retrieval unit.

The use of such a larger (double) carrier permits further functionalities as follows. With reference to FIG. 28, a retrieval system 160 may be provided on a double carrier 161 that includes an articulated arm 162 as well as a receiving bin 164. Any dropped objects or debris may be picked up off of the track system and placed in the bin 164. Additionally, cameras (e.g., 360 degree cameras) 166, 168 may be provided that monitor the area around the double carrier 161 to identify objects that require moving to the receiving bin 164. Again, each of the two carrier bases of the double carrier 161 includes a set of actuatable and pivotable wheels, permitting the double carrier to be moved along the track in both X and Y dimensions as discussed above.

Figure 29A:
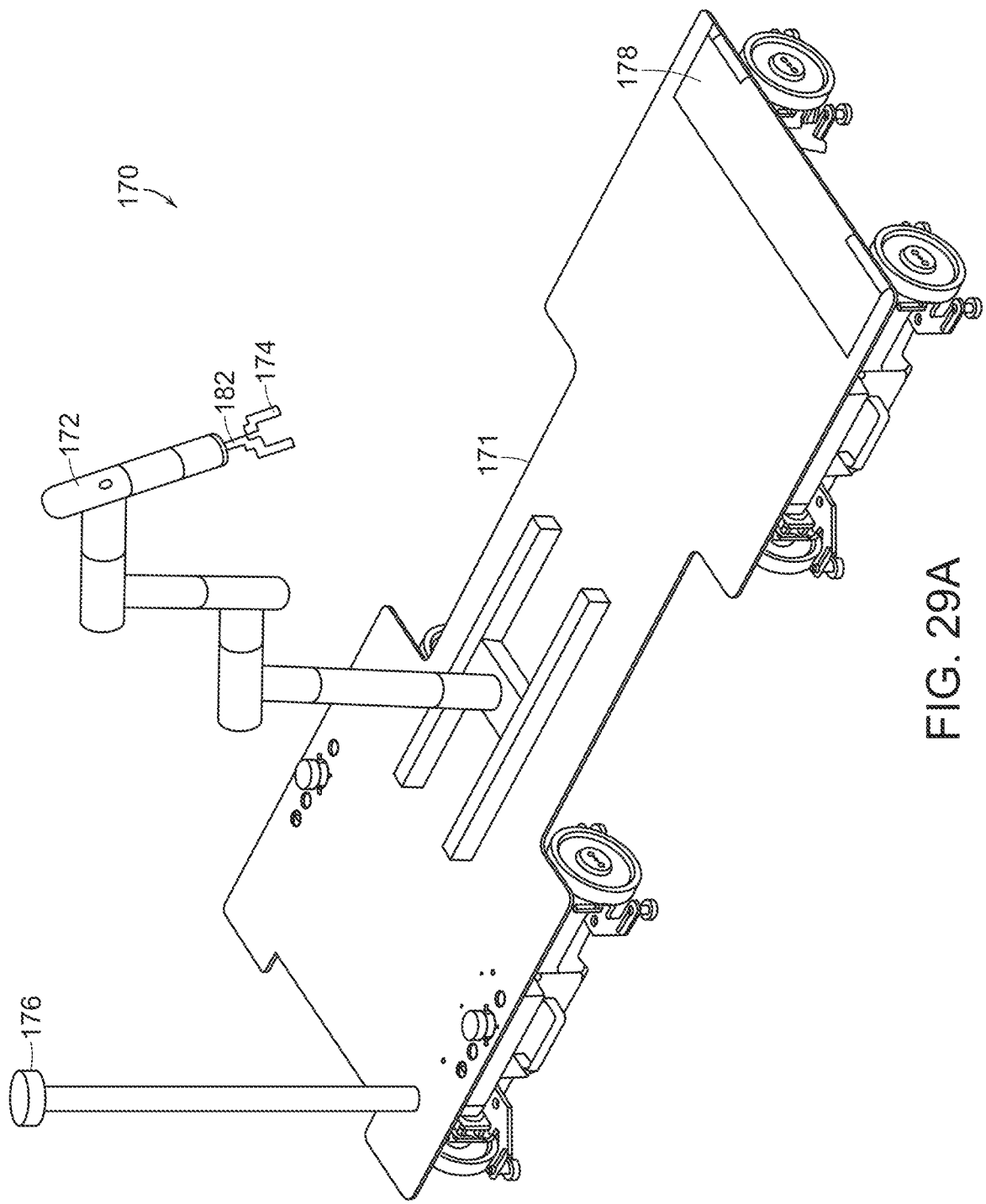
FIGS. 29A-29C show illustrative diagrammatic views of the double carrier of FIGS. 27A and 27B that includes a carrier retrieval unit (FIG. 29A), engaging another carrier (FIG. 29B), and retrieving the carrier (FIG. 29C)
Figure 29B:
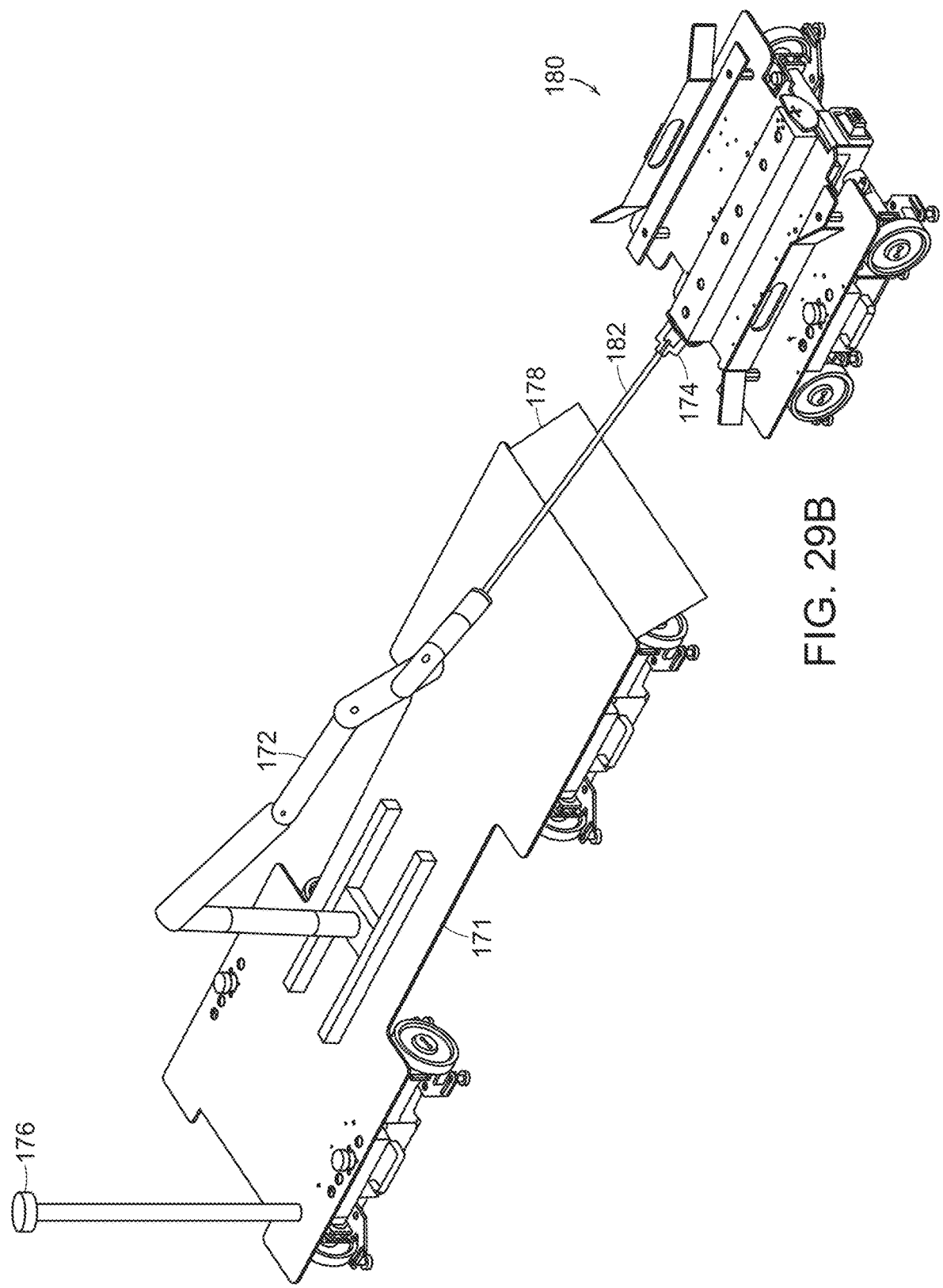
Figure 29C:
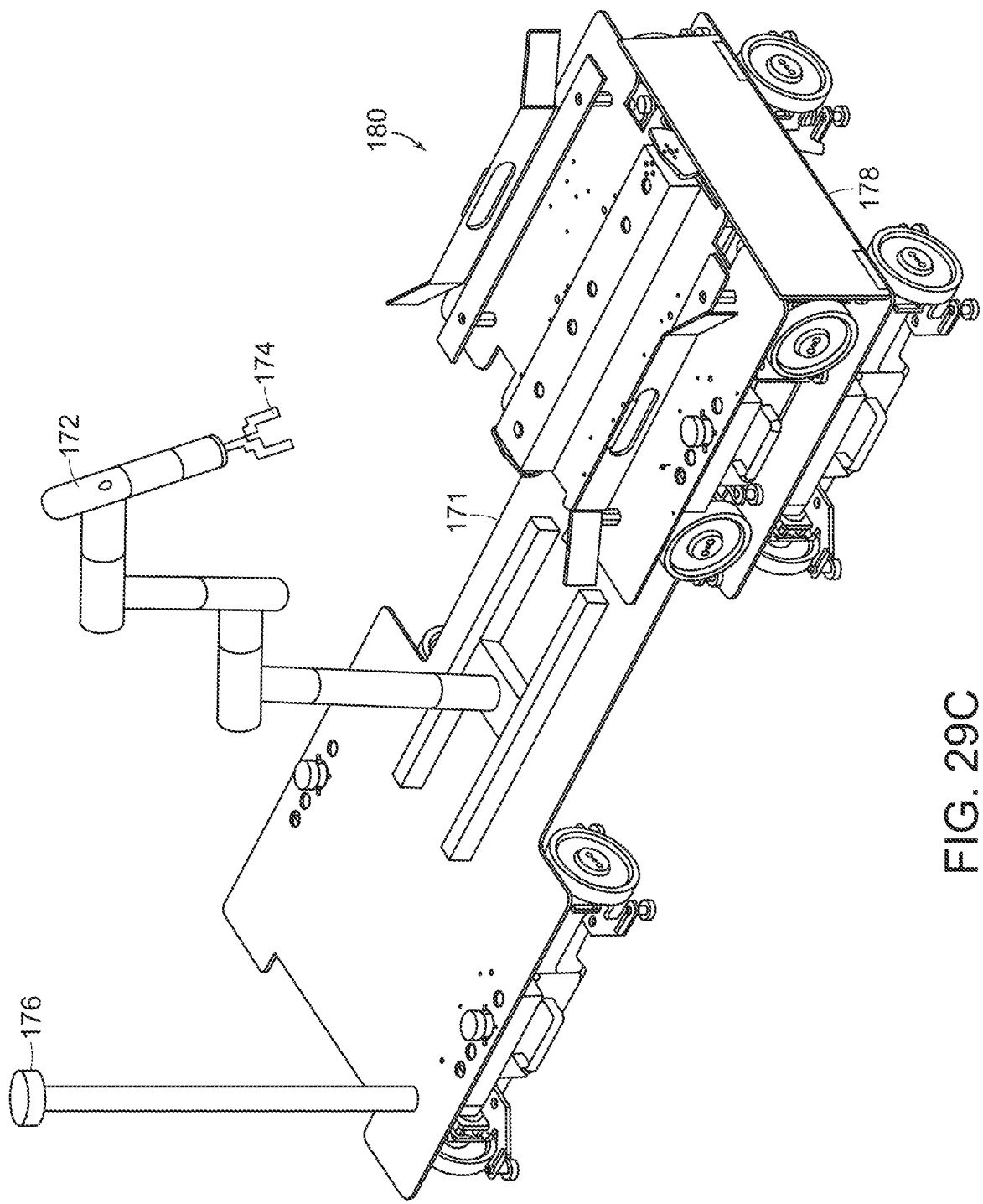

A double carrier (or larger) may also be used to pick up a disabled (single) carrier as shown in FIGS. 29A-29C. As shown in FIG. 29A, such a system 170 may include a double carrier 171 that supports an articulated tow arm 172 having an end effector 174, as well as a camera (e.g., a 360 degree camera) 176. The system 170 also includes actuatable and pivotable wheels as discussed above, as well as a facilitation member 178. In this way, the carrier 170 may move to all possible locations on the track grid as discussed above. As shown in FIG. 29B, the facilitation member 178 may be rotated down to provide a ramp onto the double carrier 171, such that a disabled carrier 180 may be grasped by the end effector 174 (which may include an extendable section 182), and drawn up the ramp formed by the facilitation member 178. The extendable section 182 may be provided, for example, as a cross-sectionally arcuate member (such as in a metal tape measure) that is stiff when (naturally) curved in the cross direction, but may be wound upon itself when caused to be flat in the cross direction. The extendable section 182 may further include a central cable. As shown in FIG. 29C, once the disabled carrier 180 is successfully drawn onto the carrier 171, the facilitation member 178 may be partially closed (to vertical) to keep the carrier 180 on the carrier 171. In this way, the double carrier 171 may be used to retrieve disabled carriers.

Figure 30:
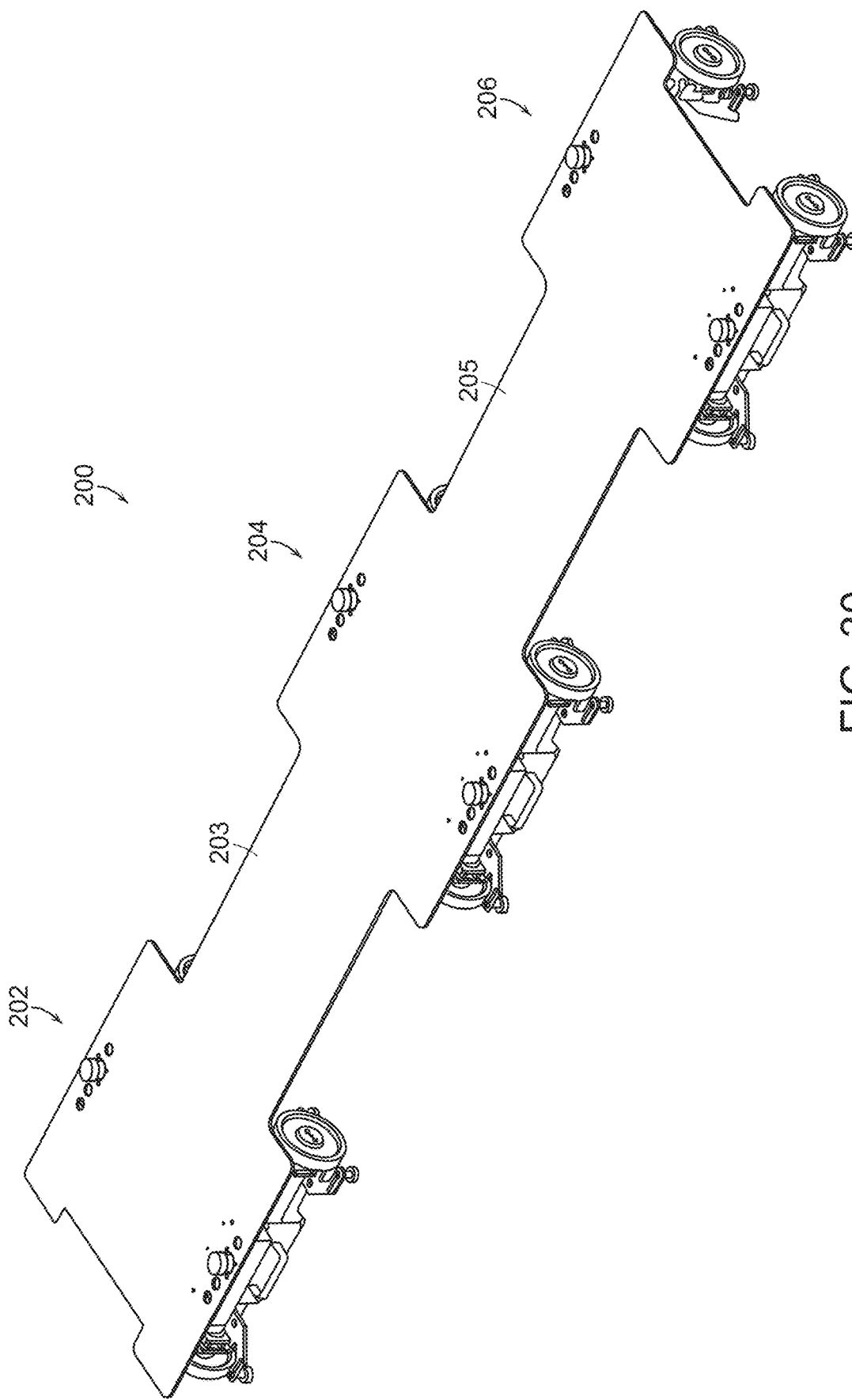
FIG. 30 shows an illustrative diagrammatic view of a triple carrier in accordance with another embodiment of the present invention with the wheels in a first position.
Figure 31:
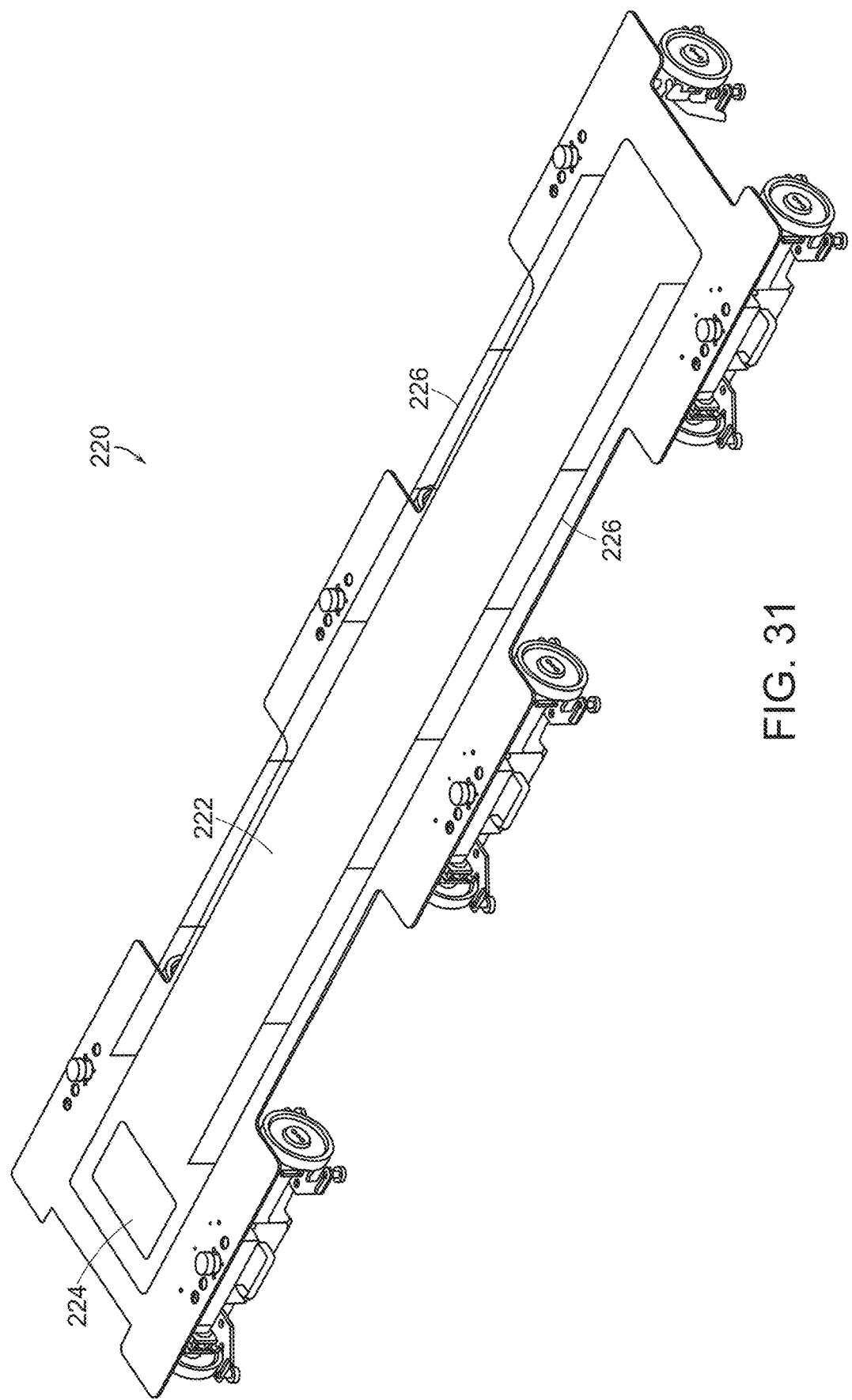
FIG. 31 shows an illustrative diagrammatic view of the triple carrier of FIG. 30 that includes a human personnel carrier.

As shown in FIG. 30, a triple carrier 200 may be provided that includes three functional carrier bases 202, 204, 206, that are joined by sections 203, 205. Each of the carrier bases includes a set of four wheels that may be pivoted and actuated to run along track sections as described above. All of the wheels of the carrier 200 are swiveled together, permitting the carrier 200 to be moved along the track in both X and Y directions. With reference to FIG. 31, such a triple (or other multiple) carrier 220 may be provided with a bed 222, head rest 224, and rails 226 for transporting human repair personnel to any point in the track system that is known to be in need of assistance.

Figure 32:
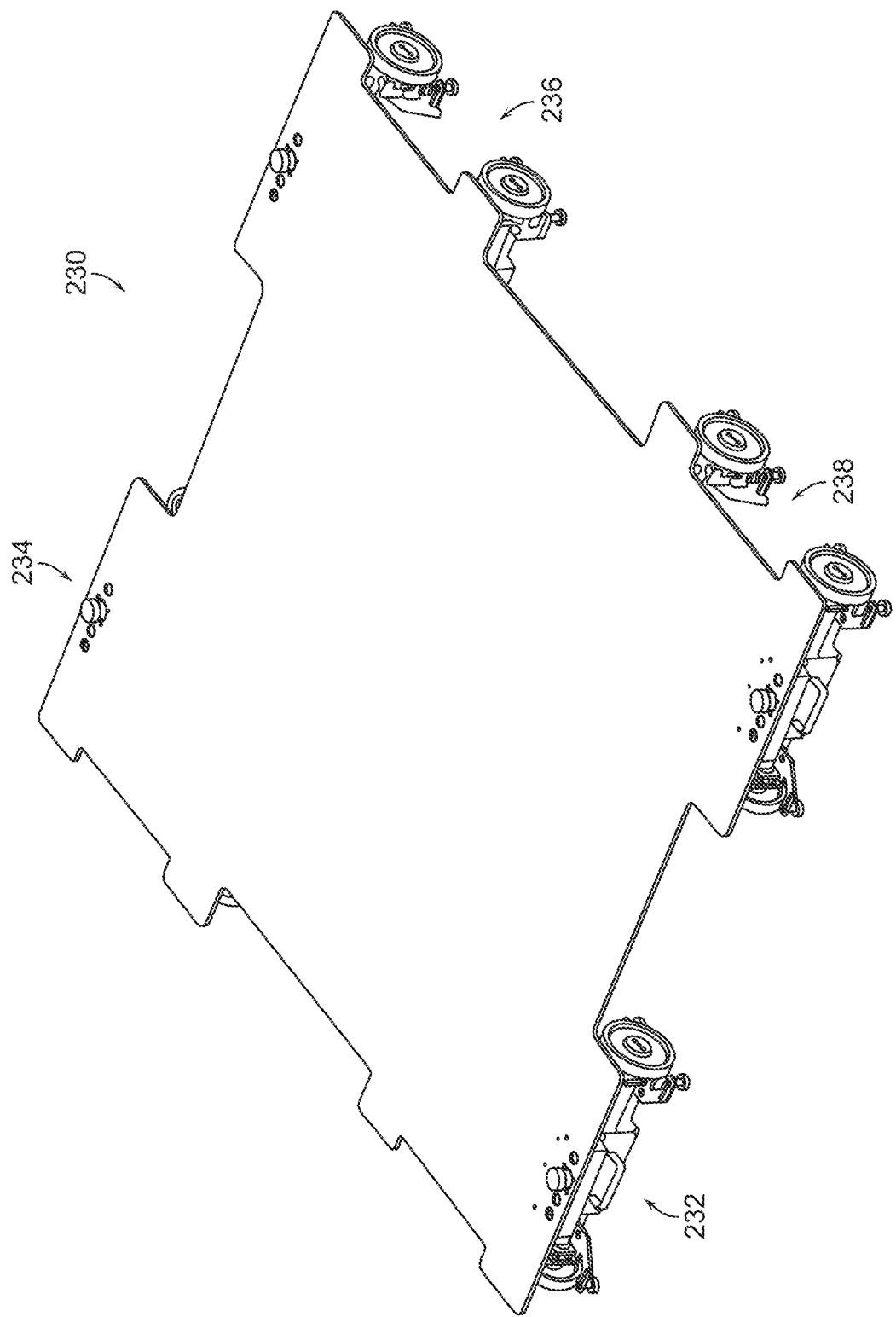
FIG. 32 shows an illustrative diagrammatic view of a quad carrier in accordance with a further embodiment of the present invention.

Further, and as shown in FIG. 32, a quad carrier 230 may be provided that includes a general platform as well as four functional carrier bases 232, 234, 236 and 238 that are joined by sections of the large common platform. Each of the four functional carrier bases includes a set of four wheels that may be pivoted and actuated to run along track sections as described above. All of the wheels of the quad carrier 230 are pivoted together, permitting the carrier 230 to be moved along the track in both X and Y directions. Any of a wide variety of maintenance of repair systems or personnel may be provided on such a quad (or greater number) carrier.

Figure 33:
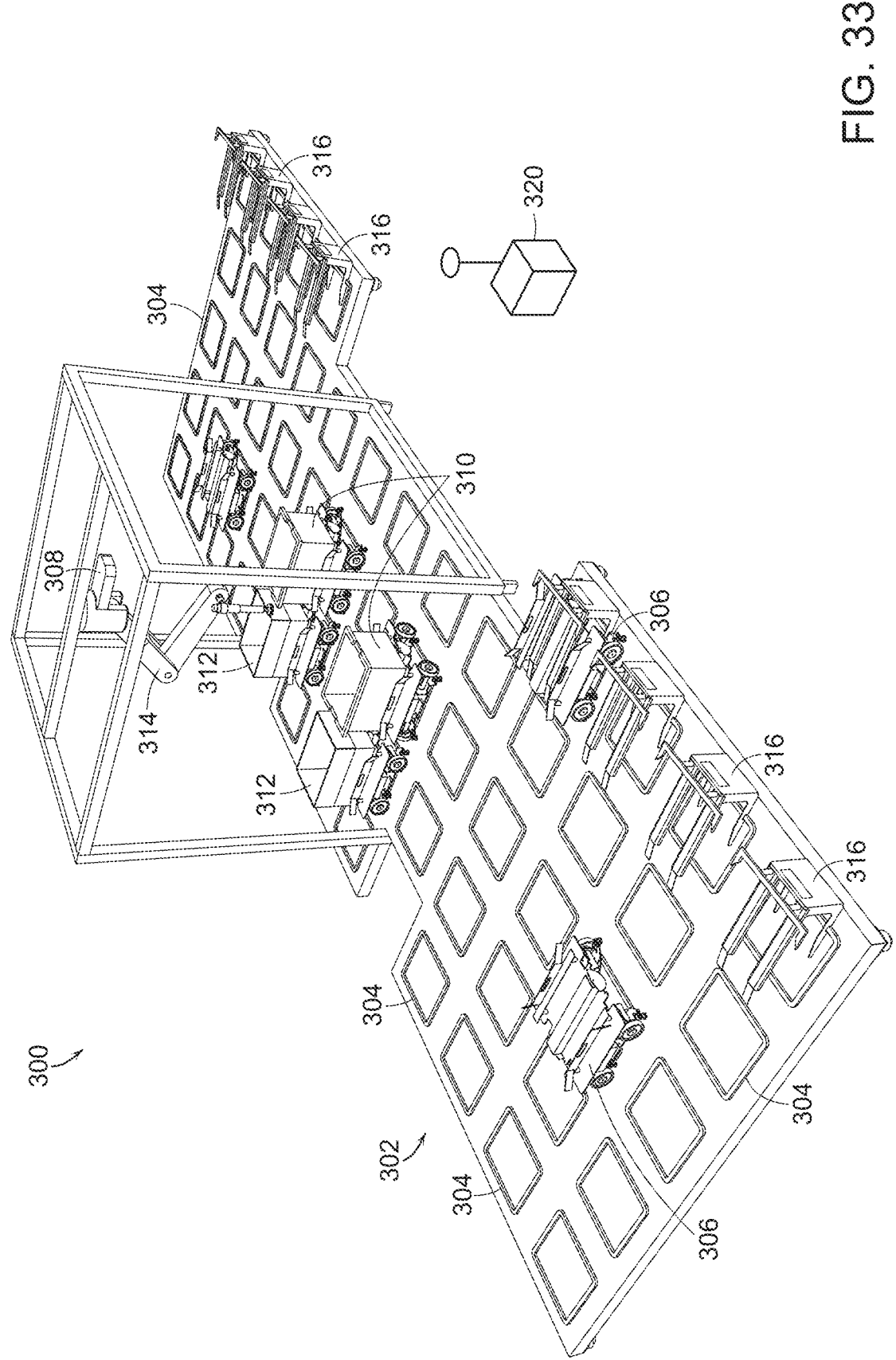
FIG. 33 shows an illustrative diagrammatic view of an automated processing station for use in a system in accordance with an embodiment of the present invention.
Figure 34:
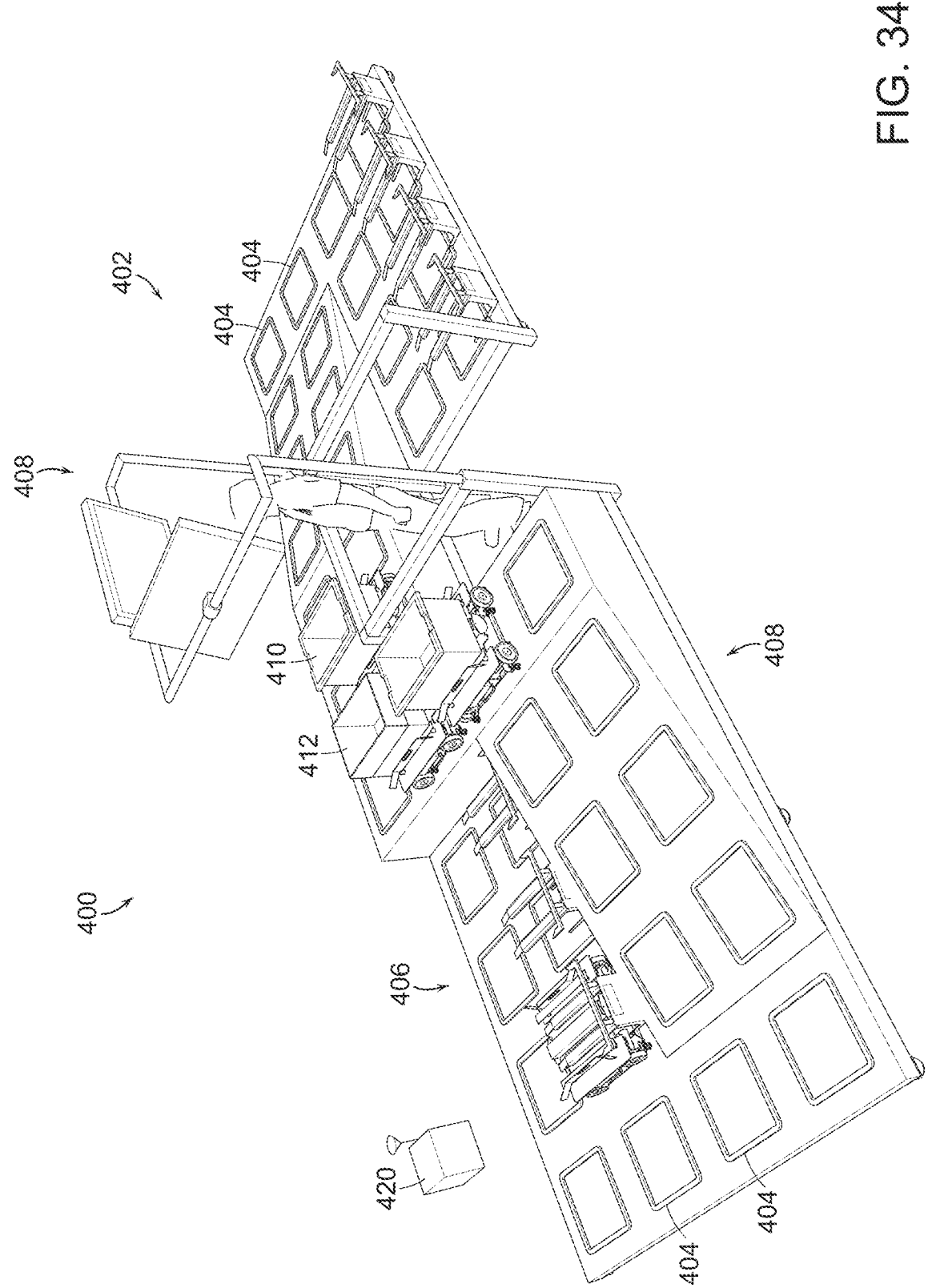
FIG. 34 shows an illustrative diagrammatic view of a manual processing station for use in a system in accordance with an embodiment of the present invention.

Systems and methods of various embodiments of the invention may be used in a wide variety of object processing systems such as sortation systems, automated storage and retrieval systems, and distribution and redistribution systems. For example, in accordance with further embodiments, the invention provides systems that are capable of automating the outbound process of a processing system. The system may include one or more automated picking stations 250 (as shown in FIG. 33) and manual picking stations 280 (as shown in FIG. 34) that are supplied with containers by a fleet of mobile carriers that traverse a smart flooring structure formed of track segments as discussed above. The carriers may carry bins that can store objects. The system may provide a novel goods-to-picker system that uses a fleet of small mobile carriers to carry individual inventory totes and outbound containers to and from picking stations.

In accordance with an embodiment of the system includes an automated picking station that picks eaches from inventory totes and loads them into outbound containers. The system involves together machine vision, task and motion planning, control, error detection and recovery, and artificial intelligence grounded in a sensor-enabled, hardware platform to enable a real-time and robust solution for singulating items out of cluttered containers.

With reference to FIG. 33, the automated picking system 300 perceives the contents of the containers using a multi-modal perception unit and uses a robotic arm equipped with an automated programmable motion gripper and integrated software in processing system 320 to pick eaches from homogeneous inventory totes and place them into heterogeneous outbound containers. These elements are co-located in a work cell that meets industry standard safety requirements and interfaces with track system to keep the automated picking system fed with a continual supply of inventory totes and outbound containers.

In particular, the system 300 includes an array 302 of track elements 304 as discussed above, as well as automated carriers 306 that ride on the track elements 304 as discussed above. One or more overhead perception units 308 (e.g., cameras or scanners) acquire perception data regarding objects in bins or totes 310, as well as perception data regarding locations of destination boxes 312. A programmable motion device such as a robotic system 314 picks an object from the bin or tote 310, and places it in the adjacent box 312. One or both of the units 310, 312 are then moved automatically back into the grid, and one or two new such units are moved into position adjacent the robotic system. Meanwhile, the robotic system is employed to process another pair of adjacent units (again, a bin or tote 310 and a box 312) on the other side of the robotic system 314. The robotic system therefore processes a pair of processing units on one side, then switches sides while the first side is being replenished. This way, the system 300 need not wait for a new pair of object processing units to be presented to the robotic system. The array 302 of track elements 304 may also include shelf stations 316 at which mobile units 306 may park or pick up either bins/totes 310 and boxes 312. The system operates under the control, for example, of a computer processor 320.

The manual pick station system is a goods-to-person pick station supplied by mobile automated movement carriers on track systems as discussed above. The system has the same form and function as the automated picking station in that both are supplied by the same carriers, both are connected to the same track system grid, and both transfer eaches from an inventory tote to an outbound container. The manual system 400 (as shown in FIG. 34) relies on a manual team member to perform the picking operation.

Also, the manual system raises carriers to an ergonomic height (e.g. via ramps), ensures safe access to containers on the carriers, and includes a monitor interface (HMI) to direct the team member's activities. The identity of the SKU and the quantity of items to pick are displayed on an HMI. The team member must scan each unit's UPC to verify the pick is complete using a presentation scanner or handheld barcode scanner. Once all picks between a pair of containers are complete, the team member presses a button to mark completion.

In accordance with this embodiment (and/or in conjunction with a system that includes an AutoPick system as discussed above), a system 400 of FIG. 34 may include an array 402 of track elements 404 that are provided on planer surfaces 406 as well as inclined surfaces 408 leading to further planar surfaces. The system 400 may also include visual data screens that provide visual data to a human sorter, informing the human sorter of what goods are to be moved from totes or bins 410 to destination boxes 412. The system operates under the control, for example, of a computer processor 420.

While the bulk of the overall system's picking throughput is expected to be handled by automated picking systems, manual picking systems provide the carrier and track system the ability to (a) rapidly scale to meet an unplanned increase in demand; (b) handle goods that are not yet amenable to automation; and (c) serve as a QA, problem solving, or inventory consolidation station within the overall distribution system. The system therefore, provides significant scaling and trouble-shooting capabilities in that a human sorted may be easily added to an otherwise fully automated system. As soon as a manual picking system is enabled (occupied by a sorter), the system will begin to send totes or bins 410 and boxes 412 to the manual picking station. Automated picking stations and manual picking stations are designed to occupy the same footprint, so a manual picking station may later be replaced with an automated picking station with minimal modifications to the rest of the system.

Again, a carrier is a small mobile robot that can interchangeably carry an inventory tote, outbound container, or a vendor case pack. These carriers can remove or replace a container from or onto a storage fixture using a simple linkage mechanism. Since a carrier only carries one container at a time, it can be smaller, lighter, and draw less power than a larger robot, while being much faster. Since the carriers drive on a smart tile flooring, they have lessened sensing, computation, and precision requirements than mobile robots operating on bare floor. These features improve cost to performance metrics.

Unlike shuttle- or crane-based goods-to-picker systems where the mobile component of the system is constrained to a single aisle, all carriers run on the same shared roadway of track sections as independent container-delivery agents. The carriers can move forward, backward, left or right to drive around each other and reach any location in the system. This flexibility allows the carriers to serve multiple roles in the system by transporting (a) inventory totes to picking stations, (b) outbound containers to picking stations, (c) inventory totes to and from bulk storage, (d) full outbound containers to discharge lanes, and (e) empty outbound containers into the system. Additionally, the carriers may be added incrementally as needed to scale with facility growth.

The track floor modules are standard-sized, modular, and connectable floor sections. These tiles provide navigation and a standard driving surface for the carriers and may act as a storage area for containers. The modules are connected to robotic pick cells, induction stations from bulk storage, and discharge stations near loading docks. The modules eliminate the need of other forms of automation, e.g. conveyors, for the transportation of containers within the system.

Figure 35:
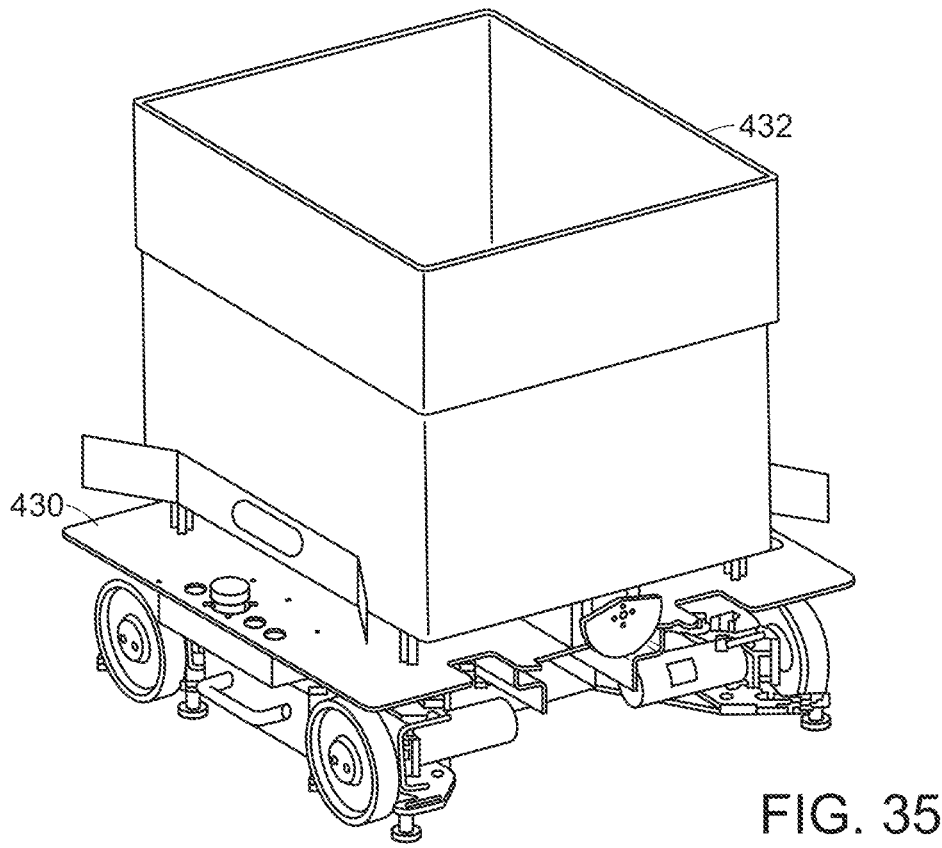
FIG. 35 shows an illustrative diagrammatic view of another bin on a carrier in accordance with another embodiment of the present invention.
Figure 36:
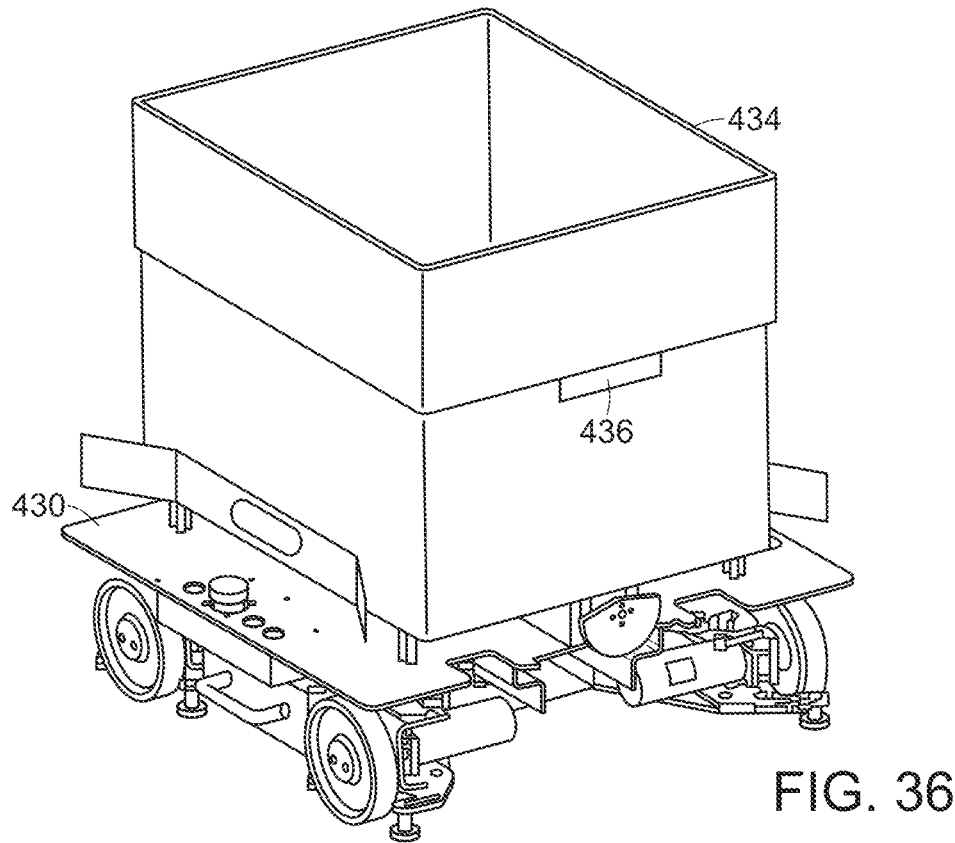
FIG. 36 shows an illustrative diagrammatic view of a bin that includes a window in accordance with a further embodiment of the present invention;'
Figure 37:
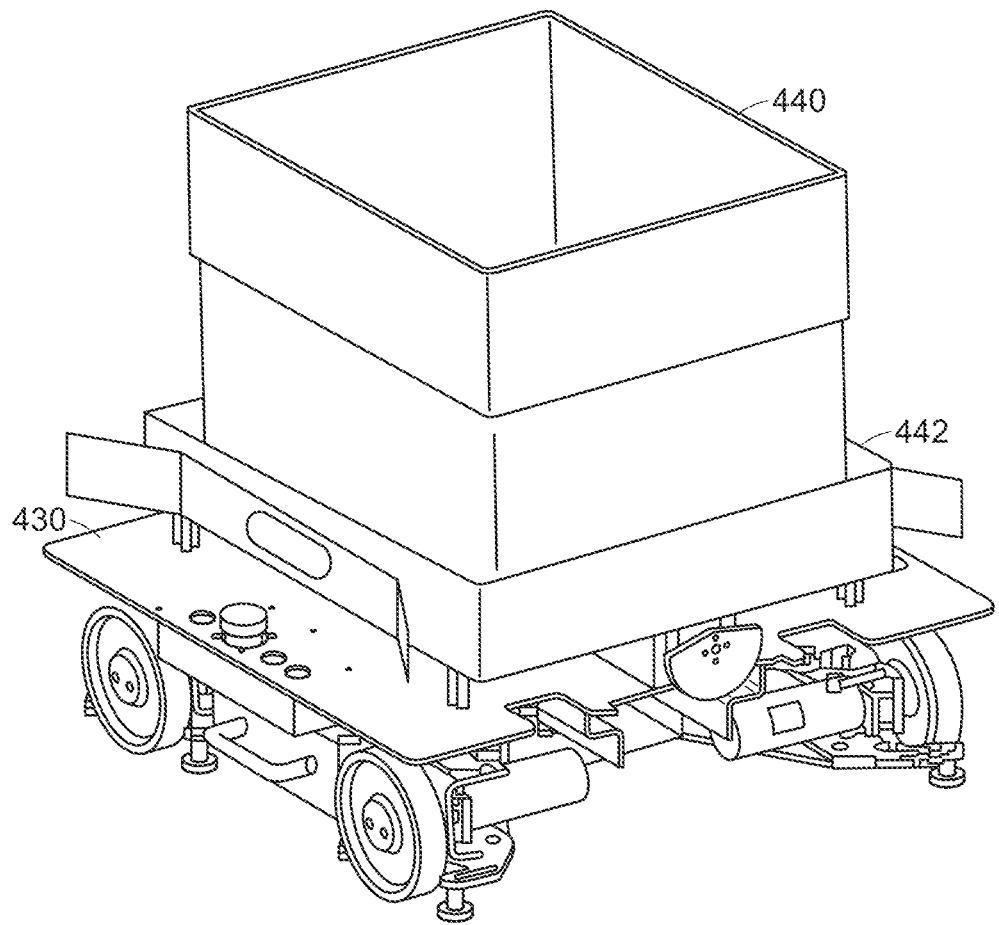
FIG. 37 shows an illustrative diagrammatic view of a bin that is provided on a bin tray on a carrier in accordance with a further embodiment of the present invention.

FIG. 35 shows a carrier 430 in accordance with any of the above disclosed embodiments, wherein the bin is a cardboard box 432 for use in any shipping processes (e.g., shipping by truck), and may be particularly designed for use by a particular site (e.g., customer) to whom the processed objects are to be sent. For example, and with reference to FIG. 36, such a box 434 may include features (such as a window or opening 436) through which goods may be viewed. Further, and with reference to FIG. 37, in further embodiments, where boxes 440 to be used are non-standard, an adapter tray 442 may be used to accommodate fitting the non-standard box 440 to a carrier 430.

Figure 38:
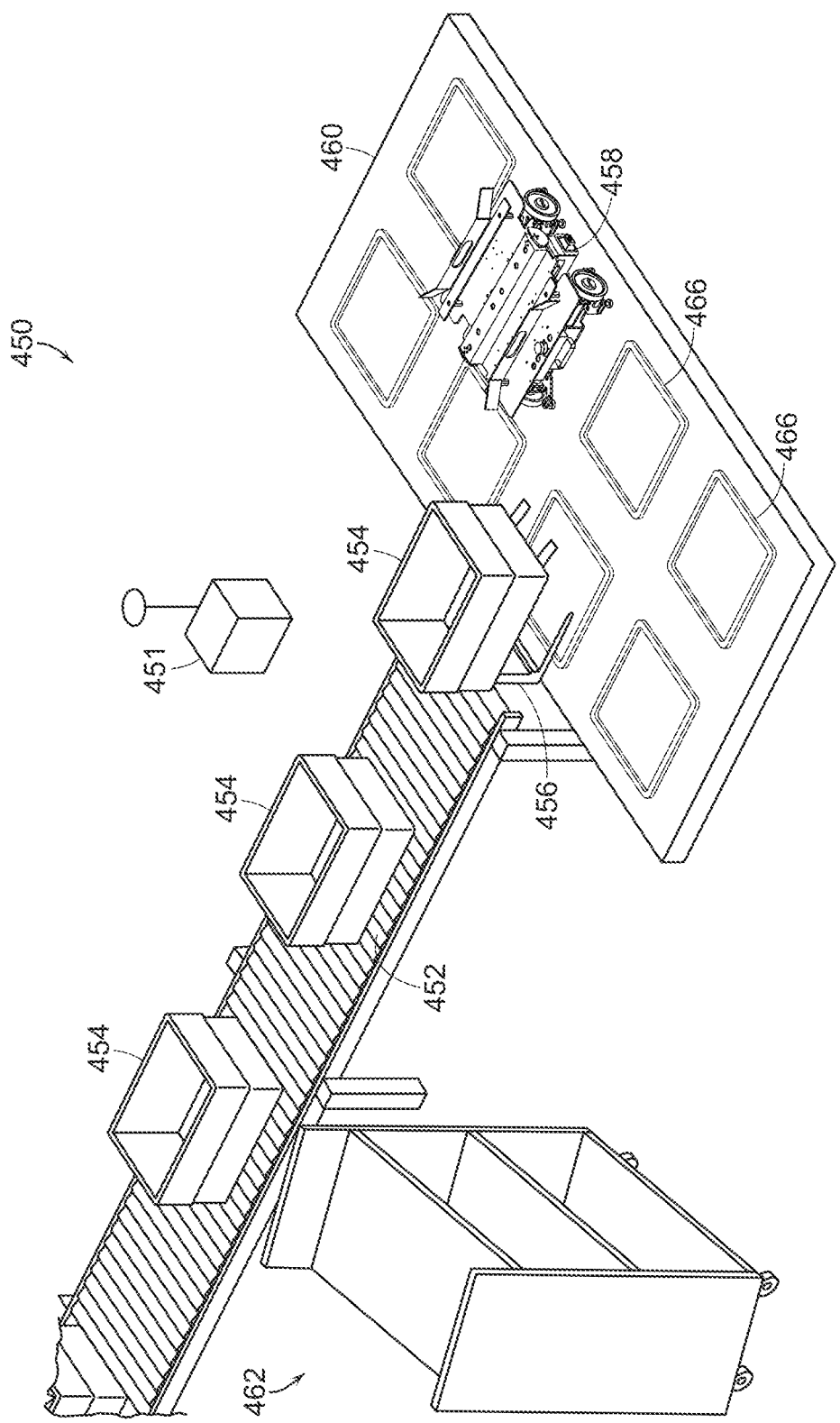
FIG. 38 shows an illustrative diagrammatic view of a bin infeed/outfeed system in accordance with another embodiment of the present invention.

With reference to FIG. 38, an in-feed system allows containers to be inducted into and discharged from the track system. On the inbound side of the system, the in-feed system inducts inventory totes (IVCs) and processing containers (VCPs) from bulk storage and discharges depleted inventory totes back into bulk storage when they are no longer needed. On the outbound side of the system, system inducts empty containers (OBCs) and discharge sequenced containers (OBCs and VCPs) to be built into carts. The in-feed system may also serve as a problem solving station, or inventory consolidation station for containers that must be processed outside the overall system.

Conceptually, an in-feed station is a special module that transfers containers between the track system and a buffer conveyor via a transfer mechanism. A team member inducts a container into the system by placing the container on the buffer conveyor located at an ergonomic height. The buffer conveyor conveys the container to a transfer mechanism, which transfers it onto a carrier. This assumes that the buffer conveyor is a 20' zero pressure accumulation MDR conveyor. This conveyor may be extended.

FIG. 38 shows an in-feed system 450 that includes a gravity conveyor 452 that feeds totes 454 to a shelf 456, from which a mobile robot 458 as discussed above, may acquire each tote in serial fashion for movement about a track module 460 having track sections 466 as also discussed above. The totes may be loaded by a human that places totes of objects onto the conveyor as shown at 462. The system operates under the control, for example, of a computer processor 451.

Discharging a container proceeds in reverse: the transfer mechanism transfers the container from the carrier to the buffer conveyor, where a team member may remove it from the system. If a height change is needed, an inclined belt conveyor can be used to bridge the height difference.

In accordance with an embodiment the in-feed station's transfer mechanisms may be provided by a serial transfer mechanism that uses a linear actuator to place containers onto and remove containers from an actuated shelf that can be accessed by carriers. The linear actuator can run in parallel with the carrier's motion under the shelf in order to reduce cycle time. In further embodiments, the in-feed may be partially or fully automated using gravity fed conveyors and/or further programmable motion control systems.

The system may provide a serial transfer system in which mobile carriers on a track grid carry totes onto extendable shelves similar to those discussed above, except that the latch mechanism on the shelf may extend out toward a tote to retrieve a tote. The extendable shelves are in communication with ramps, which lead to raised conveyor stations. The system operates under the control, for example, of a computer processor.

To accept an inducted container, a carrier drives into a designated module. While the carrier is entering the module, the actuator extends a loaded container on top of the carrier. The carrier engages its storage latch, the transfer mechanism disengages its latch, and the actuator retracts. Once retracted, the carrier perpendicularly exits the module and the next queued carrier repeats this process.

To discharge a carried container, a carrier drives into the mechanism's module while the actuator extends an empty shelf. The transfer mechanism engages a storage latch, the carrier disengages its storage latch, and the transfer mechanism retracts. Once retracted, the carrier perpendicularly exits the module as described above while the container is removed from the system by the buffer conveyor.

In accordance with further embodiments the system may include a continuous transfer mechanism, which is a design concept that uses a series of conveyors to match the speed of a container to a carrier, in order to induct and discharge the container while both are in motion.

To induct a container, the carrier engages its storage latch and drives under the transfer mechanism at constant speed. The belted conveyor accelerates the container and hands it off to a set of strip belt conveyors that match the speed of the carrier. The carrier receives the container and secures it using its own storage latches.

To discharge a container, the carrier disengages its storage latch and drives under the transfer mechanism at a constant speed. The container is handed off to a set of strip belt conveyors that match the speed of the carrier and carry the container up a short incline to a belted conveyor. The belted conveyor reduces the speed of the container, if necessary, and transfers it to the buffer conveyor.

Such a transfer system may include mobile carriers on track sections that run underneath an elevated conveyor. The transfer system may include a belted conveyor (for speed matching), that passes totes to a pair of strip belt conveyors that urge a tote onto a carrier. The system operates under the control, for example, of a computer processor.

The system, therefore, accepts inventory from a bulk storage solution as input and produces sequenced containers, amenable to being constructed into carts, as output. The desired output of the system is specified as a collection of picking and sequencing orders that are grouped into waves.

A picking order is a request to transfer a specified quantity of a SKU from an inventory tote into an outbound container. An outbound container may contain SKUs from many different picking orders that are destined for similar locations in a store and have mutually compatible transportation requirements. For example, a picking order may request two packs of Body Washes, one pack of Dove Soap, and 12 other items to be placed into an outbound container intended to replenish the soap aisle in a particular store.

A sequencing order is a request to sequentially deliver a group of containers to an in-feed station to be assembled into a cart. A cart is assembled from a mixture of VCPs (for SKUs that are replenished in full-case quantity) and outbound containers (filled by picking orders) that are used to replenish nearby sort points within a store. For example, a sequencing order may request two other outbound containers, and five VCPs to be loaded onto a cart destined for the health & beauty department of a particular store.

All orders that are required to fill a trailer form a wave that must be completed by that trailer's cut time. Each wave begins inducting the necessary inventory containers and VCPs from bulk storage into modules. Those containers remain on modules until the wave is complete, at which point they are either (i) sequenced into carts, (ii) returned to bulk storage, or (iii) retained for use in a future wave. Multiple waves are processed concurrently and seamlessly: one wave may be inducting inventory while two waves are processing picking orders and a forth wave is being sequenced.

The operation for inducting inventory into the system, fulfilling picking orders, and sequencing output, may further include the following. Inventory is inducted into the system at in-feed stations bordering the external bulk storage solution. Items intended to go through the each-based process must be decanted and de-trashed into inventory containers that contain homogeneous eaches before being loaded into the system. VCPs intended to pass through the system must be either compatible with carrier transport or placed in a compatible container, e.g. a tray.

Each in-feed station is manned by a team member who accepts containers from the bulk storage solution and transfers them onto a short length of conveyor external to the system. Carriers dock with the station, accept one container each, and depart to store their container in the track grid. The container is scanned during induction to determine its identity, which is used to identify its contents and track its location within the module system.

Once all picking orders that require an inventory container are complete—and no upcoming waves are projected to require it—the container is discharged from the system by completing the induction process in reverse. A carrier docks with the station, deposits its container, and a team member returns the containers to bulk storage.

This same induction process is used to induct empty outbound containers into the system using the in-feed station located near the trailer docks. Just as with inventory containers, empty outbound containers are inducted into the system throughout the day only as they are needed to process active waves. Inventory containers, VCPs, and outbound containers are largely interchangeable: the same carriers, in-feed stations, and track modules are used to handle all three types of containers.

Picking orders are processed by automated picking stations and manual picking stations. Each picking order is completed by requesting two carries to meet at a pick station: one carrying an inventory container of the requested SKU and the second carrying the desired outbound container. Once both carriers arrive the picking station transfers the requested quantity of eaches from the inventory container to the outbound container. At this point, the carriers may carry the containers back into storage or to their next destination.

The system scheduling software optimizes the assignment of storage locations sequence of orders, scheduling of arrival times, and queuing of carriers to keep pick stations fully utilized, and to optimize scheduling and usage of the grid so as to avoid traffic jams and collisions. Orders that are not amenable to automated handling are assigned to manual picking station. Inventory and outbound containers are stored near the picking stations that are assigned to process those orders. When possible, multiple orders that require the same container are collated to minimize the storage and retrieval operations.

Once all containers required to build a cart are available, i.e. the requisite VCPs have been inducted and picking orders are completed, those containers are eligible to be sequenced. Containers are sequenced by requesting carriers to transport containers from their current location to an in-feed station that borders the trailer docks. All containers for the cart are delivered to the same in-feed as a group, i.e. all containers assigned to one cart are discharged before any containers for a different cart.

Team members at the in-feed station accept the containers delivered by carriers, assemble carts, and load completed carts onto the appropriate trailers. The carriers and personnel may interact with an in-feed station as discussed above.

Figure 39:
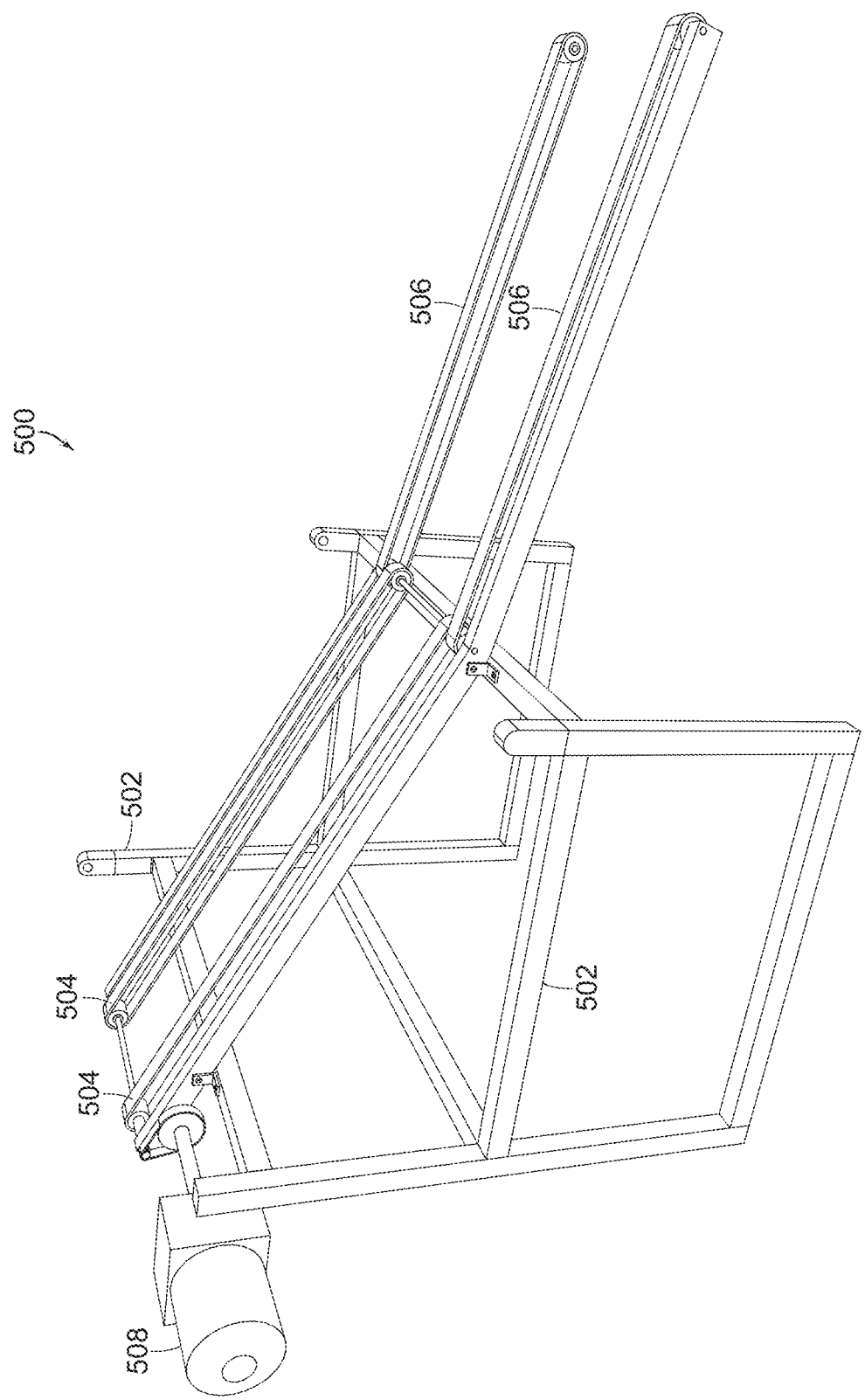
FIG. 39 shows an illustrative diagrammatic view of another bin infeed/outfeed system in accordance with a further embodiment of the present invention that includes intermediate belts.

In accordance with a further embodiment, the invention provides a feed station 500 as shown in FIG. 39 that may feed containers to and from a track system. The feed station 500 includes a support frame 502 that supports at least one conveyor for ferrying containers to and from a track. In particular, the embodiment of FIG. 39 includes two pairs of conveyors 504, 506 that are bi-directionally driven by a motor 508. The frame 502 provides enough clearance on the underside thereof from front to back, that a mobile carrier 510 may travel underneath the frame 502 as shown in FIG. 40.

Figure 41A:
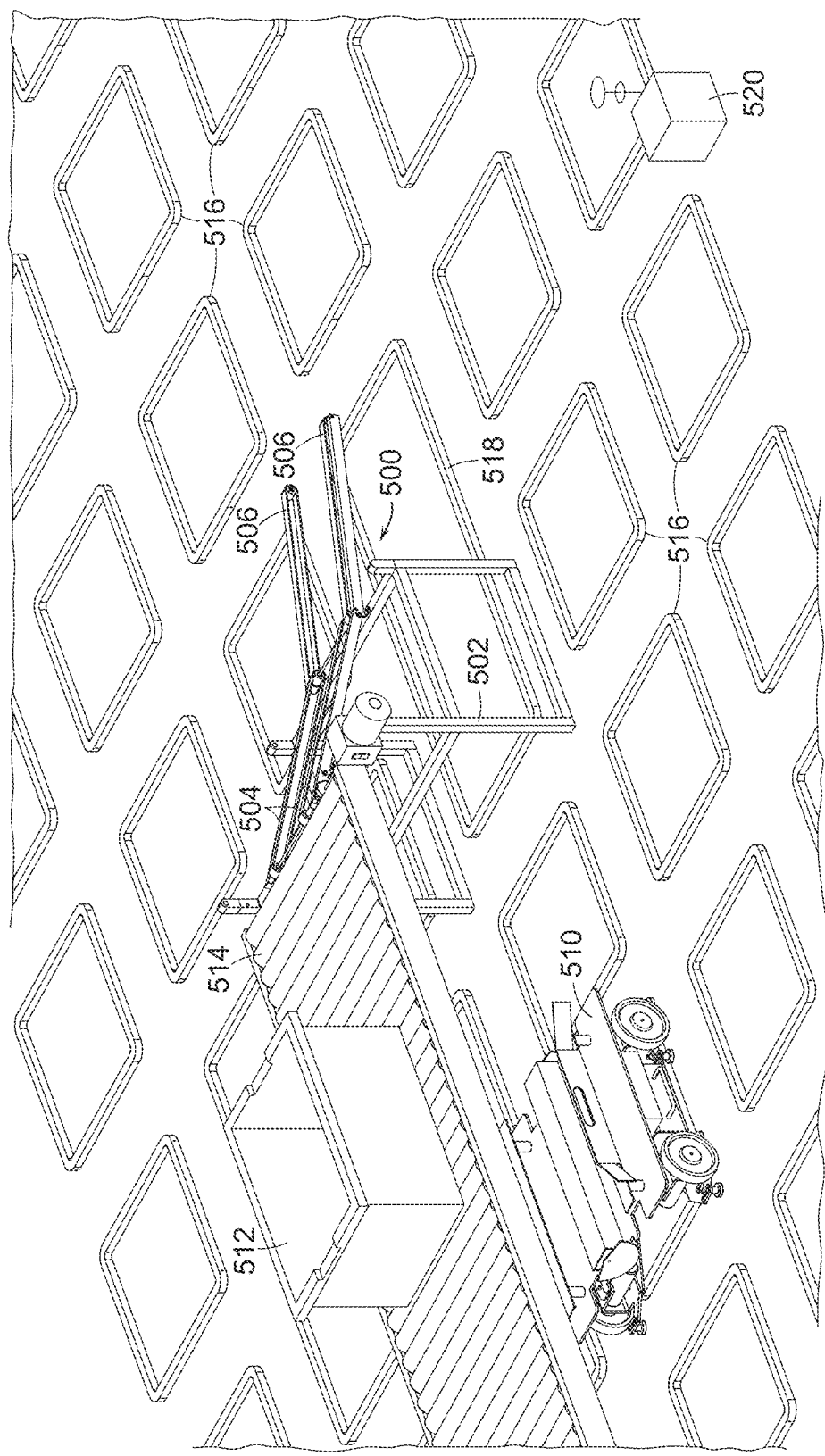
FIGS. 41A-41E show illustrative diagrammatic views of stages of a bin being fed into an object processing system using the bin infeed/outfeed system of FIG. 39.
Figure 41B:
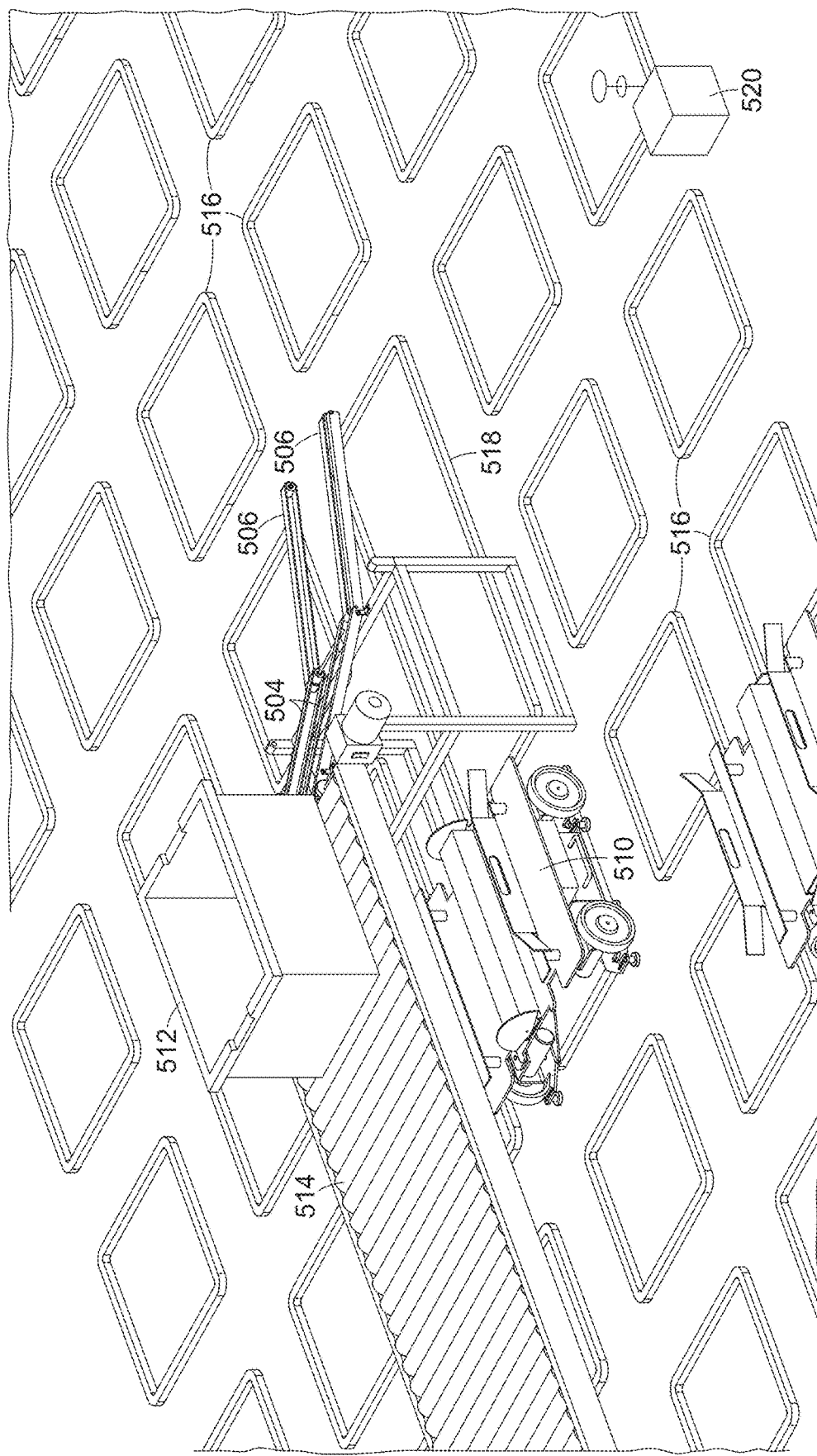
Figure 41C:
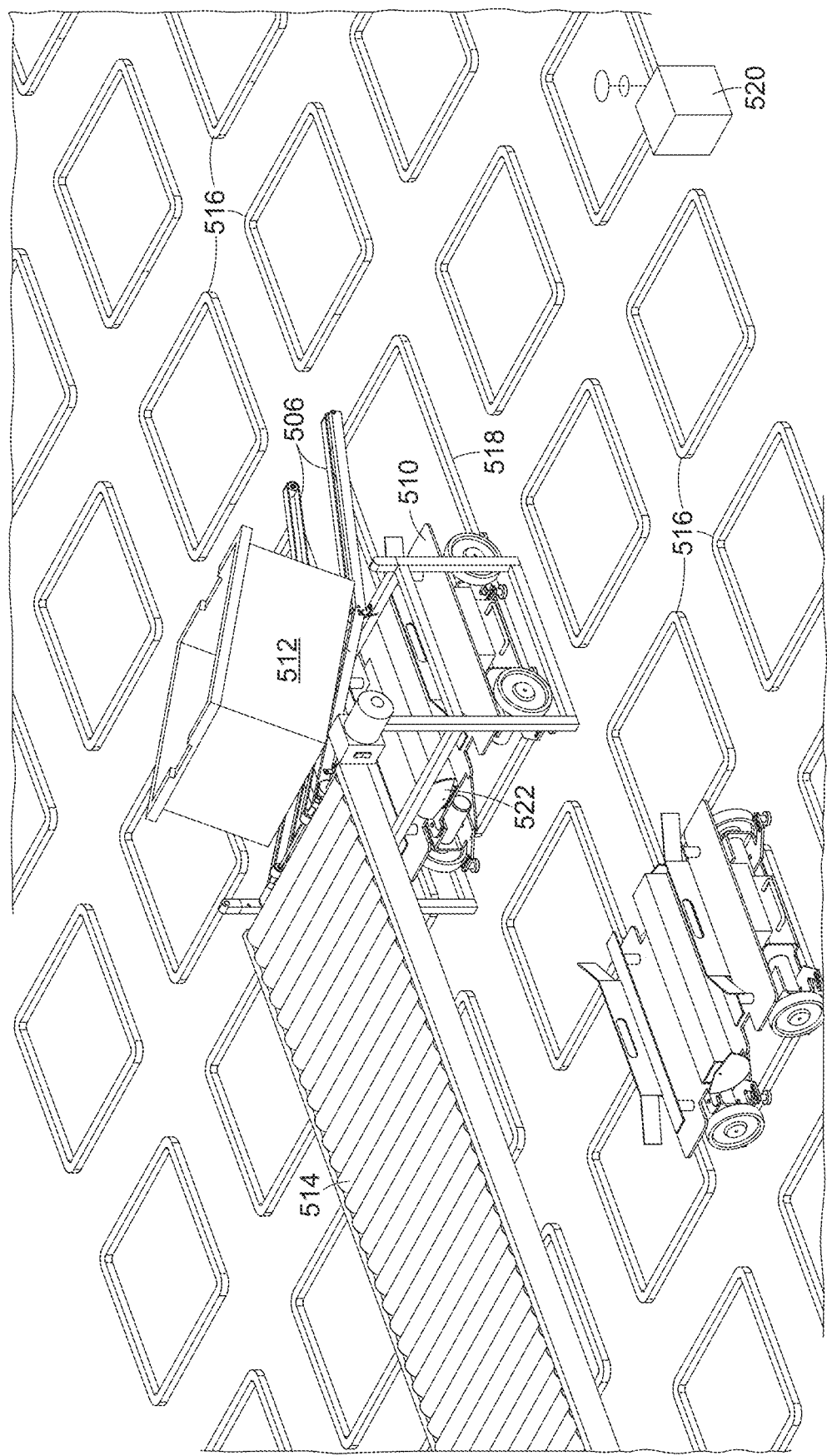
Figure 41D:
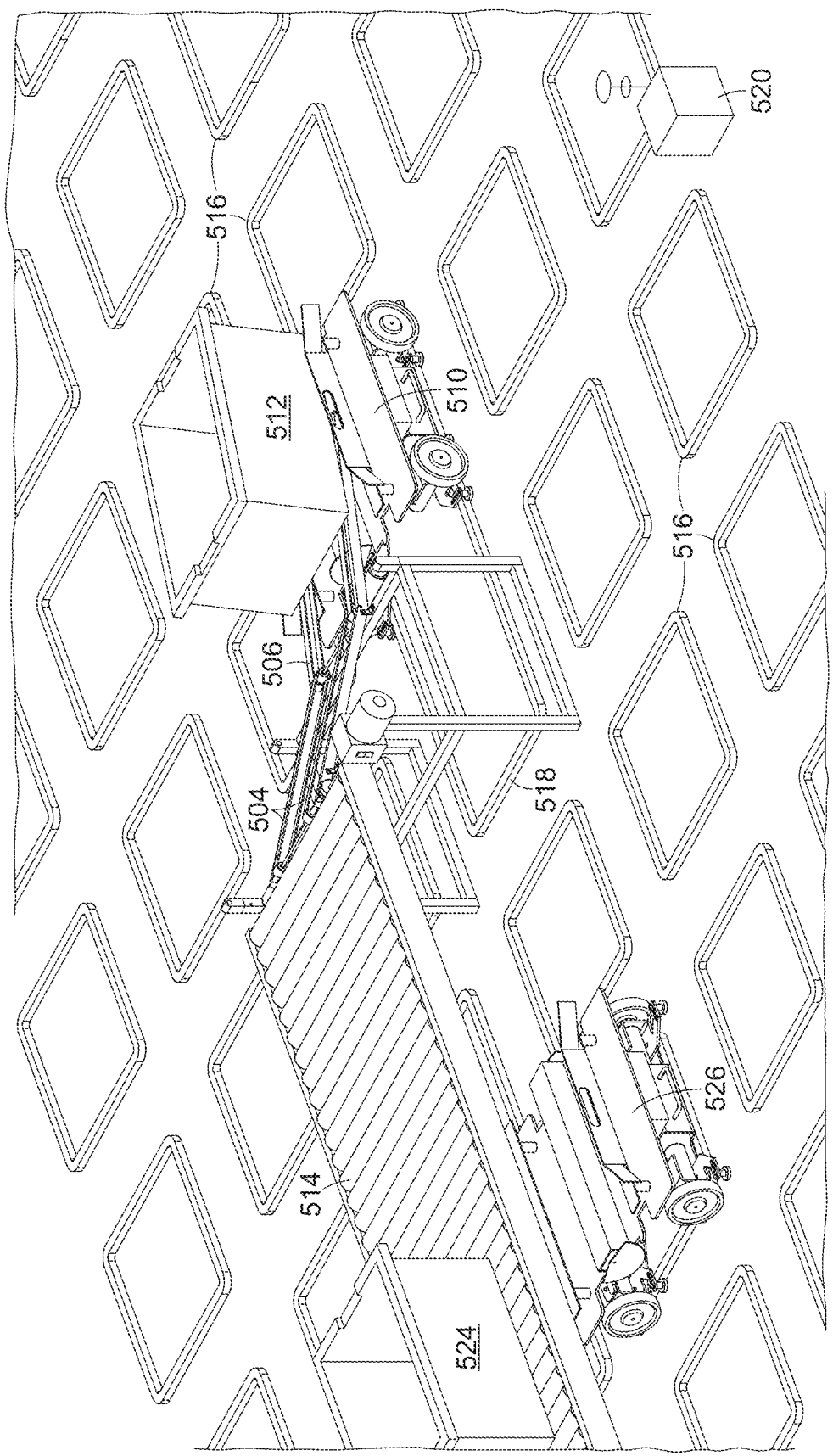
Figure 41E:
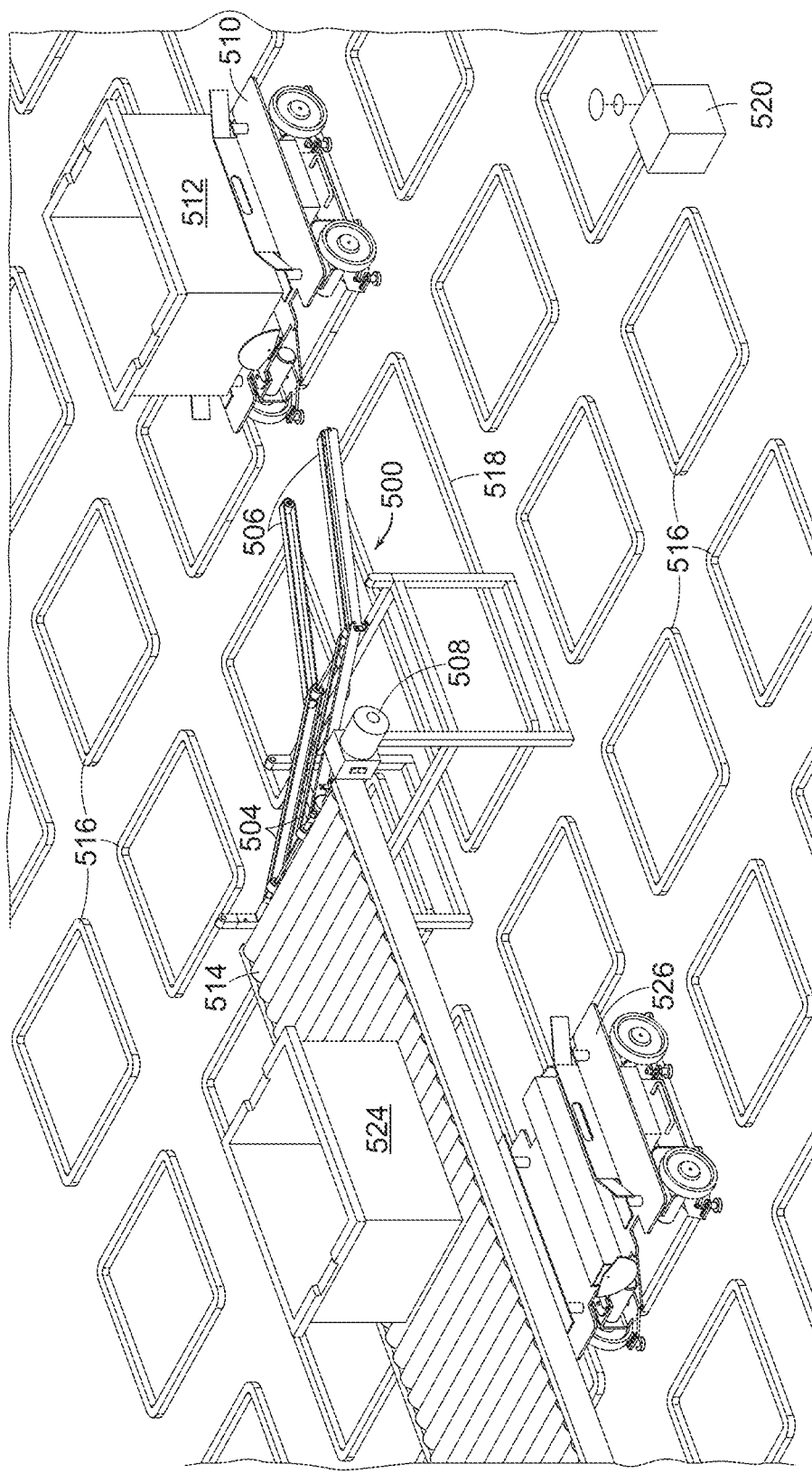

For example, FIGS. 41A-41E show a tote 512 traveling along a conveyor 514 above a track system that includes track sections 516 as discussed above. As the tote 512 is moving, a mobile carrier 510 moves underneath the conveyor 514 and matches the speed of movement of the tote 512 on the conveyor 514 in an inbound direction. As the tote (and the mobile carrier 510) approach the feed station 500, the motor 508 causes the strip belts 504, 506 to move in the direction of movement of the conveyor 514 and to match the speed of the conveyor 514 (FIG. 41B). Paddles 522 on the mobile carrier 510 are flipped up and the mobile carrier 510 moves under the tote 512 as it descends along the driven belts 504, 506 at the same speed as the mobile carrier 510 (FIG. 41C). The tote 512 engages the mobile carrier 510 (FIG. 41D), and is then fully transferred to the mobile carrier 510 (FIG. 41E). As shown in FIG. 41E, another tote 524 may then be provided on the conveyor 514, and another mobile carrier 526 may be driven to similarly engage the tote 524 as discussed above. The track section 518 underneath the feed station 500 may be provided as an extended (e.g., double) track section to assist in maintaining alignment of the mobile carrier 510 on the track system during transfer of a tote.

Figure 42A:
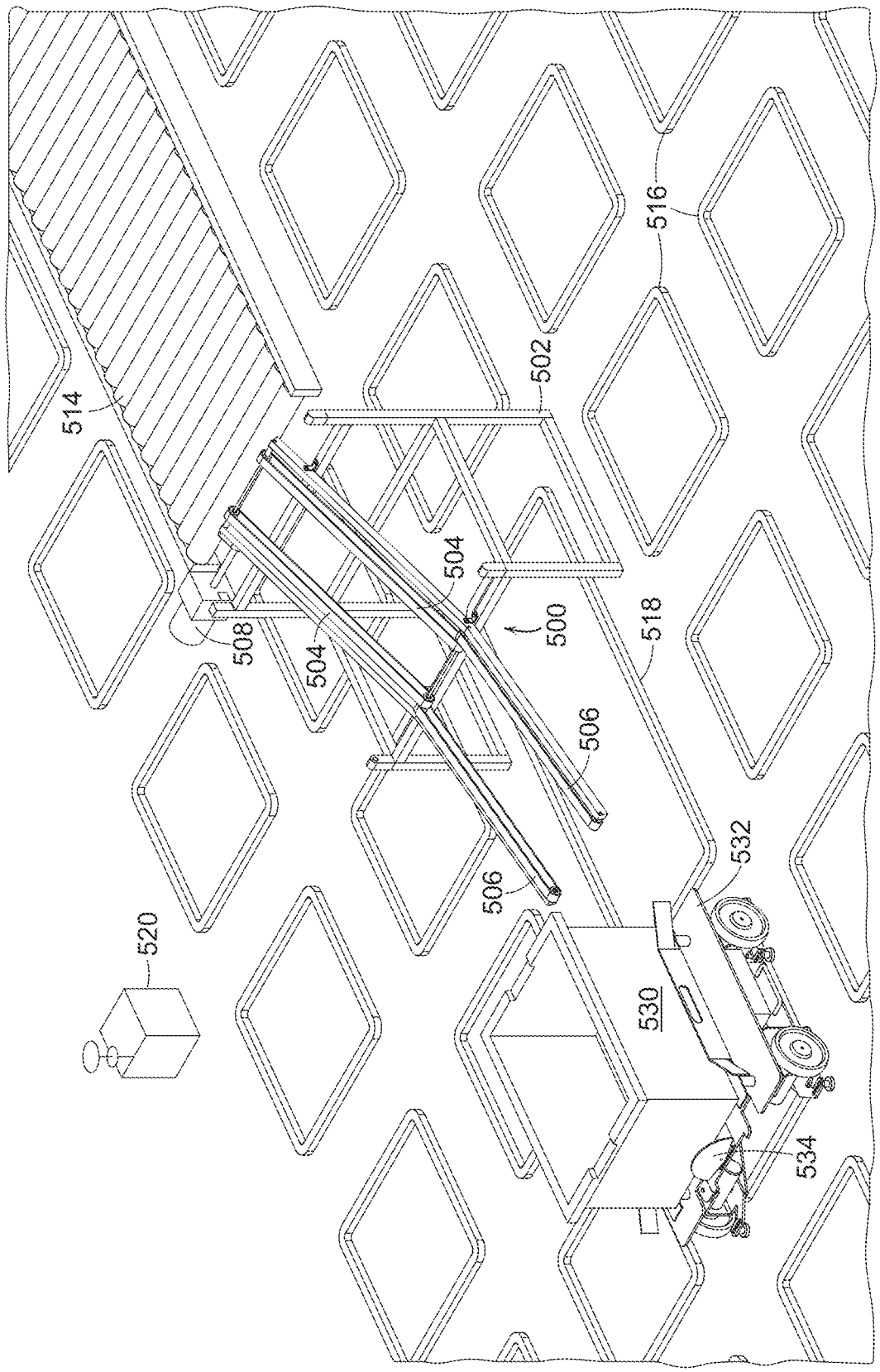
FIGS. 42A-42D show illustrative diagrammatic views of stages of a bin being removed from an object processing system using the bin infeed/outfeed system of FIG. 39.
Figure 42B:
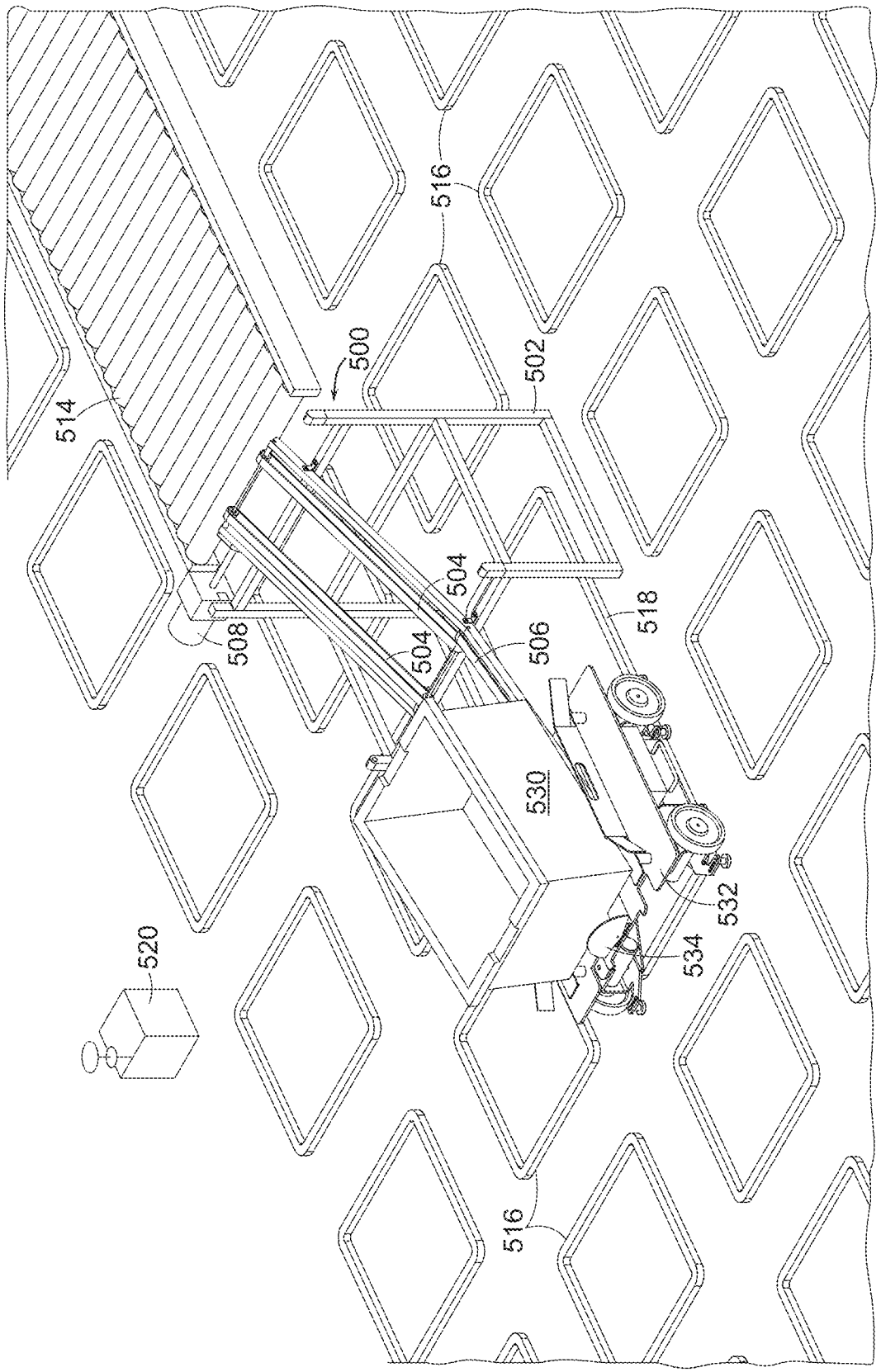
Figure 42C:
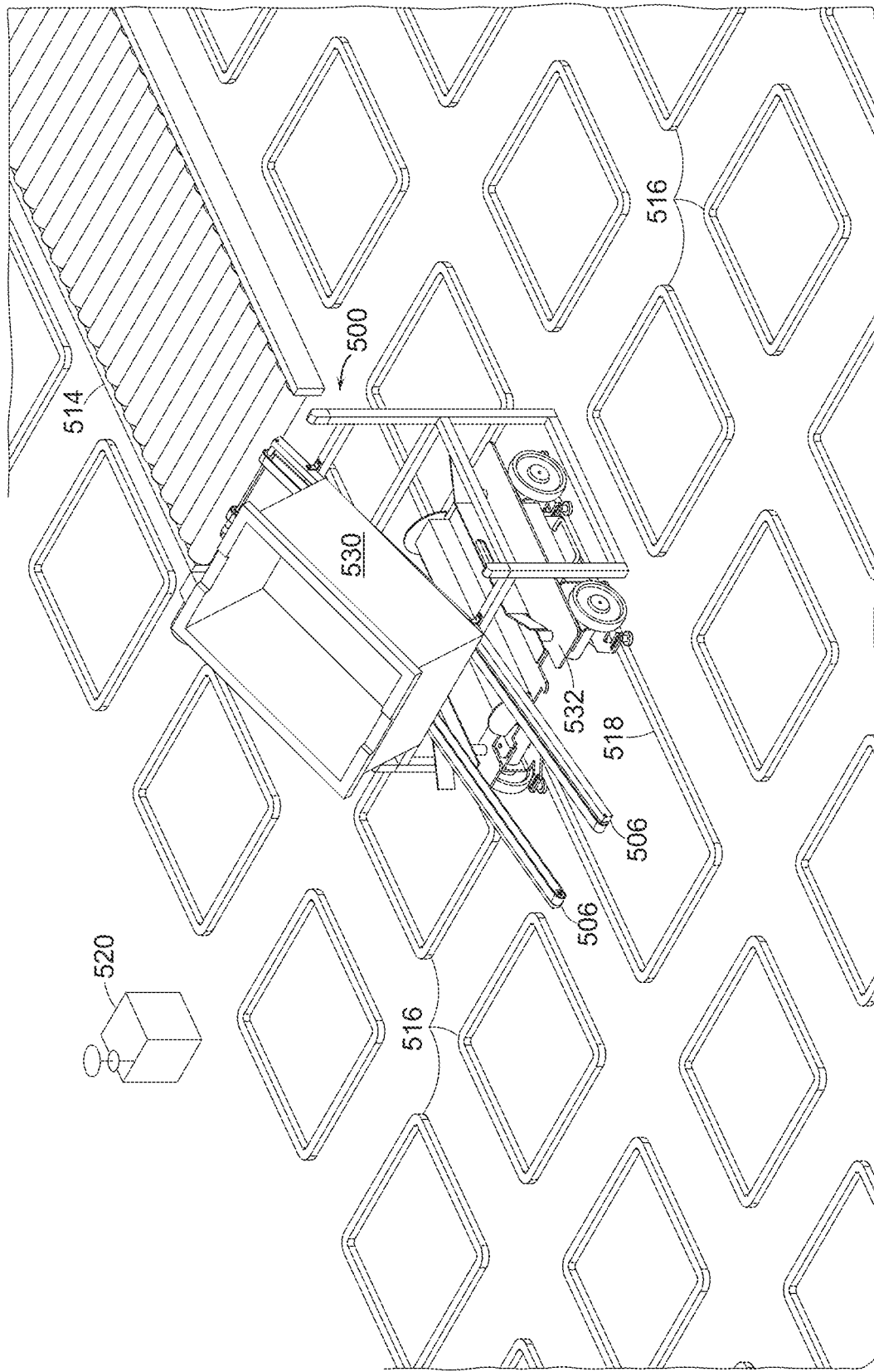
Figure 42D:
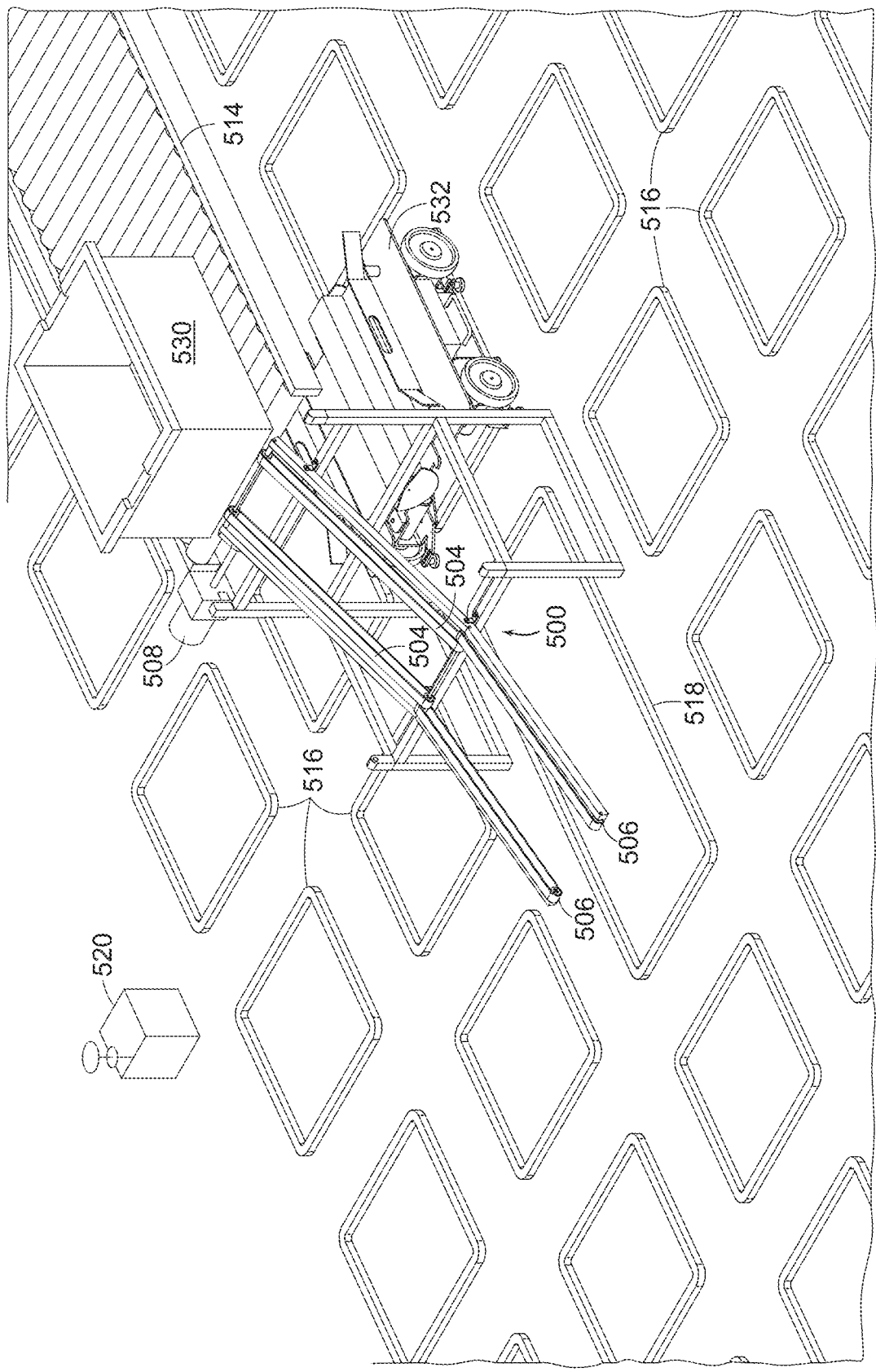

With reference to FIGS. 42A-42D, a tote 530 may be transferred from a mobile carrier 532 at the feed station 500 by providing that the motor 508 drives the strip belts 504, 506 at the same speed as that of the mobile carrier 532. With its rear paddle 534 engaged, the tote 530 on the mobile carrier 532 engages the belts 506 (FIG. 42B). The tote 530 is carried upward by the belts 506, 504 (FIG. 42C), and is provided to the conveyor 514 which carries the tote in an outbound direction (FIG. 42D).

Figure 43:
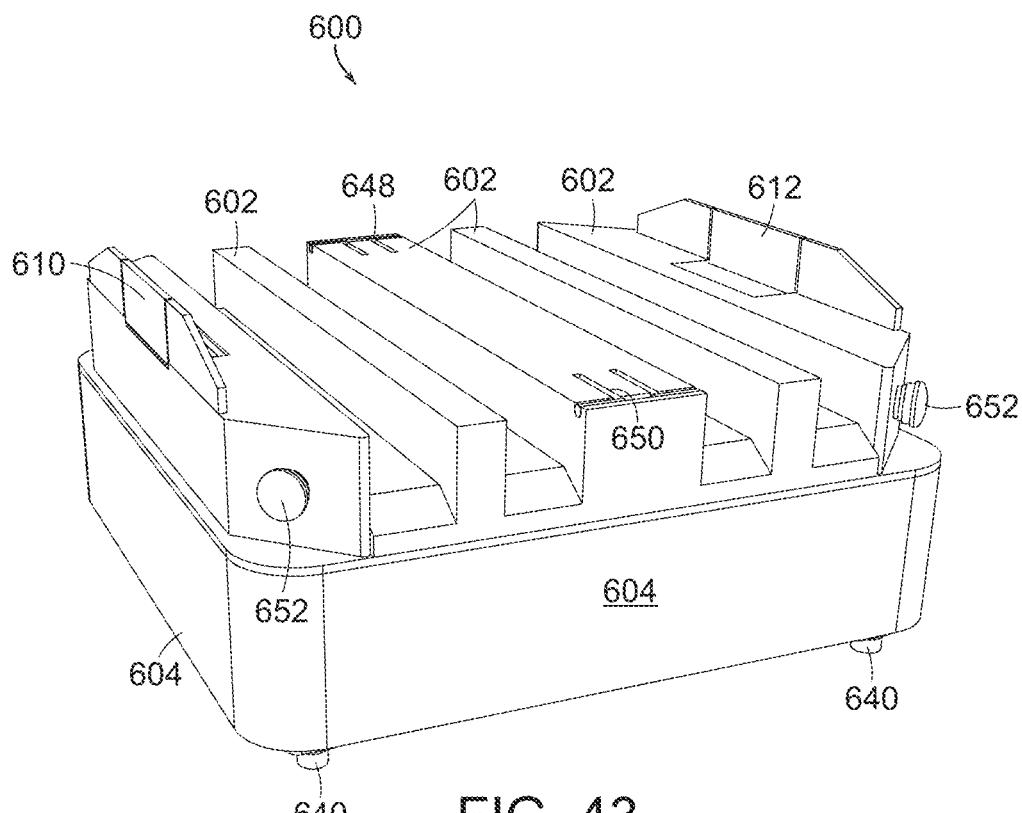
FIG. 43 shows an illustrative diagrammatic view of a further carrier in accordance a further embodiment of the present invention.

FIG. 43 shows a carrier 600 in accordance with a further embodiment of the present invention. The carrier 600 includes support surfaces 602 on which a bin may be supported, as well as actuatable centering plates 610, 612 that may be actuated to move toward (and away from) a center of the carrier 600 to secure a tote on the support surfaces 602. The carrier 600 may also include bar paddles 648, 650 on either end of the carrier 600 that may be used similar to paddles 48, 50 as discussed above to urge a tote onto or off of the carrier 600. The carrier 600 may further include emergency stop buttons 652 that may be actuated by human personnel during use. Once a carrier has been stopped, the computer system will know to route other carriers around the stopped carrier.

Figure 48A:
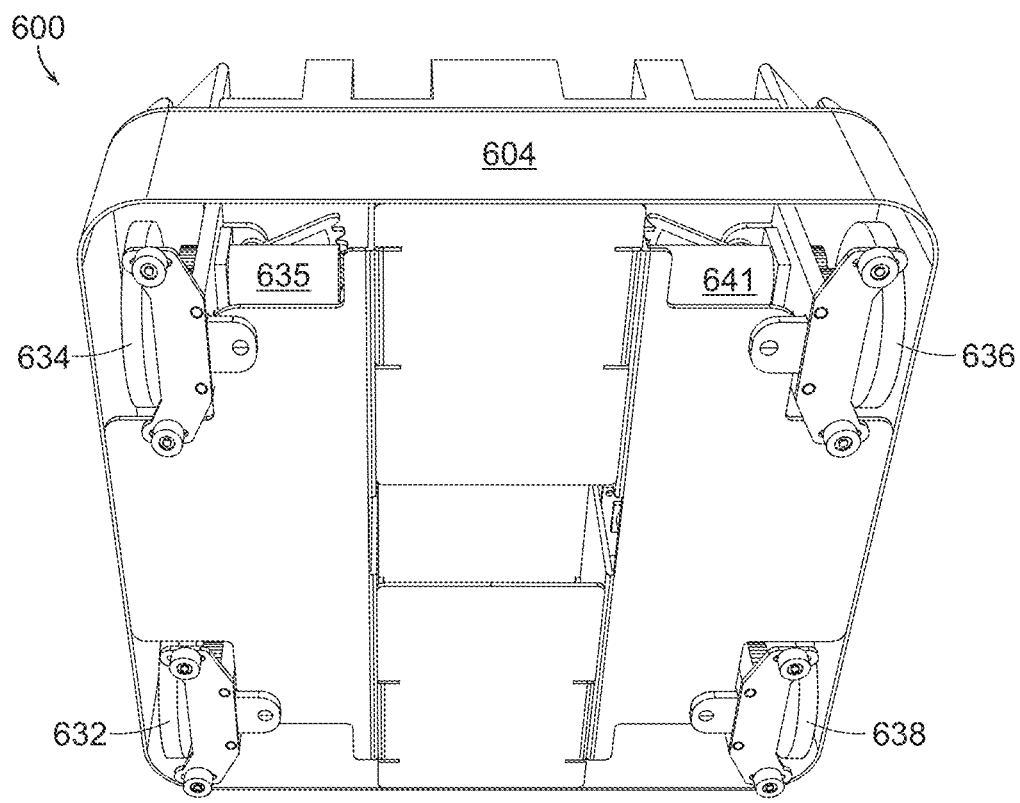
FIGS. 48A and 48B show illustrative diagrammatic views of the underside of the carrier of FIG. 43 with the wheels in a first position (FIG. 48A) and rotated (FIG. 48B)
Figure 48B:
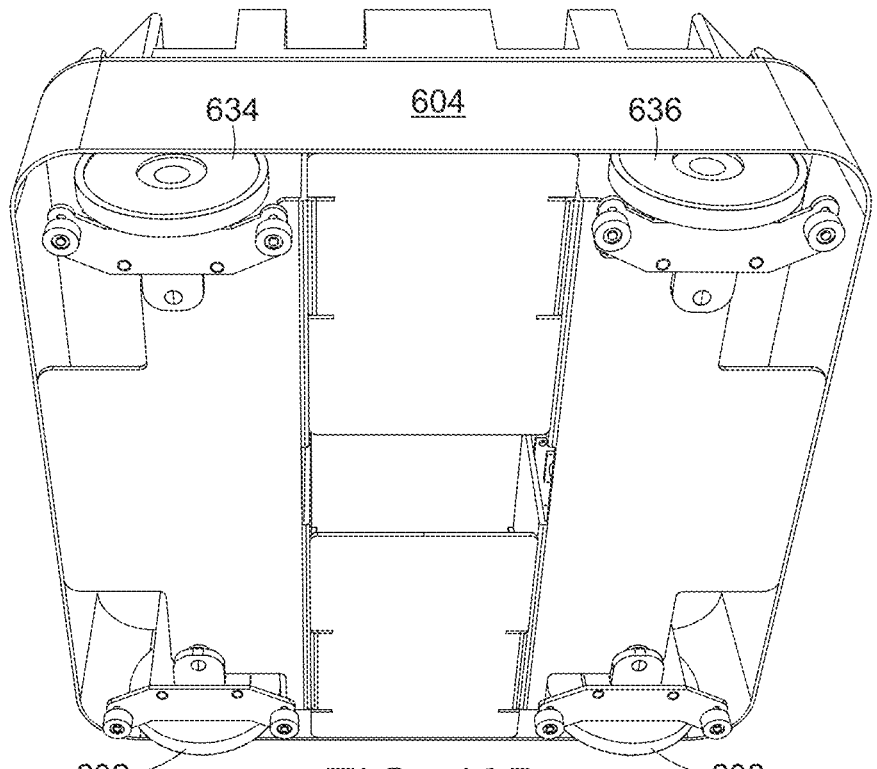

FIGS. 44A-44E show the carrier 600 without wheel coverings 604. As shown, the carrier 600 includes guide rollers 640 similar to the guide rollers 40 of the carrier 30 discussed above that are able to ride along a discontinuous track system. The carrier 600 further includes a set of wheels 632, 634, 636 and 638 (each of which is shown in FIGS. 48A and 48B). The wheels may each be actuated by motors (e.g., wheel 634 is actuated by motor 635, and wheel 636 is actuated by motor 641) via gear systems 629 (as shown further in FIG. 49B).

Figure 44A:
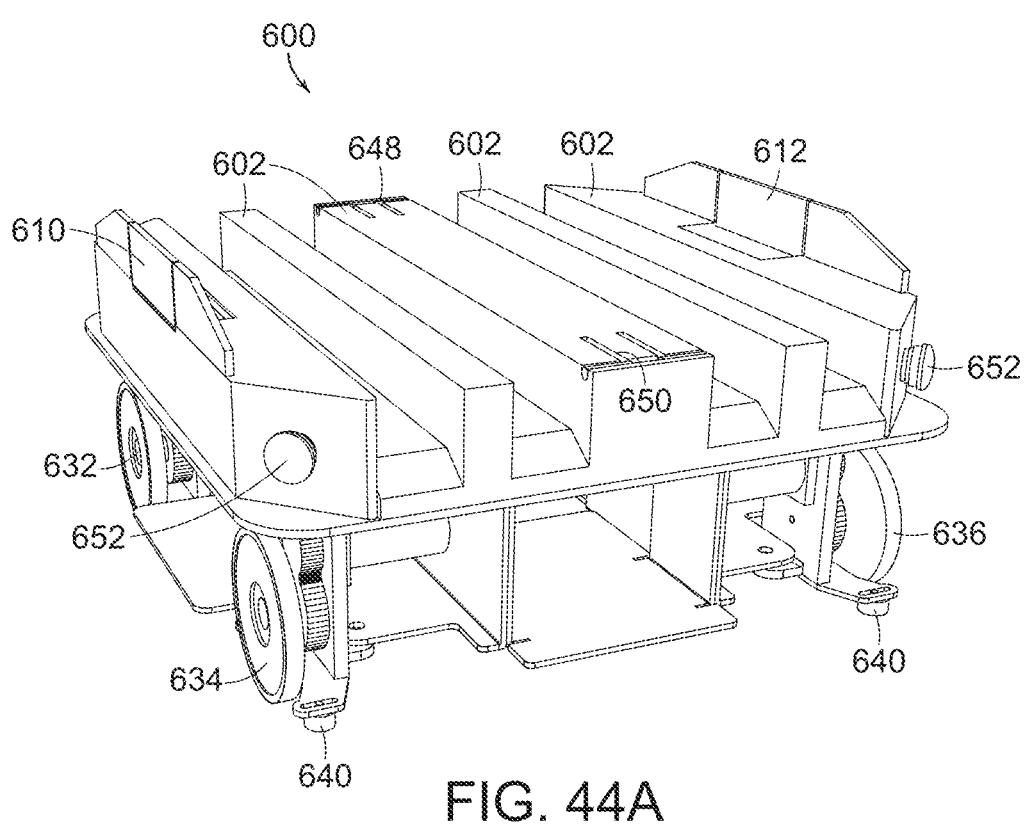
FIGS. 44A-44E show illustrative diagrammatic views of stages of the carrier of FIG. 43 activating bin management mechanisms.
Figure 44B:
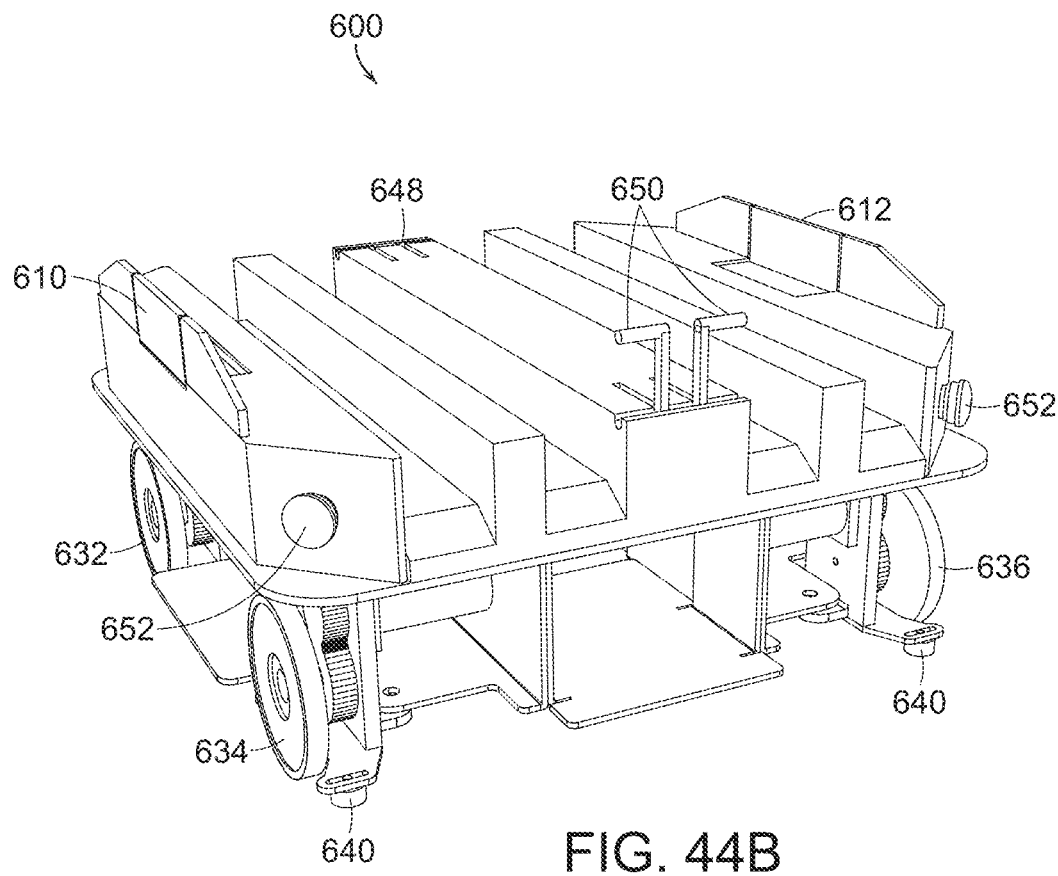
Figure 44C:
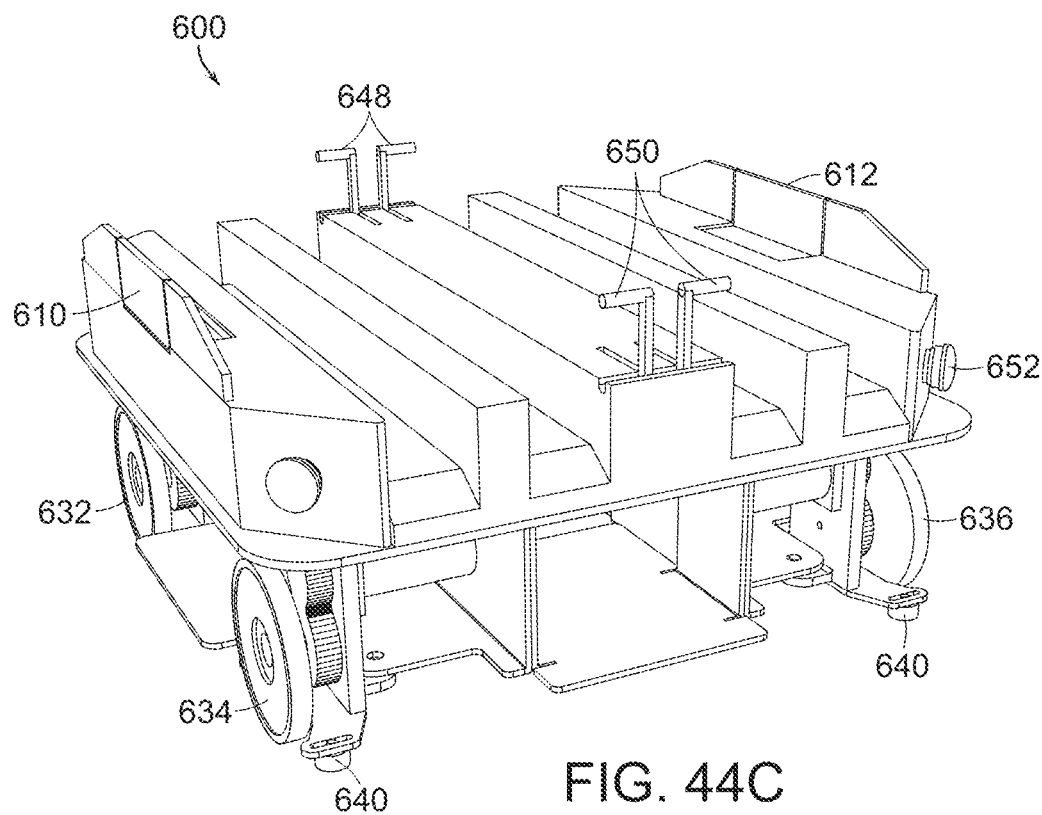
Figure 44D:
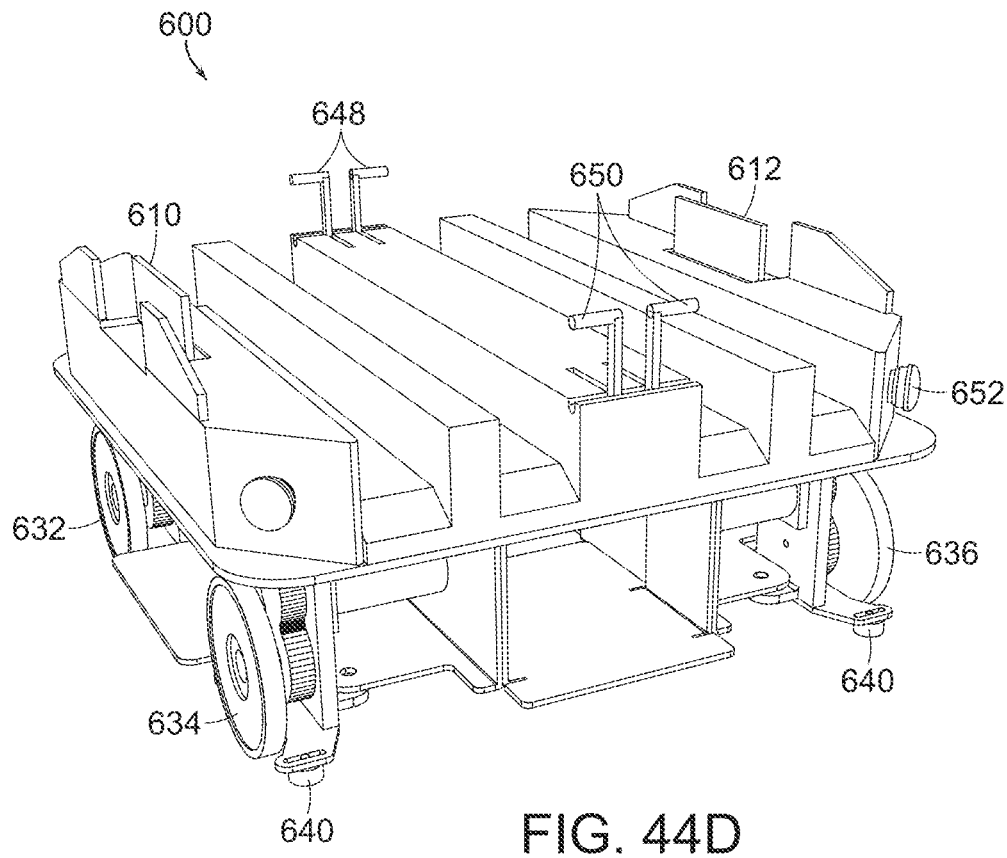
Figure 44E:
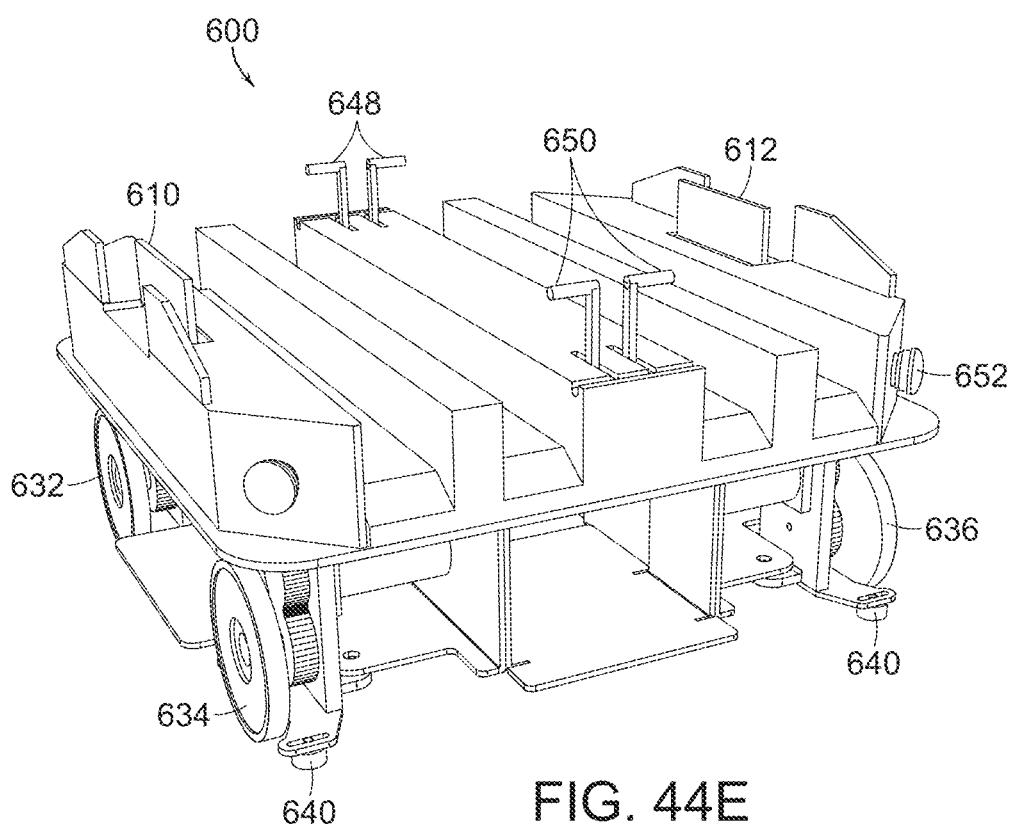

As further shown in FIGS. 44B and 44C, the bar paddles 648, 650 may be independently actuatable to be raised, and subsequently moved toward or away from each other. In particular, FIG. 44B shows bar paddle 650 raised, and FIG. 44C shows bar paddle 44C also raised. The bar paddles may be actuated by a linear actuator (e.g., a threaded actuator, a pneumatic actuator or an electromagnetic actuator) with a linear cam to raise the bar paddles, and the centering plates may also be actuated by a linear actuator (e.g., a threaded actuator, a pneumatic actuator or an electromagnetic actuator). FIG. 44D shows the centering plates 610, 612 being actuated to embrace a bin (or tote), and FIG. 44E shows the raised bar paddles 648, 650 being brought toward each other to also embrace a bin (or tote).

Figure 45A:
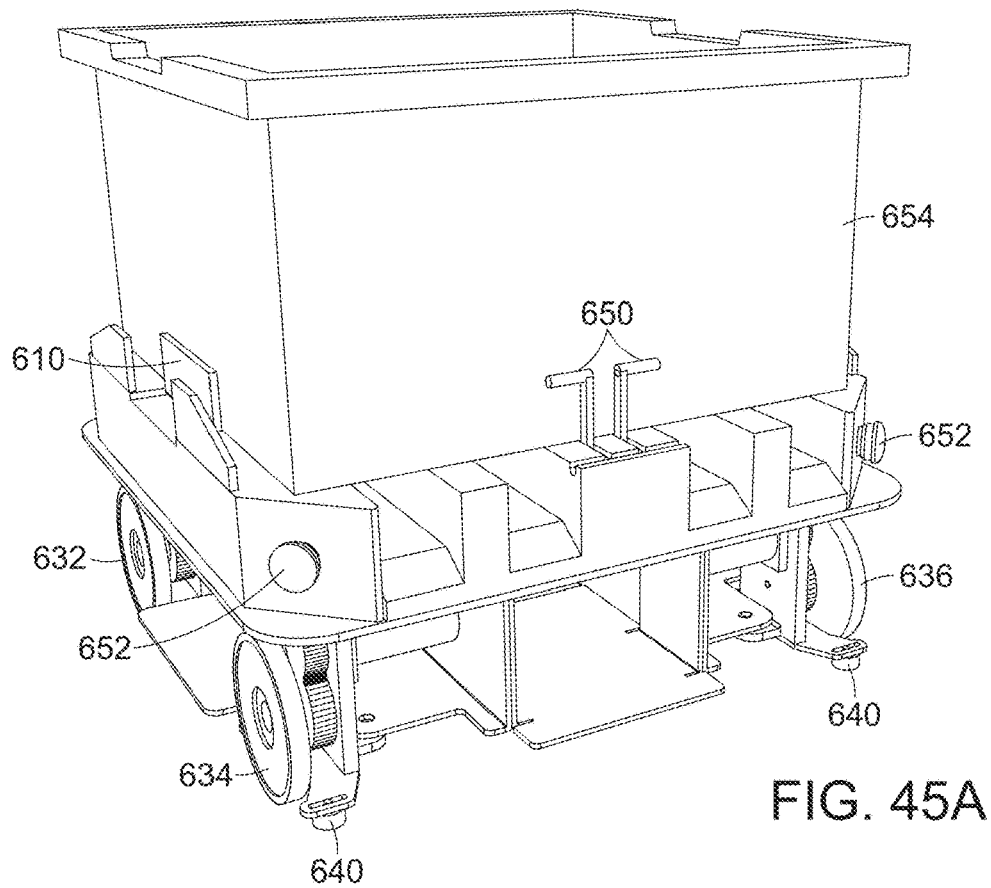
FIGS. 45A and 45B show illustrative diagrammatic views of the carrier of FIG. 43 and a bin with the wheels in a first position (FIG. 45A) and rotated (FIG. 45B)
Figure 45B:
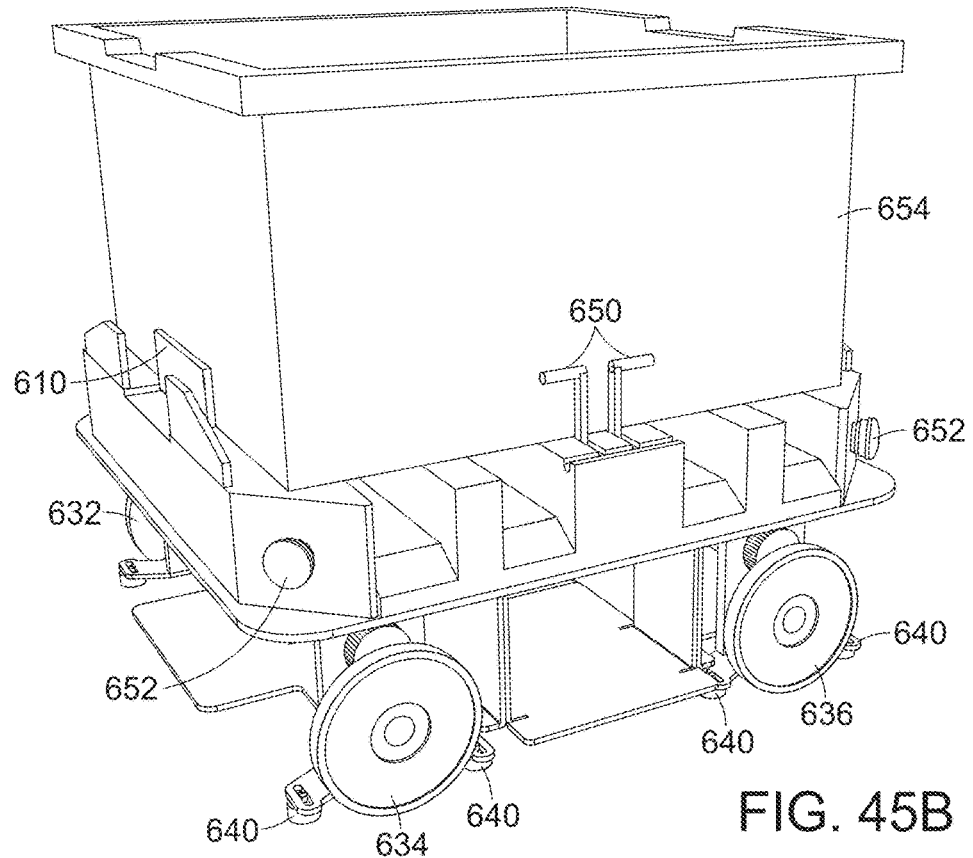
Figure 46A:
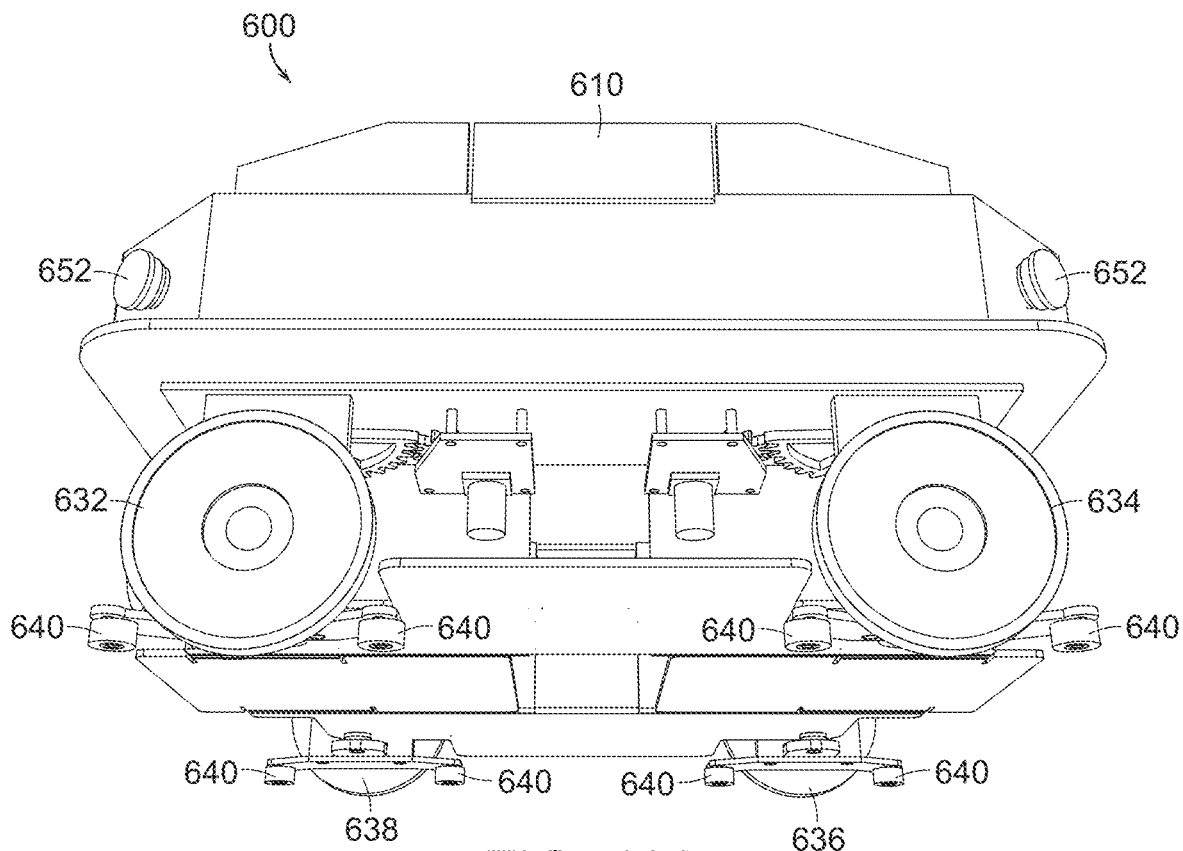
FIGS. 46A and 46B show illustrative diagrammatic underside side views of the carrier of FIG. 43 with the wheels in a first position (FIG. 46A) and rotated (FIG. 46B)

FIGS. 45A and 45B show the carrier 600 with a bin 654 on the carrier. FIG. 45A shows the wheels 632, 634, 636, 638 in a first position, aligned in a direction of the bar paddles 648, 650, and FIG. 45B shows the wheels 632, 634, 636, 638 pivoted to a second position, aligned in a direction of the centering plates 610, 612. FIG. 46A shows a lower side view of the carrier as shown in FIG. 44D, and FIG. 46B shows a lower side view of the carrier as shown in FIG. 44E.

Figure 46B:
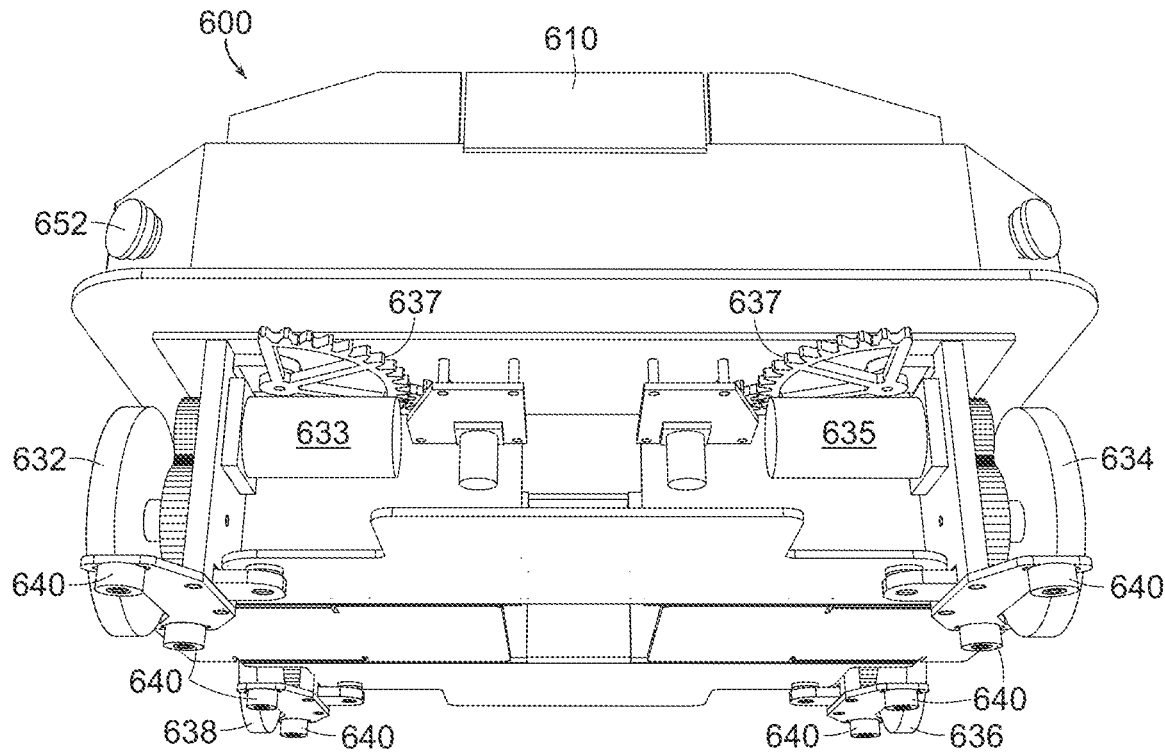
Figure 47A:
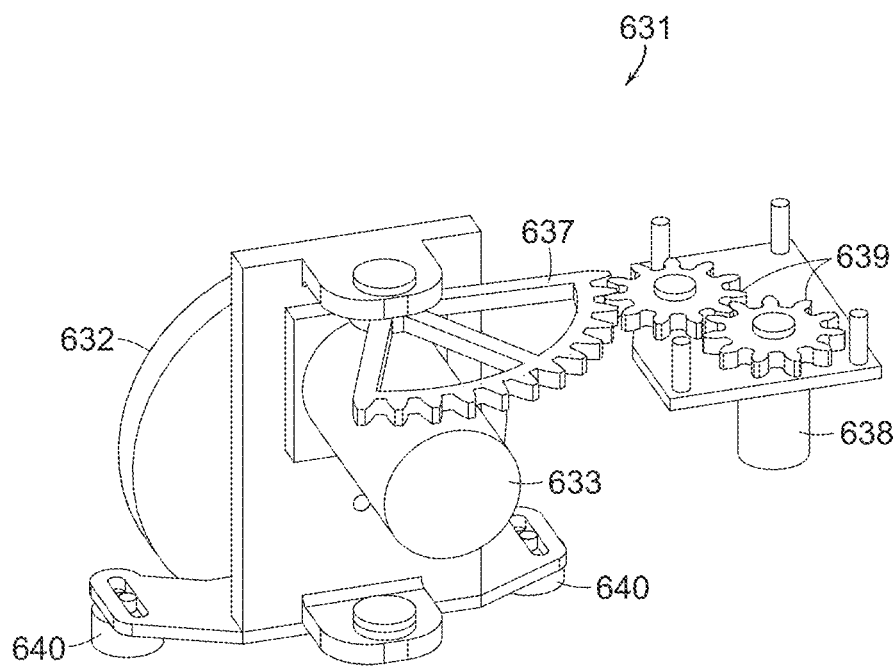
FIGS. 47A and 47B show illustrative diagrammatic views of a wheel unit of the carrier of FIG. 43 with the wheels in a first position (FIG. 47A) and rotated (FIG. 47B)
Figure 47B:
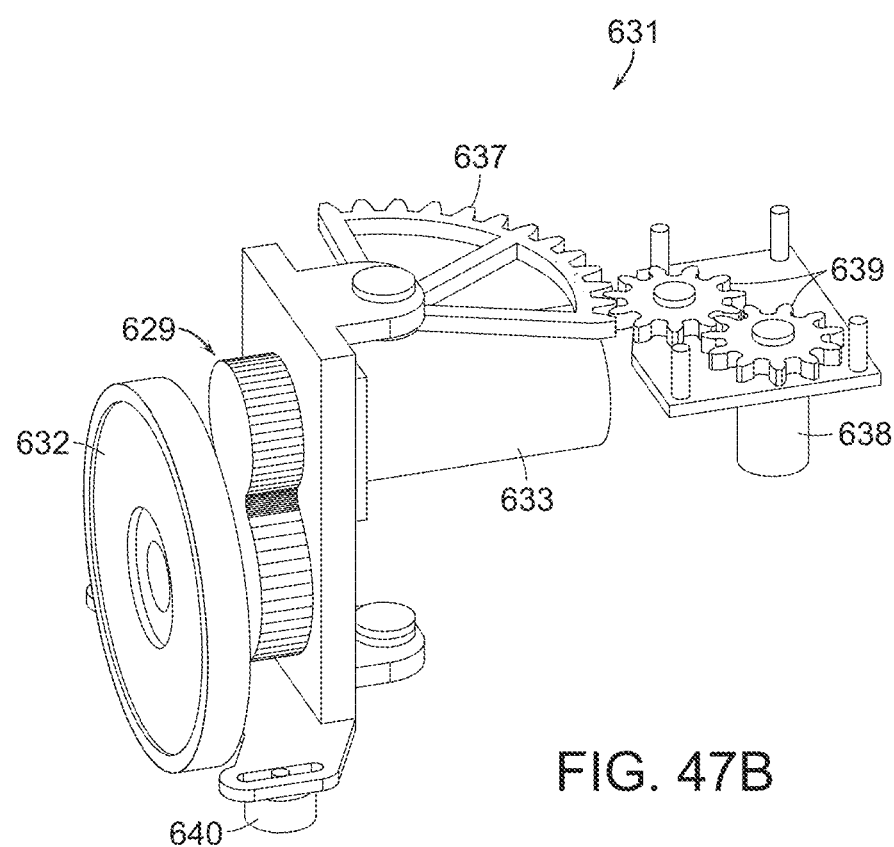

As may be seen in FIG. 46B (and with further reference to FIGS. 47A and 47B), each wheel (e.g., 632) may be part of a wheel assembly 631 that includes a wheel motor (e.g., 633), a limited rotation gear 637, and a pivot motor 638 that reciprocally drives the limited rotation gear 637 via one or more drive gears 639. FIG. 47A shows the wheel 632 in a first position, and FIG. 47B shows the wheel 632 in a second pivoted position. Although each pivot assembly may be individually actuated, in this embodiment, the wheels are pivoted at the same time. FIGS. 48A and 48B show the underside of the carrier 600 (with the wheel cover 604 on the carrier). FIG. 48A shows the wheels 632, 634, 636, 638 in a first position, and FIG. 48B shows the wheels 632, 634, 636, 638 in a second pivoted position.

Figure 49A:
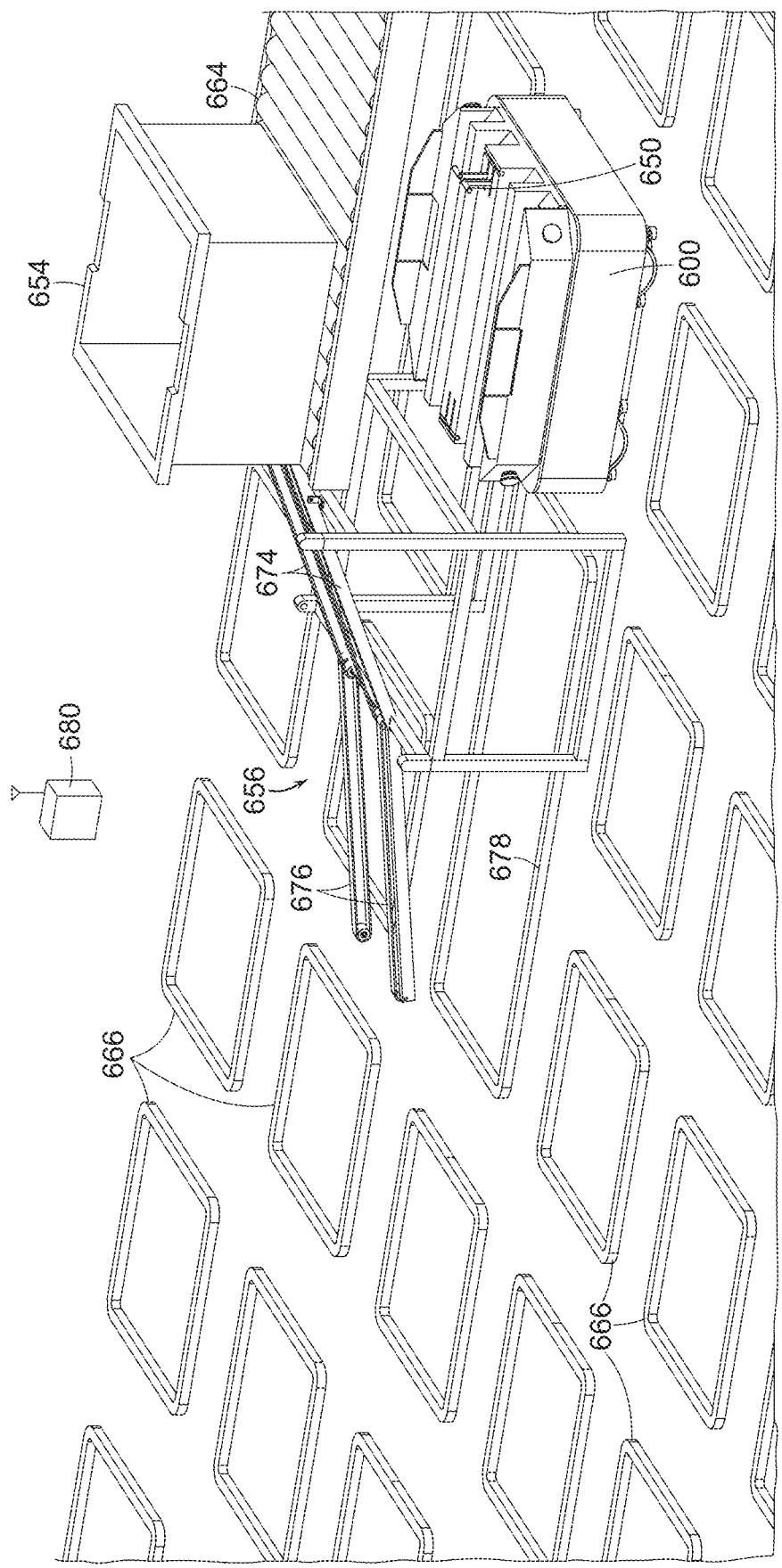
FIGS. 49A-49D show illustrative diagrammatic views of stages of a bin being fed into an object processing system using the bin infeed/outfeed system using a carrier of FIG. 43.
Figure 49B:
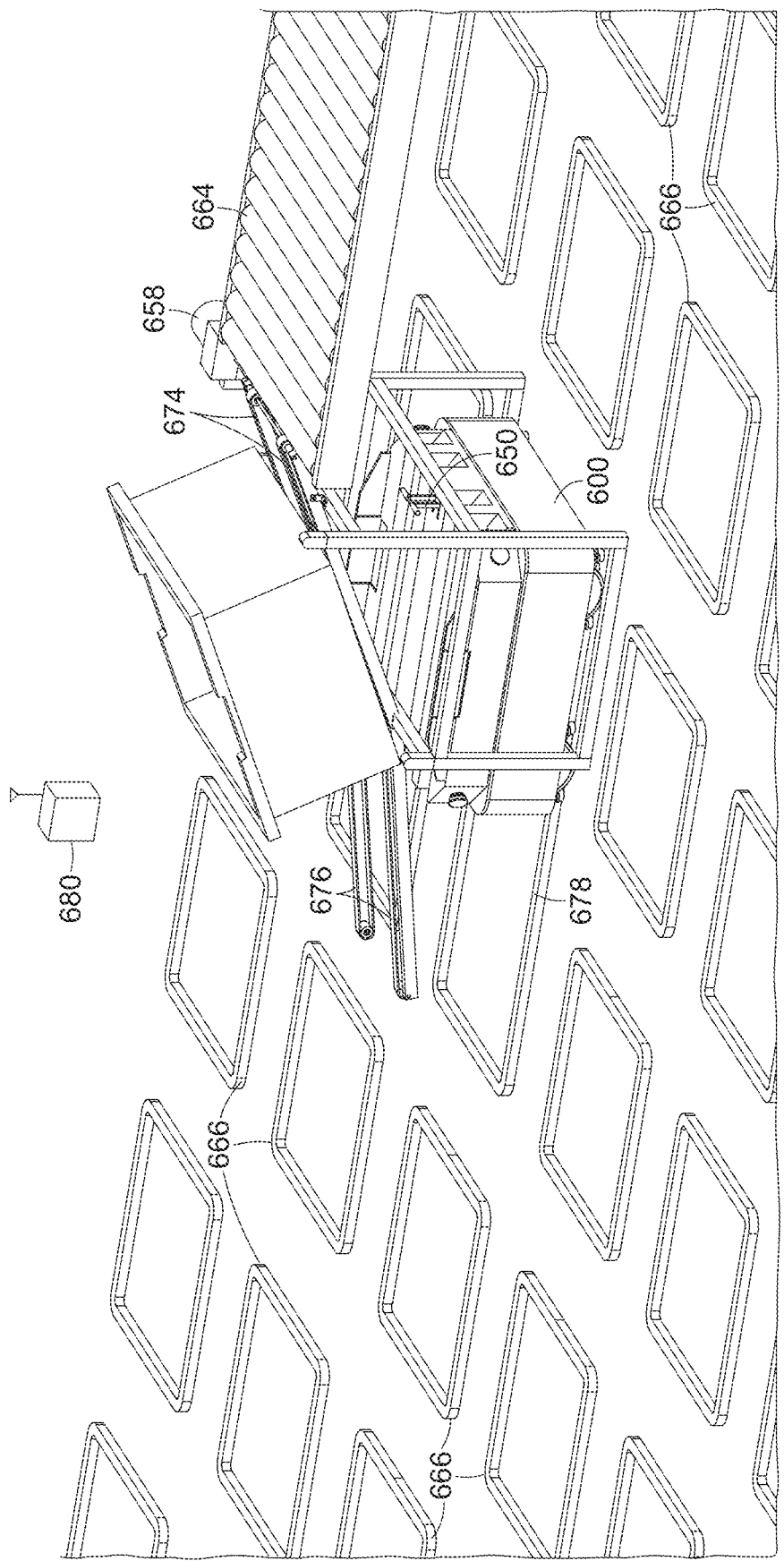
Figure 49C:
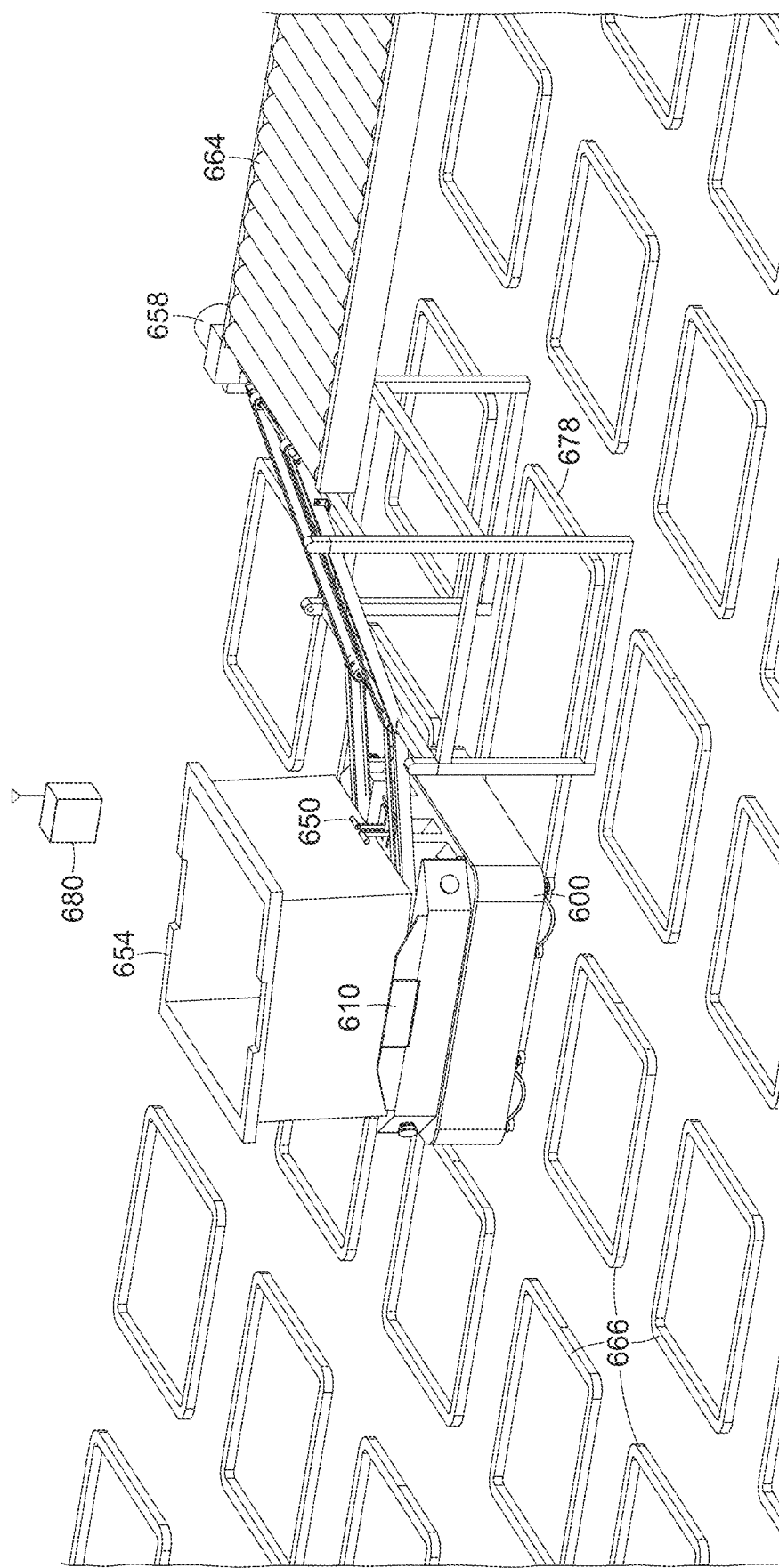

FIGS. 49A-49D show a bin 654 traveling along a conveyor 664 above a track system that includes track sections 666 as discussed above. As the bin 654 is moving, a mobile carrier 600 moves underneath the conveyor 664 and matches the speed of movement of the bin 654 on the conveyor 664 in an inbound direction. As the bin (and the mobile carrier 600) approach the feed station 656, the motor 658 causes the strip belts 674, 676 to move in the direction of movement of the conveyor 664 and to match the speed of the conveyor 664 (FIG. 49B). Paddle 650 on the mobile carrier 600 is flipped up and the mobile carrier 600 moves under the bin 654 as it descends along the driven belts 674, 676 at the same speed as the mobile carrier 600 (FIG. 49C). The bin 654 engages the mobile carrier 600 (FIG. 49D), and is then fully transferred to the mobile carrier 600. The track section 678 underneath the feed station 656 may be provided as an extended (e.g., double) track section to assist in maintaining alignment of the mobile carrier 600 on the track system during transfer of a bin.

Figure 49D:
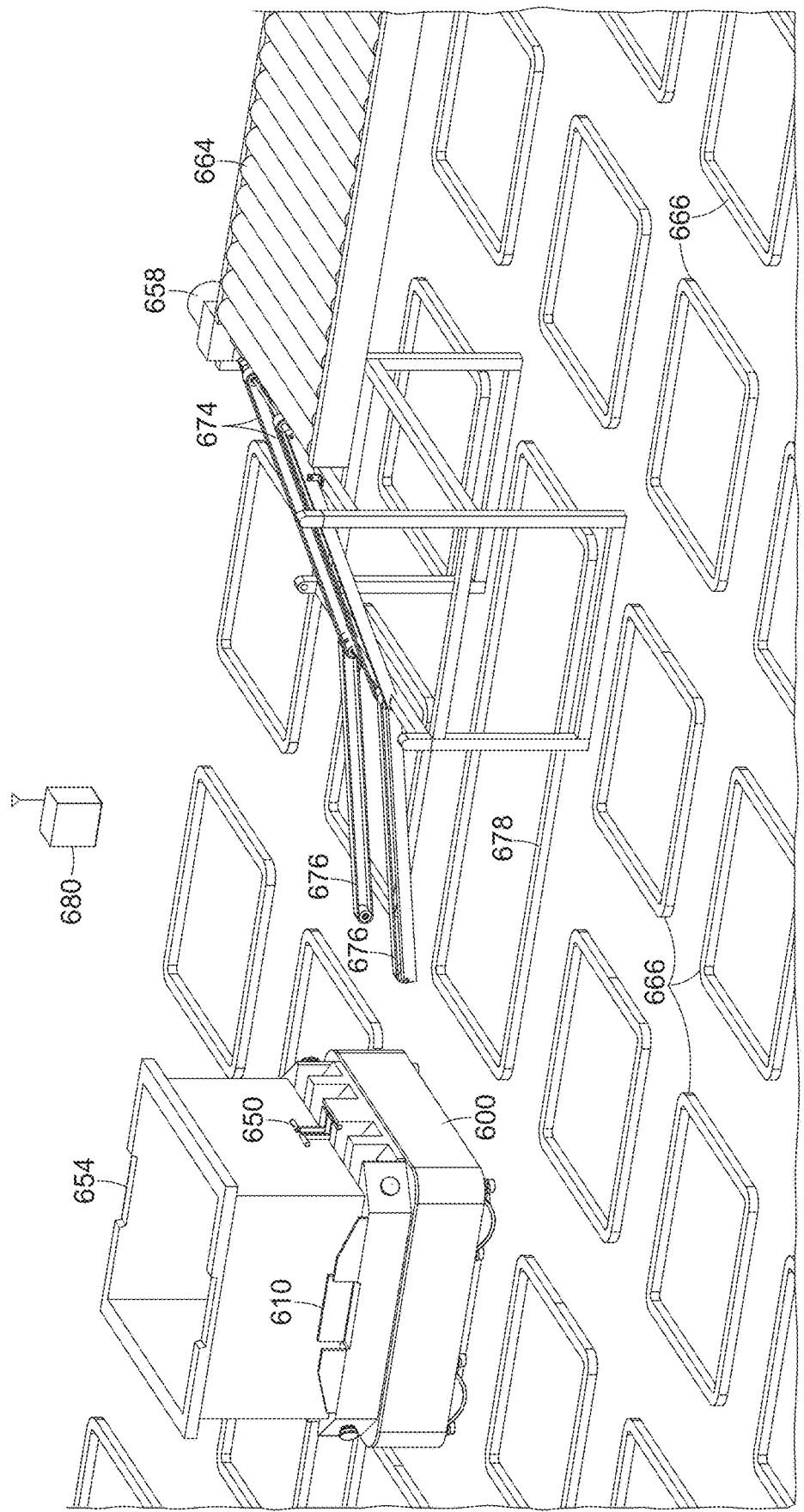
Figure 50A:
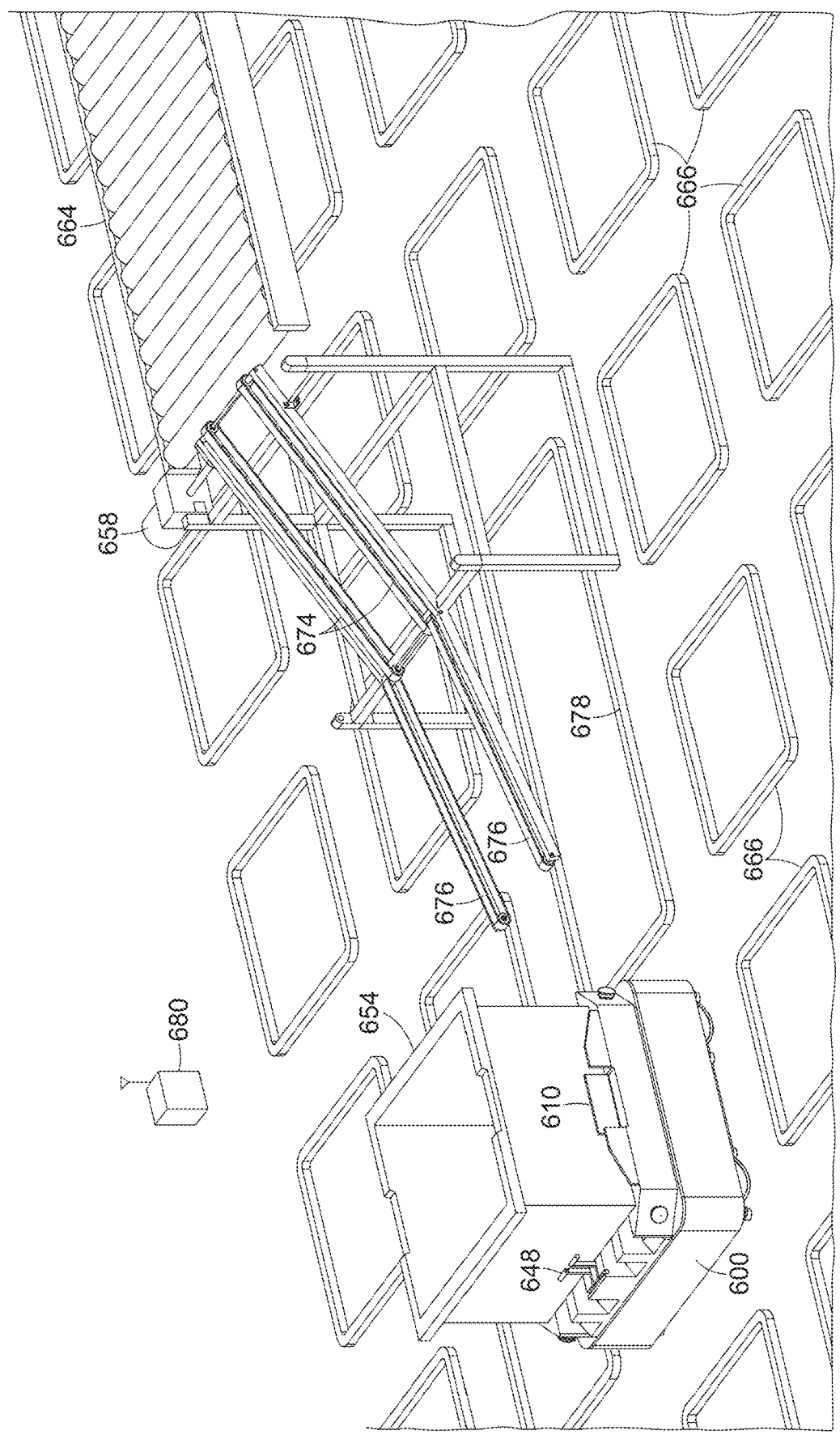
FIGS. 50A-50D show illustrative diagrammatic views of stages of a bin being retrieved from an object processing system using the bin infeed/outfeed system using a carrier of FIG. 43.
Figure 50B:
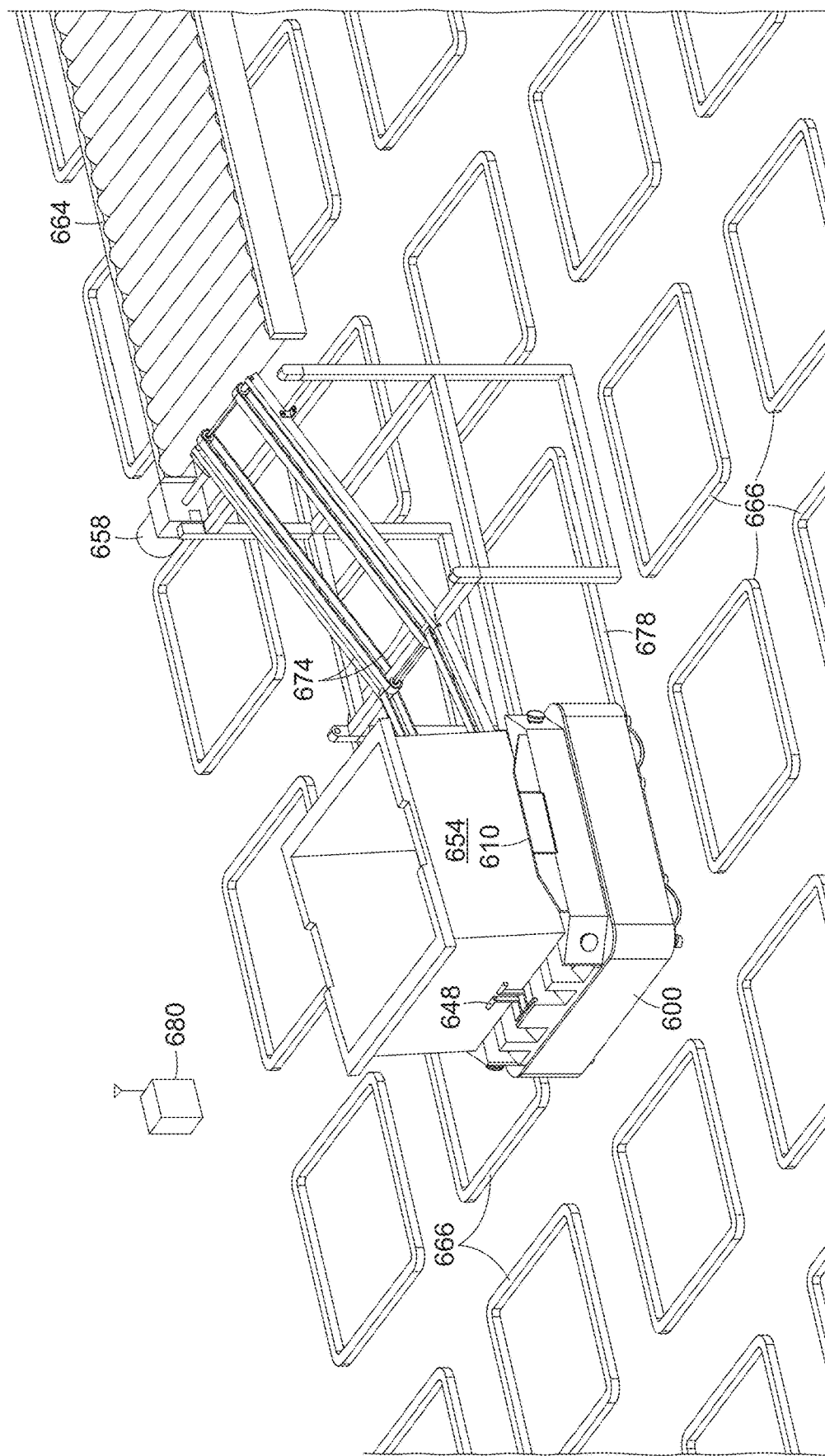
Figure 50C:
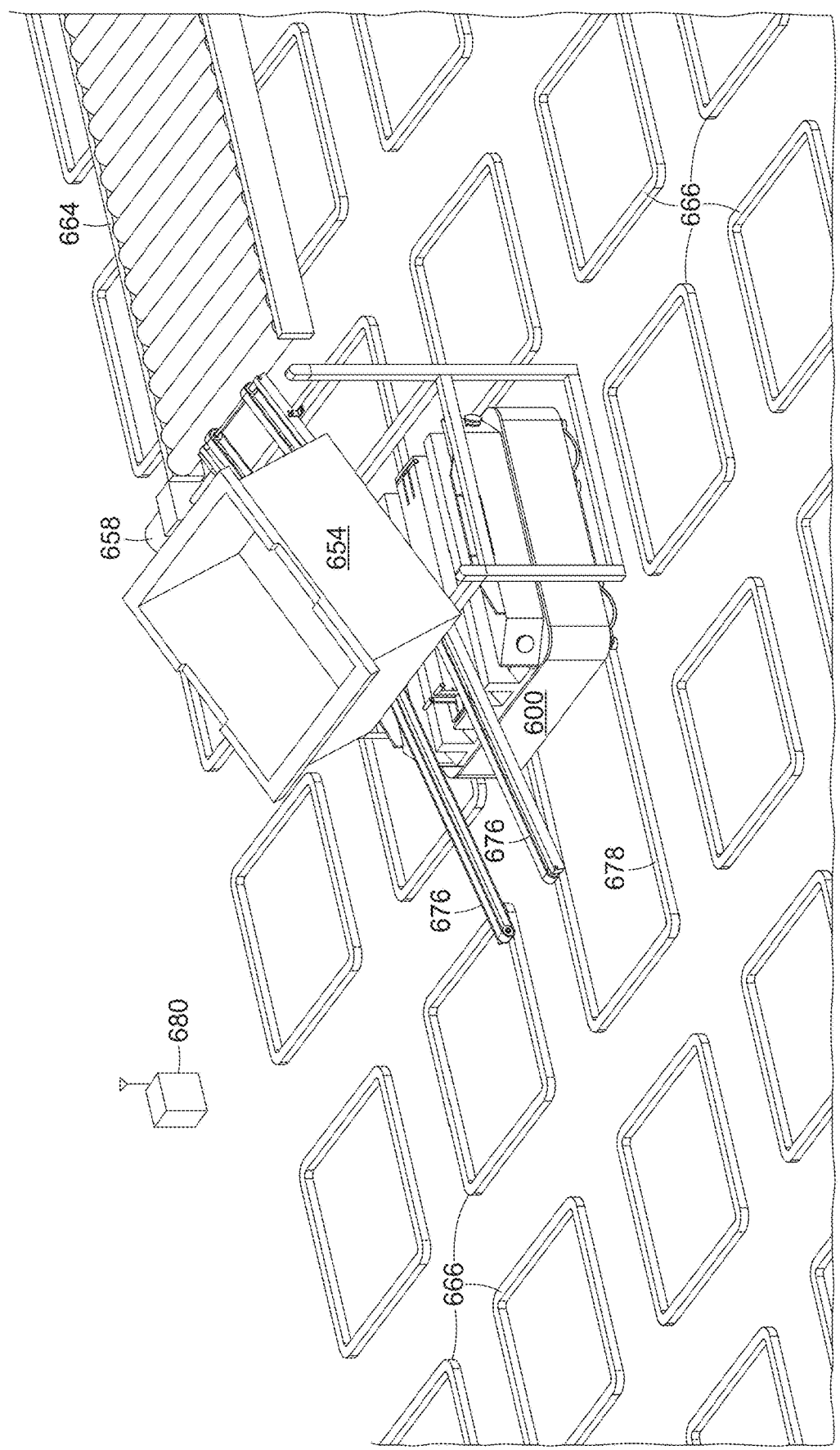
Figure 50D:
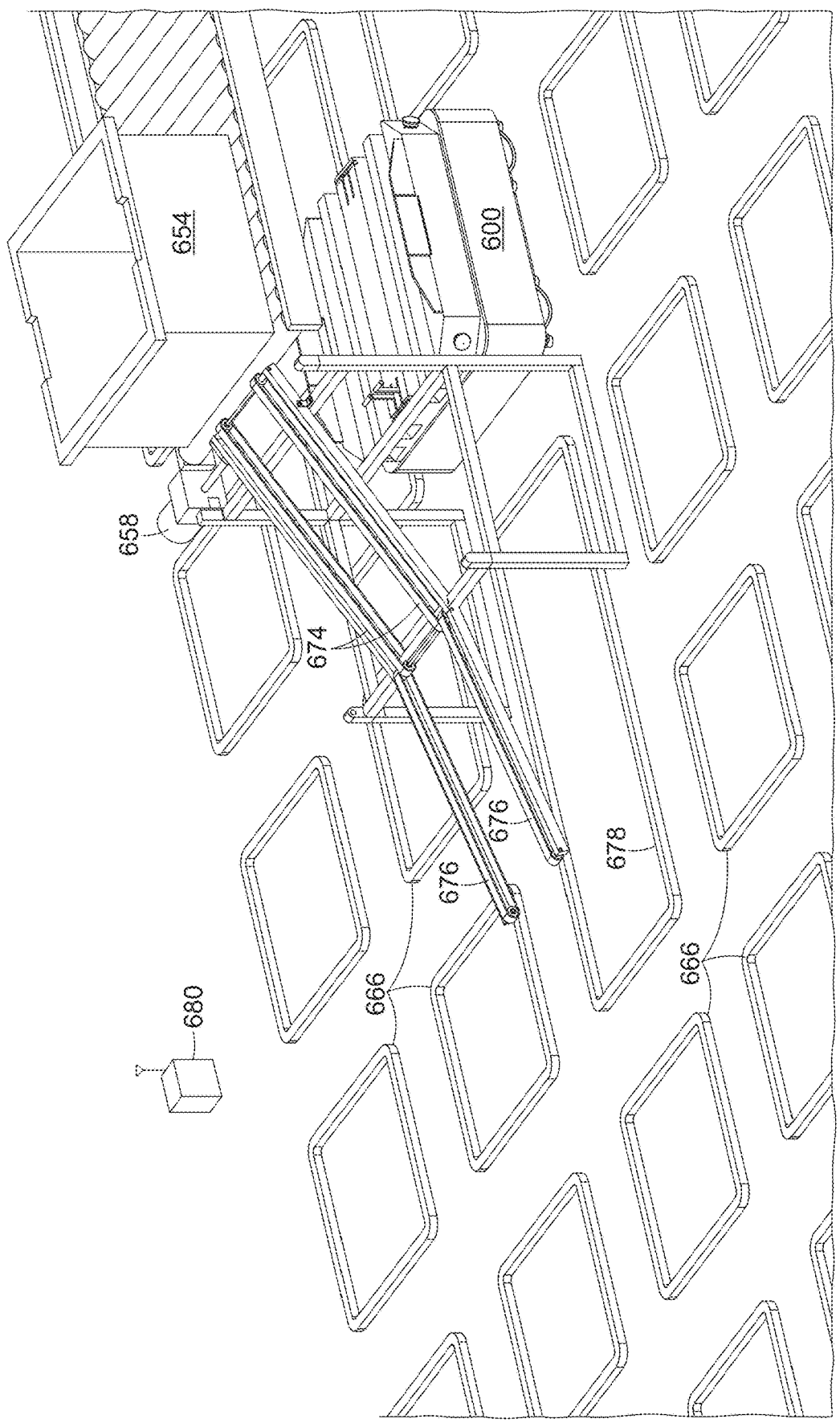

With reference to FIGS. 50A-50D, a bin 654 may be transferred from a mobile carrier 600 at the feed station 656 by providing that the motor 658 drives the strip belts 674, 676 at the same speed as that of the mobile carrier 600. With its rear paddle 648 engaged, the bin 654 on the mobile carrier 600 engages the belts 506 (FIG. 50B). The bin 654 is carried upward by the belts 676, 674 (FIG. 50C), and is provided to the conveyor 664 which carries the bin in an outbound direction (FIG. 50D). As shown in FIGS. 49C and 49D, when the bin is received on the carrier 600, the centering plates 610, 612 engage the carrier 600, and as shown in FIGS. 50A and 50B, when the bin is to be released to the conveyor 664, the centering plates are withdrawn, permitting the bin to be lifted off of the carrier by the belts 674, 676. Control of the system may be provided (e.g., wirelessly) by one or more computer processing systems 680.

Each of the carriers, tracks, racks, infeed and outfeed system of the above disclosed embodiments may be used with each of the disclosed embodiments and further system in accordance with the invention.

Figure 51:
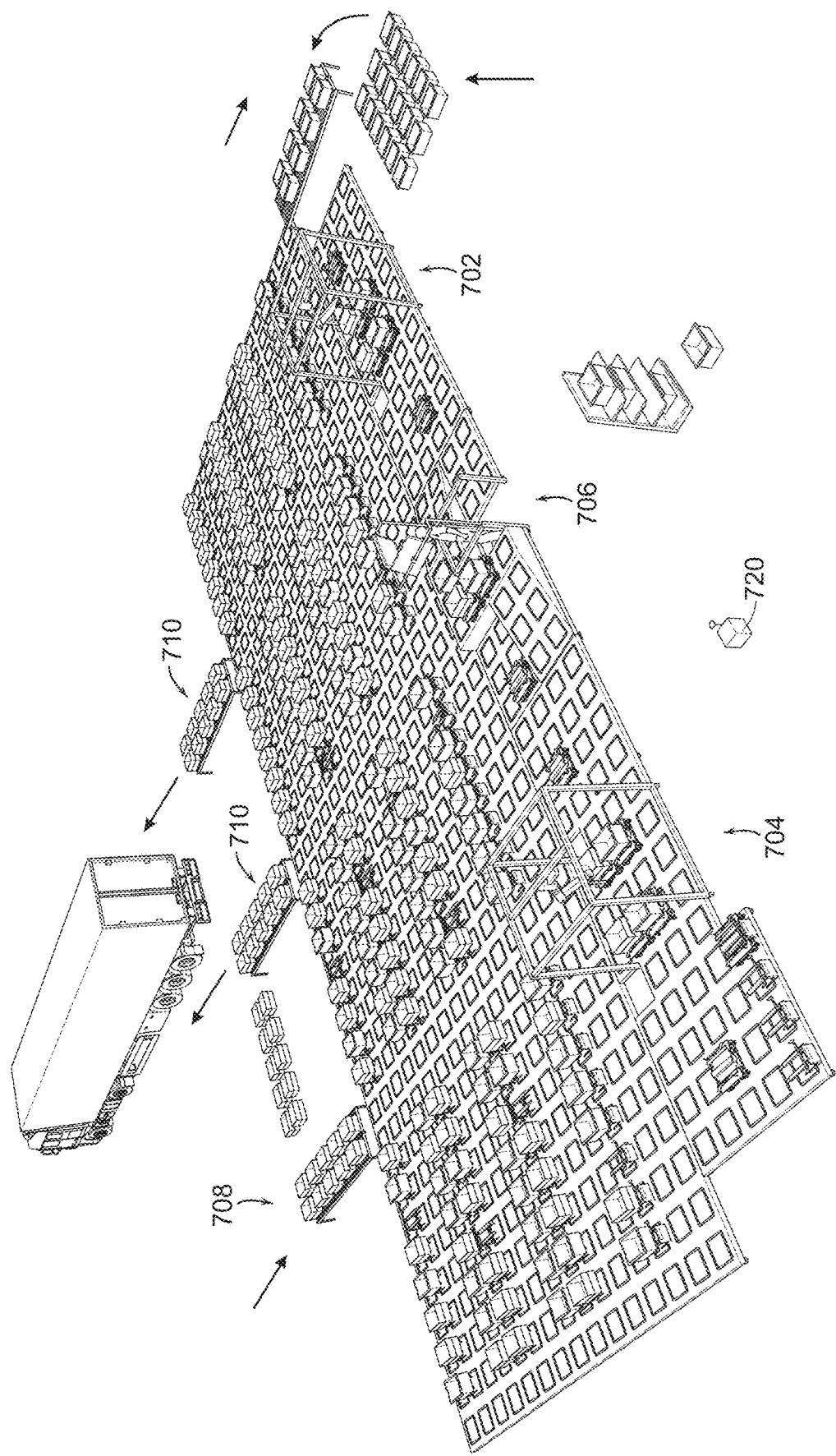
FIG. 51 shows an illustrative diagrammatic view of a multi-processing stage system in accordance with an embodiment of the present invention that involves a flow process direction for bins.

FIG. 51 shows a system 700 in accordance with an embodiment of the present invention that includes a large connected array 702 of track members as well as automated mobile carriers for transporting totes about the array. The system also includes both automated processing stations 704 and manual processing stations, as well as at least one in-feed station 706, at least one empty outbound vessel in-feed station 708 and outbound stations 710. In general, the processing begins with having a team member retrieve inventory totes and VCPs from bulk storage. The inventory totes and VCPs are then loaded onto an in-feed station, and team members build empty outbound vessels and load then onto the in-feed as well. The automated mobile carriers move requested outbound vessels to and from storage, and objects are processed from inventory totes at both automated stations 704 and manual stations 706. The carriers then take the VCPs straight to staging for trailer loading, and team members load completed carts onto trailers. The system operates under the control, for example, of a computer processor 720.

As shown at 800 in FIG. 52, the system may be scaled up to include a much larger array of track modules 802, and many processing stations 804 that may, for example, be any of inventory in-feed stations, empty outbound vessel in-feed stations, automated and manual processing stations, and outbound stations as discussed above. The system operates under the control, for example, of a computer processor 806.

In addition to the nominal modes of operation, the systems of the invention are designed with consideration for the following exceptions. Picking orders that contain SKUs that are not amenable to automated handling, e.g. violate the weight and dimension criteria, are routed to manual picks for manual processing. Inside the manual picks station, a team member transfers the desired number of eaches from an inventory container to an outbound container. Any VCPs that are incompatible with carrier transport, e.g. violate the weight and dimension criteria, bypass the track system. Team members are responsible for routing these containers to the appropriate trailers. The track system internally verifies the identity of containers at several points during induction, transportation, and discharge. A container that is detected to be out of place, unexpectedly empty, or prematurely full is automatically flagged as an exception. When such an exception occurs, the work management system is notified of the fault and the container can be routed to an in-feed station for special processing.

Maintenance of static system components can occur while the system is online—without impeding operation—by assigning orders to other stations. This is true for both the manual and the automated processing stations. A carrier can be serviced without impacting system operation by commanding it to move to a track module at the periphery of the system, where it is accessible to maintenance personnel. If a carrier encounters a fault that renders it inoperable, the system maintains degraded operation by routing other carriers around the disabled carrier until maintenance personnel extract the carrier for service.

The interactions between team members and the track module system includes four primary tasks: (1) picking an each in a manual picking station, (2) inducting an IVC or VCP from bulk storage through an in-feed station, (3) inducting an empty OBC through an in-feed station, (4) discharging a depleted IVC through an in-feed station, and (5) discharging sequenced OBCs and VCPs to be built into a cart.

Again, manual picking is done by a team member inside a manual picking station, through the following steps. Carriers arrive at the manual picking station: one carrying and IVC and one carrying an OBC. The containers' identities are scanned and verified. A display informs the team member the identity and quantity of eaches they should transfer. The team member picks one each out of the IVC. The team member scans the each using a presentation scanner located between the IVC and OBC. If the each fails to scan, the team member scans the each using a backup handheld scanner. The team member places the each into the OBC. The team member repeats the last two steps until the desired number of eaches have been transferred. The team member presses a button to indicate that the picks from the IVC are complete. The carriers depart and the process repeats. In nominal operation, multiple carriers queue at each manual picking station to minimize the team member's downtime. Multiple pairs of carriers may be accessible to the team member at once to further reduce downtime while interchanging containers.

Containers that are amenable to automated scanning, e.g., IVCs and OBCs, are inducted by a team member at an in-feed station through the following steps. A container arrives at an in-feed station. A team member places the container on the in-feed's conveyor. The container is conveyed past an automated scanner which identifies the container's identity. The container is advanced onto the transfer mechanism. An empty carrier arrives at the in-feed station. The carrier accepts the container from the transfer mechanism. The carrier departs and the process repeats. In nominal operation, multiple carriers queue at each in-feed station to maximize container throughput. Multiple team members may simultaneously service the same conveyor if necessary to match the in-feed's throughput.

Automated scanning is expected to be used for IVC and OBC induction. VCP induction is expected to require a manual scanning step by the team member, since vendor labels may not consistently be located on VCPs.

Containers that require manual scanning, e.g., VCPs with vendor labels, are inducted by a team member at an in-feed station through the following steps. A container arrives at an in-feed station. A team member scans the container with a presentation scanner. If the container fails to scan, the team member scans the container using a backup handheld scanner. The team member places the container on the in-feed conveyor. The container is advanced onto the transfer mechanism. An empty carrier arrives at the in-feed station. The carrier accepts the container from the transfer mechanism. The carrier departs and the process repeats. If all containers are labeled in a way that is amenable to automated scanning, e.g. if additional labels are applied to VCPs, then all containers can be inducted through the automated procedure described above. Presentation and handheld scanners are only necessary at in-feeds that are expected to be used for VCP induction.

Containers that are discharged from the system and accepted by a team member through the following steps. A carrier carrying a container arrives at an in-feed station. The transfer mechanism extracts the container from the carrier. The transfer mechanism transfers the container to a conveyor. The container is conveyed to a team member at the end of the conveyor. The team member removes the container from the conveyor. The team member scans the container using a facility-provided HMI as part of their normal workflow (e.g., assembling a cart or returning an IVC to circulation). The track module system is notified of the scan by the work management system to confirm the successful discharge.

If the team member is building a cart out of VCPs and OBCs, the facility-provided HMI will direct the team member to place the container in the correct location on the appropriate cart. The order in which containers must be discharged is encoded in the sequencing orders submitted by the work management system.

Problem solving, resolutions of issues, and inventory consolidation occur at designated manual picking stations and in-feed stations by specially-trained team members. Manual picking stations are used for operations that require access to the contents of containers inside the system, e.g., verifying the content of a container in the system. In-feed stations are used for operations that require access to containers outside the system, removing a container from the system, or inducting a new container into the system; e.g. replacing a damaged container barcode.

The concept of operations for manual picking stations and In-feed stations dedicated to these roles is identical to their nominal operation, except that more options may be available on the station's HMI. The facility may choose to provide additional hardware (e.g. label printers) for the operators of these stations as needed for their processes.

Control of each of the systems discussed above may be provided by the computer system 8, 67, 320, 420, 451, 520, 680, 720 and 806 that is in communication with the programmable motion devices, the carriers, and the track modules. The computer systems also contain the knowledge (continuously updated) of the location and identity of each of the storage bins, and contains the knowledge (also continuously updated) of the location and identity of each of the destination bins. The system therefore, directs the movement of the storage bins and the destination bins, and retrieves objects from the storage bins, and distributes the objects to the destination bins in accordance with an overall manifest that dictates which objects must be provided in which destination boxes for shipment, for example, to distribution or retail locations.

In the systems of the present invention, throughput and storage may scale independently, and all inventory SKUs may reach all outbound containers. The systems are robust to failures due to redundancy, and inventory totes (storage bins) and outbound boxes (destination bins) may be handled interchangeably.

Those skilled in the art will appreciate that numerous modifications and variations may be made to the above disclosed embodiments without departing from the spirit and scope of the present invention.

What is claimed is:

1. A method of maintaining an object processing system, said method comprising:

moving a plurality of automated carriers about a work environment, each automated carrier including a carrier body for supporting any of a tote or bin or box thereon, and a carrier base including a plurality of wheels that are mutually spaced apart, said carrier base defining a base unit area;

moving a maintenance body supported by a plurality of carrier bases about the work environment, each carrier base of the maintenance body being mutually spaced from each other by at least two base unit areas;

determining that maintenance is needed at a maintenance location in the work environment;

moving the maintenance body to the maintenance location;

grasping debris at the maintenance location using an articulated arm on the maintenance body; and depositing the debris using the articulated arm into a receiving area on the maintenance body.

2. The method of claim 1, wherein each of the plurality of automated carriers includes four wheels.

3. The method of claim 2, wherein each of the four wheels is remotely controlled to pivot between a first position and a second position by a linkage mechanism that is rotated to move the four wheels at the same time.

4. The method of claim 1, wherein the carrier base of each of the plurality of automated carriers includes at least two sets of four pivotable wheels.

5. The method of claim 1, wherein the carrier base of each of the plurality of automated carriers includes at least three sets of four pivotable wheels.

6. The method of claim 1, wherein the carrier base of each of the plurality of automated carriers includes at least four sets of four pivotable wheels.

7. The method of claim 1, wherein the automated carriers move along a plurality of disconnected track sections.

8. The method of claim 7, wherein each of said plurality of disconnected track sections includes identifiable indicia that is capable of being detected by the plurality of automated carriers.

9. The method of claim 1, wherein the maintenance body further includes a camera.

10. A method of maintaining an object processing system, said method comprising:

moving a plurality of automated carriers about a work environment, each automated carrier including a carrier body for supporting any of a tote or bin or box thereon, and a carrier base including a plurality of wheels that are mutually spaced apart, said carrier base defining a base unit area;

moving a maintenance body supported by a plurality of carrier bases about the work environment, each carrier base of the maintenance body being mutually spaced from each other by at least two base unit areas;

determining that maintenance is needed at a maintenance location in the work environment;

moving the maintenance body to the maintenance location; and employing an extendable end-effector that extends to grasp a disabled automated carrier of the plurality of automated carriers at the maintenance location.

11. The method of claim 10, wherein each of the plurality of automated carriers includes four wheels.

12. The method of claim 11, wherein each of the four wheels is remotely controlled to pivot between a first position and a second position by a linkage mechanism that is rotated to move the four wheels at the same time.

13. The method of claim 10, wherein the carrier base of each of the plurality of automated carriers includes at least two sets of four pivotable wheels.

14. The method of claim 10, wherein the carrier base of each of the plurality of automated carriers includes at least three sets of four pivotable wheels.

15. The method of claim 10, wherein the carrier base of each of the plurality of automated carriers includes at least four sets of four pivotable wheels.

16. The method of claim 10, wherein the plurality of automated carriers move along a plurality of disconnected track sections.

17. The method of claim 16, wherein each of said plurality of disconnected track sections includes identifiable indicia that is capable of being detected by the plurality of automated carriers.

18. The method of claim 10, wherein the maintenance body further includes a camera.

19. A method of maintaining an object processing system, said method comprising:

moving a plurality of automated carriers about a work environment, each automated carrier including a carrier body for supporting any of a tote or bin or box thereon, and a carrier base including a plurality of wheels that are mutually spaced apart, said carrier base defining a base unit area;

moving a maintenance body supported by a plurality of carrier bases about the work environment, each carrier base of the maintenance body being mutually spaced from each other by at least two base unit areas;

determining that maintenance is needed at a maintenance location in the work environment;

moving the maintenance body to the maintenance location; and employing a vacuum assembly on the maintenance body that provides at least one vacuum opening on an underside of the maintenance body.

20. The method of claim 19, wherein each of the plurality of automated carriers includes four wheels.

21. The method of claim 20, wherein each of the four wheels is remotely controlled to pivot between a first position and a second position by a linkage mechanism that is rotated to move the four wheels at the same time.

22. The method of claim 19, wherein the carrier base of each of the plurality of automated carriers includes at least two sets of four pivotable wheels.

23. The method of claim 19, wherein the carrier base of each of the plurality of automated carriers includes at least three sets of four pivotable wheels.

24. The method of claim 19, wherein the carrier base of each of the plurality of automated carriers includes at least four sets of four pivotable wheels.

25. The method of claim 19, wherein the plurality of automated carriers move along a plurality of disconnected track sections.

26. The method of claim 25, wherein each of said plurality of disconnected track sections includes identifiable indicia that is capable of being detected by the plurality of automated carriers.

27. The method of claim 19, wherein the maintenance body further includes a camera.

* * * * *